(12) United States Patent
Griswold et al.

(10) Patent No.: US 12,260,842 B2
(45) Date of Patent: Mar. 25, 2025

(54) SYSTEMS, METHODS, AND MEDIA FOR DISPLAYING INTERACTIVE AUGMENTED REALITY PRESENTATIONS

(71) Applicant: Case Western Reserve University, Cleveland, OH (US)

(72) Inventors: Mark A. Griswold, Shaker Heights, OH (US); Henry Eastman, Cleveland, OH (US); Robert Gotschall, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 18/656,980

(22) Filed: May 7, 2024

(65) Prior Publication Data

US 2024/0290299 A1    Aug. 29, 2024

Related U.S. Application Data

(60) Division of application No. 17/304,371, filed on Jun. 18, 2021, now Pat. No. 12,020,667, which is a
(Continued)

(51) Int. Cl.
| | | |
|---|---|---|
| *G09G 5/14* | (2006.01) | |
| *G02B 27/01* | (2006.01) | |
| *G06F 3/01* | (2006.01) | |
| *G06F 3/0346* | (2013.01) | |
| *G06T 15/20* | (2011.01) | |
| *G06T 19/00* | (2011.01) | |
| *H04L 67/10* | (2022.01) | |

(52) U.S. Cl.
CPC ............. *G09G 5/14* (2013.01); *G02B 27/017* (2013.01); *G06F 3/011* (2013.01); *G06F 3/012* (2013.01);
(Continued)

(58) Field of Classification Search
CPC ................. G09G 5/14; G09G 2354/00; G09G 2370/022; G06F 3/011; G06F 3/012;
(Continued)

(56) References Cited

U.S. PATENT DOCUMENTS 8,847,988 B2    9/2014  Geisner et al.
8,941,559 B2    1/2015  Bar-Zeev et al.
(Continued)

FOREIGN PATENT DOCUMENTS

CN    105358227 A    2/2016
CN    105393158 A    3/2016
(Continued)

OTHER PUBLICATIONS

PCT International Search Report and Written Opinion, PCT/US2017/064781, Feb. 28, 2018, 12 pages.
(Continued)

*Primary Examiner* — Michael Pervan
(74) *Attorney, Agent, or Firm* — Quarles & Brady LLP

(57) ABSTRACT

Systems, methods, and media for displaying interactive augmented reality presentations are provided. In some embodiments, a system comprises: a head mounted display comprising: a transparent display; a plurality of sensors; and at least one processor, wherein the at least one processor is programmed to: select a content display location of a plurality of predetermined content display locations to use to present content based at least in part on a location of the head mounted display within a current physical environment; and cause content to be presented by the head mounted display anchored at the selected content display location.

20 Claims, 23 Drawing Sheets

Related U.S. Application Data continuation-in-part of application No. 17/180,007, filed on Feb. 19, 2021, now Pat. No. 11,580,935, which is a continuation of application No. 16/466,122, filed as application No. PCT/US2017/064781 on Dec. 5, 2017, now Pat. No. 10,937,391.

(60) Provisional application No. 63/049,505, filed on Jul. 8, 2020, provisional application No. 63/040,741, filed on Jun. 18, 2020, provisional application No. 62/560,869, filed on Sep. 20, 2017, provisional application No. 62/492,832, filed on May 1, 2017, provisional application No. 62/479,214, filed on Mar. 30, 2017, provisional application No. 62/430,179, filed on Dec. 5, 2016.

(52) U.S. Cl.
CPC ............ *G06F 3/0346* (2013.01); *G06T 15/20* (2013.01); *G06T 19/00* (2013.01); *G06T 19/006* (2013.01); *G02B 2027/0134* (2013.01); *G06T 2200/04* (2013.01); *G06T 2200/24* (2013.01); *G06T 2219/024* (2013.01); *G09G 2354/00* (2013.01); *G09G 2370/022* (2013.01); *H04L 67/10* (2013.01)

(58) Field of Classification Search
CPC ....... G06F 3/0346; G06T 15/20; G06T 19/00; G06T 19/006; G06T 2200/04; G06T 2200/24; G06T 2219/024; G02B 27/017; G02B 2027/0134; H04L 67/10
See application file for complete search history.

(56) References Cited

U.S. PATENT DOCUMENTS

| | | |
|---|---|---|
| 9,495,801 B2 | 11/2016 | Ebstyne et al. |
| 2012/0249741 A1 | 10/2012 | Maciocci et al. |
| 2013/0137076 A1 | 5/2013 | Perez et al. |
| 2014/0160001 A1 | 6/2014 | Kinnebrew et al. |
| 2014/0160165 A1 | 6/2014 | Kim et al. |
| 2014/0306994 A1 | 10/2014 | Brown et al. |
| 2014/0368537 A1 | 12/2014 | Salter et al. |
| 2015/0050887 A1 | 2/2015 | Brown et al. |
| 2015/0091942 A1 | 4/2015 | Ko et al. |
| 2015/0097719 A1 | 4/2015 | Balachandreswaran et al. |
| 2015/0199849 A1 | 7/2015 | Cho et al. |
| 2015/0215351 A1 | 7/2015 | Barzuza et al. |
| 2015/0235435 A1 | 8/2015 | Miller et al. |
| 2015/0242575 A1 | 8/2015 | Abovitz et al. |
| 2016/0041388 A1 | 2/2016 | Fujimaki et al. |
| 2016/0093108 A1 | 3/2016 | Mao et al. |
| 2016/0260251 A1 | 9/2016 | Stafford et al. |
| 2016/0343168 A1 | 11/2016 | Mullins et al. |
| 2016/0350595 A1 | 12/2016 | Solomin et al. |
| 2018/0018933 A1 | 1/2018 | Rehmeyer et al. |

FOREIGN PATENT DOCUMENTS

| | | | |
|---|---|---|---|
| JP | 2012216135 | A | 11/2012 |
| JP | 2015011360 | A | 1/2015 |
| JP | 2016004292 | A | 1/2016 |
| WO | 2015097792 | A1 | 7/2015 |
| WO | 2016118330 | A1 | 7/2016 |

OTHER PUBLICATIONS

European Patent Office, Extended European Search Report, Application No. 17878096.1, Jun. 29, 2020, 9 pages.

European Patent Office, Communication, Application No. 17878096.1, Oct. 14, 2021, 6 pages.

Japanese Patent Office, Notification of Reasons for Refusal, Application No. 2019-530010, Dec. 15, 2020, 11 pages.

Japanese Patent Office, Decision of Refusal, Application No. 2019-530010, Aug. 31, 2021, 13 pages.

China National Intellectual Property Administration, First Office Action and Search Report, Application No. 2017800855764, Feb. 1, 2021, 49 pages.

Australian Government—IP Australia, Examination Report No. 1, Application No. 2017373858, Nov. 16, 2021, 3 pages.

300

2100

- 2102 DETERMINE INVERSE OF A SCALE (E.G., s=S⁻¹) OF THE MAGNIFIER USER INTERFACE ELEMENT ASSOCIATED WITH ORIGINAL CONTENT
- 2104 SET A LOCAL POSITION OF THE DUPLICATE CONTENT TO AN INVERSE POSITION OF THE MAGNIFIER USER INTERFACE ELEMENT SCALED BY s
- 2106 SCALE THE DUPLICATE CONTENT BY s
- 2108 RECEIVE INDICATION THAT SIZE AND/OR LOCATION OF THE MAGNIFIER USER INTERFACE ELEMENT HAS CHANGED

- 2202 DETERMINE THAT A RENDERER ASSOCIATED WITH ORIGINAL CONTENT IS ENABLED (E.G., BASED ON VISIBILITY)
- 2204 DETERMINE WHETHER MATERIAL ASSOCIATED WITH THE RENDERER IS INCLUDED IN MAPPING BETWEEN ORIGINAL MATERIALS AND DUPLICATE MATERIALS
- 2206 MATERIAL MAPPED?
  - YES →
  - NO ↓
- 2208 CREATE AND MAP NEW MATERIAL TO THE MATERIAL ASSOCIATED THE RENDERER
- 2210 ASSIGN MATERIAL TO SHADER ASSOCIATED WITH THE MAGNIFER
- 2212 RENDER MATERIAL THAT FALLS WITHIN THE BOUNDARIES OF THE MAGNIFIER, AND CULL GEOMETRY OUTSIDE OF THE BUBBLE

FIG. 22

SYSTEMS, METHODS, AND MEDIA FOR DISPLAYING INTERACTIVE AUGMENTED REALITY PRESENTATIONS

CROSS-REFERENCE TO RELATED APPLICATIONS

This application is a divisional of U.S. patent application Ser. No. 17/304,371 filed Jun. 18, 2021, which is a continuation-in-part of U.S. patent application Ser. No. 17/180,007 filed Feb. 19, 2021, which is a continuation of U.S. patent application Ser. No. 16/466,122, filed Jun. 3, 2019, which is the U.S. National Stage Entry of International Application PCT/US2017/064781, filed Dec. 5, 2017, which claims the benefit of, and claims priority to U.S. Provisional Application No. 62/430,179, filed Dec. 5, 2016, U.S. Provisional Application No. 62/479,214, filed Mar. 30, 2017, U.S. Provisional Application No. 62/492,832, filed May 1, 2017, U.S. Provisional Application No. 62/560,869, filed Sep. 20, 2017. This application also claims the benefit of, and claims priority to U.S. Provisional Application No. 63/040,741, filed Jun. 18, 2020, and U.S. Provisional Application No. 63/049,505, filed Jul. 8, 2020. Each of the preceding applications is hereby incorporated herein by reference in its entirety for all purposes.

STATEMENT REGARDING FEDERALLY SPONSORED RESEARCH

N/A

BACKGROUND

Devices for presenting augmented reality content and/or virtual reality content have recently become more prevalent. It is relatively easy to present virtual reality content to a group of individuals that may or may not share a physical space, as the experience is completely immersive and the content can be presented in a common frame of reference into which one or more users can be inserted. For example, a virtual reality presentation can include a scene captured by one or more cameras (e.g., a nature scene, a sporting event, etc.), and multiple users accessing the content can be placed in the same location within the content, but those users may be presented with different fields of view depending on the orientation selected by the user. As another example, a virtual reality presentation can include computer generated content, and users can participate in an interactive experience in which the various users can be placed within the computer generated content at various locations, and may be able to interact with one another. In such an example, the content can have a universal frame of reference, and the content presented to a user can be based on the user's location and orientation with respect to the universal frame of reference. Although virtual reality content has the potential to allow for interaction between users within the context of the content, interaction between users in their physical space is severely limited due to the completely immersive nature of virtual reality. By contrast, while devices that present augmented reality content can allow users to interact with the physical environment and each other with relative ease, presenting the same content to multiple users is more difficult as different augmented reality devices used by users in the same room may not use the same coordinate system. Accordingly, even if different users were viewing the same augmented reality content, the content may not be presented in correspondence with the same physical space, may have a different orientation, etc. Moreover, augmented reality devices generally are not configured to coordinate to present content according to instructions from a presenter.

Accordingly, new systems, methods, and media for displaying interactive augmented reality presentations are desirable.

SUMMARY

In accordance with some embodiments of the disclosed subject matter, systems, methods, and media for displaying interactive augmented reality presentations are provided.

In accordance with some embodiments of the disclosed subject matter, a system for designating content display locations for mixed reality presentations is provided, the system comprising: a head mounted display comprising: a transparent display; a plurality of sensors; and at least one processor, wherein the at least one processor is programmed to: receive input indicating that a content display location is to be designated; determine, based on data received from at least one of the plurality of sensors, a particular location within a physical environment of the head mounted display with which the content display location is to be associated; and associate the content display location with the particular location.

In some embodiments, the plurality of sensors comprises an optical sensor, and wherein the data received from at least one of the plurality of sensors comprises image data received from the optical sensor.

In some embodiments, the at least one processor is further programmed to: identify an object in the image data; and select the particular location to correspond to the physical location of the object identified in the image data.

In some embodiments, the at least one processor is further programmed to: receive the input from a user input device that is in communication with the head mounted display.

In some embodiments, the at least one processor is further programmed to: receive an indication that the content display location is to be a main content display location; and store an indication that the content display location is the main content display location.

In some embodiments, the at least one processor is further programmed to: cause information indicative of the particular location to be provided to another device.

In accordance with some embodiments of the disclosed subject matter, a system for displaying interactive mixed reality presentations is provided, the system comprising: a head mounted display comprising: a transparent display; a plurality of sensors; and at least one processor, wherein the at least one processor is programmed to: select a content display location of a plurality of predetermined content display locations to use to present content based at least in part on a location of the head mounted display within a current physical environment; and cause content to be presented by the head mounted display anchored at the selected content display location.

In some embodiments, the at least one processor is further programmed to: determine that a main content display location is not mandated for displaying content; in response to determining that the main content display location is not mandated for displaying content, determine that at least one other content display location exists within a current physical environment in addition to the main content display location, wherein the plurality of predetermined content display locations comprises the main content display location and the at least one other content display location.

In some embodiments, the at least one processor is further programmed to: determine, at a time subsequent to determining that a main content display location is not mandated for displaying content, that the main content display location is mandated for displaying content; in response to determining that the main content display location is mandated for displaying content, cause content to be presented using the main content display location.

In some embodiments, the at least one processor is further programmed to: receive, from a server, an indication that the main content display location is mandated for displaying content; and in response to the indication that the main content display location is mandated for displaying content, determine, at the time subsequent to determining that a main content display location is not mandated for displaying content, that the main content display location is mandated for displaying content.

In some embodiments, the at least one processor is further programmed to: determine that content to be presented is associated with an indication that the main content display location is mandated for displaying the content to be presented; and in response to the indication that the main content display location is mandated for displaying the content to be presented, determine, at the time subsequent to determining that a main content display location is not mandated for displaying content, that the main content display location is mandated for displaying content.

In some embodiments, the at least one processor is further programmed to: receive, from another device, information indicative of the locations of the plurality of predetermined content display locations.

In some embodiments, the at least one processor is further programmed to: determine that the head mounted display is within a threshold distance of the selected content display location; and select the selected content display location responsive to determining that the head mounted display is within the threshold distance of the selected content display location.

In some embodiments, the at least one processor is further programmed to: identify which of the plurality of predetermined content display locations are within a field of view of the head mounted display; and select, from among content display locations within the field of view of the head mounted display, the closest content display location as the selected content display location.

In some embodiments, the at least one processor is further programmed to: cause a first user interface element having a first spherical boundary to be presented with the content such that a portion of the content is within the first spherical boundary; cause a second user interface element having a second spherical boundary to be presented in connection with the content, wherein the second user interface element has a larger diameter than the first user interface element; cause a magnified version of the portion of the content that is within the first spherical boundary to be presented within the second user interface element; and inhibit presentation of a magnified version of the content that corresponds to portions that fall outside of the first spherical boundary.

In accordance with some embodiments of the disclosed subject matter, a system for displaying interactive mixed reality presentations is provided, the system comprising: a head mounted display comprising: a display; and at least one processor, wherein the at least one processor is programmed to: cause 3D content to be presented by the head mounted display anchored at a location; cause a first user interface element having at least one boundary to be presented with the 3D content such that a portion of the 3D content is within the at least one boundary; cause a second user interface element having at least one boundary to be presented in connection with the 3D content; and cause a scaled version of the portion of the 3D content that is within the at least one boundary to be presented within the second user interface element.

In some embodiments, the first user interface element comprises a sphere, and wherein the second user interface element comprises a sphere.

In some embodiments, the at least one processor is further programmed to: cause a third user interface element to be presented in connection with the first user interface element, wherein the third user interface element indicates a viewing direction of the content to be presented within the second user interface element.

In some embodiments, the at least one processor is further programmed to: generate a duplicate of the 3D content; associate the duplicate of the 3D content with the second user interface element; and scale the duplicate of the 3D content based on a size of the first user interface element.

In some embodiments, the at least one processor is further programmed to: compare a size of the first user interface element to a reference size; determine a scale factor S associated with the first user interface element based on the comparison; determine a scale factor s associated with the second user interface element based on an inverse of the scale factor S; and scale the scaled version of the content using the scale factor s.

In some embodiments, the at least one processor is further programmed to: inhibit presentation of portions of the scaled version of the 3D content that fall outside the second user interface element.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 21 shows an example of a process for matching an inverse transform in connection with displaying magnified interactive mixed reality content in accordance with some embodiments of the disclosed subject matter.

FIG. 22 shows an example of a process for rendering magnified interactive mixed reality content in accordance with some embodiments of the disclosed subject matter.

DETAILED DESCRIPTION

Figure 1:
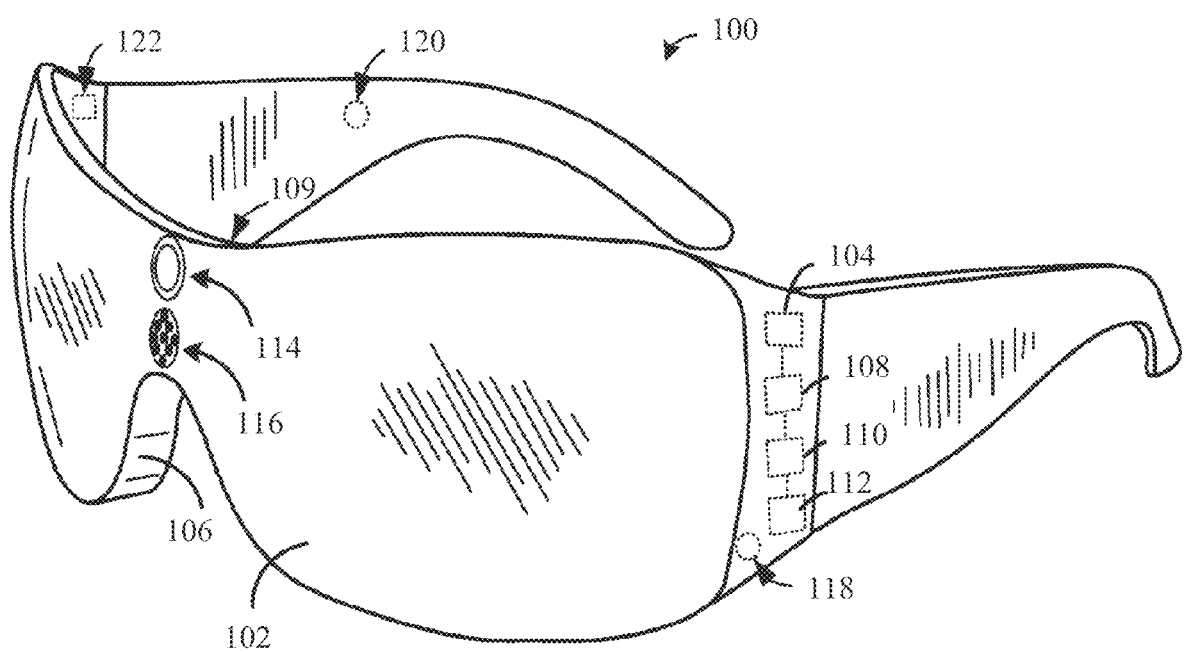
FIG. 1 shows an example of a head mounted display that can be used in accordance with some embodiments of the disclosed subject matter.

Before any embodiments of the disclosed subject matter are explained in detail, it is to be understood that the disclosed subject matter is not limited in its application to the details of construction and the arrangement of components set forth in the following description or illustrated in the following drawings. The disclosed subject matter is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the disclosed subject matter. Various modifications to the illustrated embodiments will be readily apparent to those skilled in the art, and the generic principles herein can be applied to other embodiments and applications without departing from embodiments of the disclosed subject matter. Thus, embodiments of the disclosed subject matter are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosed subject matter. Skilled artisans will recognize the examples provided herein have many useful alternatives and fall within the scope of embodiments of the disclosed subject matter.

In accordance with some embodiments of the disclosed subject matter, mechanisms (which can include systems, methods and/or media) for displaying interactive augmented reality presentations are provided. In some embodiments, a user can generate an interactive presentation that is to be presented using augmented reality devices. For example, an instructor can create and/or select content to be used in displaying various holograms (e.g., 3D models, charts, 2D graphics, etc.) to aid in the understanding of concepts that the instructor is trying to convey to students. In a more particular example, the instructor can create a variety of different holograms showing different aspects of human anatomy.

In some embodiments, a user can select different portions of the interactive presentation for presentation at different physical locations, different virtual locations, and/or different times. For example, the instructor can place different 3D models of human anatomy that illustrate different concepts (or the same concepts in different ways) into an ordered presentation, and/or can assign the different 3D models of human anatomy to different physical locations (e.g., stations as described below in connection with FIG. 2) and/or virtual locations (e.g., presentation spaces within a virtual museum, as described below in connection with FIGS. 10 and 11). In a more particular example, the instructor can discuss what is shown in a series of 3D models (e.g., in a similar fashion to a slide show), while students have the opportunity to move around the models freely while listening to and/or interacting with the instructor. After finishing the presentation, the different models can be presented at different physical and/or virtual locations (e.g., in accordance with instructions entered by the instructor when constructing the presentation), and students can freely move between the different models to further explore the concepts discussed in class.

In some embodiments, a user can use one or more user input devices to highlight one or more locations in content that is being presented through an augmented reality device worn by the user. The same location(s) can be highlighted by other augmented reality devices that are presenting that same content to one or more other users. For example, an instructor can use the augmented reality device to view a 3D model, and can use the augmented reality device and/or a separate device as a virtual "laser pointer" to highlight one or more features in the 3D model being presented by the augmented reality device worn by the instructor. In such an example, a corresponding pointer can be replicated by other augmented reality devices worn by the instructor's students at the same place on the same 3D model.

In some embodiments, multiple augmented reality devices can be networked with a common server or servers to provide relevant content based on time and/or the location of the augmented reality devices. For example, as described above, the instructor can assign different 3D models to different physical spaces. In such an example, the server can transmit only the content for the space closest to a particular student. This can allow for the instructor to make a large amount of content available, without overwhelming the individual augmented reality devices. Additionally or alternatively, this can allow for collaboration between different students (or other users) by making inputs provided by a first user (e.g., via a "laser pointer" used by the instructor) available to be seen on a hologram projected by a second user's device (e.g., a student's augmented reality device). Further, providing content and/or instructions from the server to similarly situated augmented reality devices can facilitate collaboration by wearers of the different augmented reality devices by insuring that the various augmented reality devices are all presenting the same content.

Although the mechanisms described herein are generally described in connection with use in a classroom setting, the mechanisms can be configured for use in a variety of applications. For example, the mechanisms described herein can be configured to provide interactive augmented reality museum displays, to provide multi-player augmented reality game experiences, to provide collaborative work spaces when creating 3D designs with a large amount of detail, etc.

FIG. 1 shows an example 100 of a head mounted display (HMD) that can be used in accordance with some embodiments of the disclosed subject matter. As shown in FIG. 1, head mounted display 100 can include a display processor 104 and a transparent display 102 that can be used to present images, such as holographic objects, to the eyes of a wearer of HMD 100. In some embodiments, transparent display 102 can be configured to visually augment an appearance of a physical environment to a wearer viewing the physical environment through transparent display 102. For example, in some embodiments, the appearance of the physical environment can be augmented by graphical content (e.g., one or more pixels each having a respective color and brightness) that is presented via transparent display 102 to create a mixed reality (or augmented reality environment). Note that as used herein, mixed reality and augmented reality are meant to convey similar experiences, but a mixed reality environment is intended to convey a more immersive environment than an augmented reality environment. Additionally or alternatively, in some embodiments, transparent display 102 can be configured to render a fully opaque virtual environment (e.g., by using one or more techniques to block the physical environment from being visible through HMD 100). In some embodiments, a non-transparent display can be used in lieu of transparent display 102. In some such embodiments, one or more cameras can be used to generate a real-time representation of at least a portion of the physical environment in which HMD 100 is located. For example, an HMD with a non-transparent display can simulate a mixed reality environment using images of a physical environment and graphics (e.g., 3D models) displayed with the images of the physical environment as though the graphics are physically present within the physical environment. In some such embodiments, HMD 100 can be used to present a virtual reality environment.

As shown in FIG. 1, in some embodiments, transparent display 102 can include one or more image producing elements (e.g., display pixels) located within lenses 106 (such as, for example, pixels of a see-through Organic Light-Emitting Diode (OLED) display). Additionally or alternatively, in some embodiments, transparent display 102 can include a light modulator on an edge of the lenses 106.

In some embodiments, HMD 100 can include various sensors and/or other related systems. For example, HMD 100 can include a gaze tracking system 108 that can include one or more image sensors that can generate gaze tracking data that represents a gaze direction of a wearer's eyes. In some embodiments, gaze tracking system 108 can include any suitable number and arrangement of light sources and/or image sensors. For example, as shown in FIG. 1, the gaze tracking system 108 of HMD 100 can utilize at least one inward facing sensor 109. In some embodiments, a user can be prompted to permit the acquisition and use of gaze information to track a position and/or movement of the user's eyes.

In some embodiments, HMD 100 can include a head tracking system 110 that can utilize one or more motion sensors, such as motion sensors 112 shown in FIG. 1, to capture head pose data that can be used to track a head position of the wearer, for example, by determining the direction and/or orientation of a wearer's head. In some embodiments, head tracking system 110 can include an inertial measurement unit configured as a three-axis or three-degree of freedom position sensor system.

In some embodiments, head tracking system 110 can also support other suitable positioning techniques, such as Global Positioning System (GPS) or other global navigation systems, indoor position tracking systems (e.g., using Bluetooth low energy beacons), etc. Further, while specific examples of position sensor systems have been described, it will be appreciated that any other suitable position sensor systems can be used. For example, head pose and/or movement data can be determined based on sensor information from any suitable combination of sensors mounted on the wearer and/or external to the wearer including but not limited to any number of gyroscopes, accelerometers, inertial measurement units (IMUs), GPS devices, barometers, magnetometers, cameras (e.g., visible light cameras, infrared light cameras, time-of-flight depth cameras, structured light depth cameras, etc.), communication devices (e.g., Wi-Fi antennas/interfaces, Bluetooth, etc.), etc.

In some embodiments, HMD 100 can include an optical sensor system that can utilize one or more outward facing sensors, such as optical sensor 114, to capture image data of the environment. In some embodiments, the captured image data can be used to detect movements captured in the image data, such as gesture-based inputs and/or any other suitable movements by a user waring HMD 100, by another person in the field of view of optical sensor 114, or by a physical object within the field of view of optical sensor 114. Additionally, in some embodiments, the one or more outward facing sensor(s) can capture 2D image information and/or depth information from the physical environment and/or physical objects within the environment. For example, the outward facing sensor(s) can include a depth camera, a visible light camera, an infrared light camera, a position tracking camera, and/or any other suitable image sensor or combination of image sensors.

In some embodiments, a structured light depth camera can be configured to project a structured infrared illumination, and to generate image data of illumination reflected from a scene onto which the illumination is projected. In such embodiments, a depth map of the scene can be constructed based on spacing between features in the various regions of an imaged scene. Additionally or alternatively, in some embodiments, a continuous wave time-of-flight depth camera, a pulsed time-of-flight depth camera or other sensor (e.g., LiDAR), etc. In some embodiments, illumination can be provided by an infrared light source 116, and/or a visible light source.

In some embodiments, the HMD 100 can include a microphone system that can include one or more microphones, such as microphone 118, which can capture audio data. In some embodiments, audio can be presented to the wearer via one or more speakers, such as speaker 120.

In some embodiments, HMD 100 can include a controller, such as controller 122, which can include, for example, a processor and/or memory (as described below in connection with FIG. 4) that are in communication with the various sensors and systems of HMD 100. In some embodiments, controller 122 can store, in memory, instructions that are executable by the processor to receive signal inputs from the sensors, determine a pose of HMD 100, and adjust display properties for content displayed using transparent display 102.

In some embodiments, HMD 100 can have any other suitable features or combination of features, such as features described in U.S. Pat. No. 9,495,801 issued to Microsoft Technology Licensing, LLC, which is hereby incorporated by reference herein in its entirety. The description herein of HMD 100 is merely for illustration of hardware that can be used in connection with the disclosed subject matter. However, the disclosed subject matter can be used with any suitable mixed reality device and/or augmented reality device, such as the HoloLens® made by Microsoft®, and/or devices described in U.S. Pat. Nos. 8,847,988, 8,941,559, and U.S. Patent Application Publication No. 2014/0160001, each of which is hereby incorporated by reference herein in its entirety.

Figure 2:
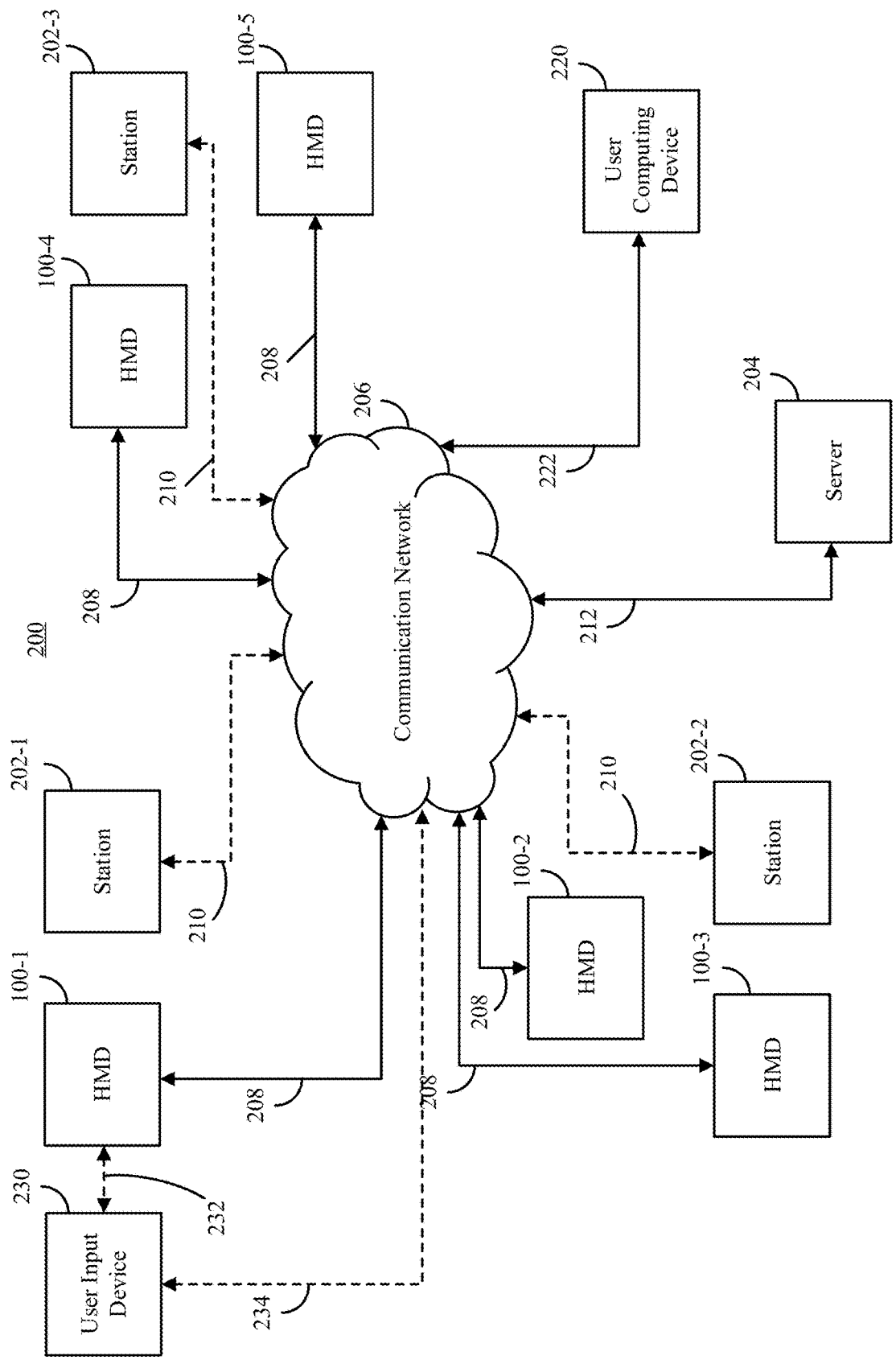
FIG. 2 shows an example of a system of networked head mounted displays in accordance with some embodiments of the disclosed subject matter.

FIG. 2 shows an example 200 of a system of networked HMDs 100 in accordance with some embodiments of the disclosed subject matter. As shown in FIG. 2, system 200 can include various HMDs 100-1 to 100-5 located in the same physical space (e.g., in the same room). System 200 can include various stations 202-1 to 202-3 (which are sometimes referred to herein as pods), which can correspond to points in physical space at which one or more images are to be displayed by HMDs 100. For example, each station 202 can be used by HMDs 100 as a predetermined spatial anchor for one or more images. In a more particular example, stations 202 can define spatial anchors for images to be displayed by an HMD (e.g., HMD 100) if the HMD is instructed to present an image corresponding to the station as long as the station is in the field of view, even if the HMD moves relatively far from the station (e.g., more than five meters from the station). In another more particular example, stations 202 can define spatial anchors for images to be displayed by an HMD (e.g., HMD 100) if the HMD is instructed to present an image corresponding to a particular station or any station that satisfies one or more criteria (e.g., based on distance, filed of view, etc.), even if the HMD moves relatively far from the stations (e.g., more than five meters from the station).

As another example, each station 202 can be used to define a coordinate system in which HMDs 100 can place one or more images. In a more particular example, stations 202 can define the origin of a global coordinate system in which an HMD (e.g., HMD 100) is instructed to present an image corresponding to the station only when the user is relatively close to a particular station and/or when the HMD is instructed to only present one or more images corresponding to the nearest station in the field of view (e.g., as described below in connection with system 200 and in connection with FIG. 6). In another more particular example, stations 202 can define the origin of a global coordinate system in which an HMD (e.g., HMD 100) is instructed to present an image only when the user is relatively close to a particular station and/or when the HMD is instructed to only present one or more images corresponding to the nearest station in the field of view.

In some embodiments, each station 202 can be passive and/or active. For example, one or more stations 202 can be a piece of paper or other physical medium having a particular symbol (e.g., letter, number, icon, QR code, etc.) that can be recognized by HMD 100 (e.g., from an image captured by optical sensor 114). As another example, one or more stations 202 can be a particular object or portion of an object (e.g., a piece of furniture, a portion of flooring, an action figure, a toy, etc.) that can be recognized by HMD 100 (e.g., from an image captured by optical sensor 114). Such physical objects, with or without symbols, can be referred to as image targets. As yet another example, one or more stations 202 can be associated with a coordinate in reference to another object. As still another example, one or more stations 202 can be an active device such as a Bluetooth device (e.g., a Bluetooth low energy beacon) that can communicate with HMD 100. As a further example, stations 202 can be an active or passive RFID device with which HMD 100 can communicate (e.g., including unidirectional communication from the RFID device). In some embodiments, locations of stations 202 can be highlighted visually by an HMD 100 (e.g., HMDs 100-1 to 100-5) to assist users in moving to the various stations and/or locating the stations. For example, one or more stations 202 in a user's field of view can be represented by an image of a ball, text, an outline of the content to be presented in connection with the station, and/or any other suitable visual aid.

In some embodiments, system 200 can include a server 204 that can control content that is to be presented in connection with each station. In some embodiments, server 204 can be implemented using any suitable computing device such as a server computer, an HMD, a tablet computer, a smartphone, a personal computer, a laptop computer, etc. In some embodiments, each HMD 100 can connect to communication network 206 via a communications link 208, and server 204 can connect to communication network 206 via a communications link 212. In some such embodiments (e.g., embodiments in which stations 202 are active devices), stations 202 can connect to communication network 206 via a communications link 210. In some embodiments, a user computing device 220 can connect to communication network 206 via a communications link 222. Communication network 206 can be any suitable communication network or combination of communication networks. For example, communication network 206 can be a Wi-Fi network (which can include one or more wireless routers, one or more switches, etc.), a peer-to-peer network (e.g., a Bluetooth network, a Zigbee mesh network, etc.), a cellular network (e.g., a 3G network, a 4G network, etc., complying with any suitable standard, such as CDMA, GSM, LTE, LTE Advanced, WiMAX, etc.), a wired network, etc. Communications links 208, 210 and 212 can each be any suitable communications link or combination of communications links, such as a Wi-Fi links, Bluetooth links, cellular links, etc.

In some embodiments, a user can interact with server 204 via user computing device 220 to select content that is to be presented in connection with each station 202. For example, the user can instruct server 204 to cause HMDs in proximity to station 202-2 to present images showing an interactive 3D model of the human vascular system in the absence of certain other anatomical features (e.g., in the absence of muscles, in the absence of the skeletal system, etc.), while the user can instruct server 204 to cause HMDs in proximity to station 202-3 to present images showing an interactive 3D model showing how the vascular system integrates into certain major muscle groups. Note that these are merely given as examples, and the user can select any suitable content to be presented in connection with each station. In some embodiments, the user can instruct server 204 to present different content for each station, such that server 204 causes HMDs 100 to present different content for each station 202. In some such embodiments, wearers of HMDs 100 can move between stations to observe different content at each station, which the user may have selected to demonstrate different concepts. Additionally or alternatively, in some embodiments, the user can instruct server 204 to present the same content at each station or a subset of stations (e.g., the same content can be presented at each auxiliary station, while different content can be presented at a main station). For example, in such embodiments, students in a class can all follow along as an instructor discusses certain content that is being displayed by all HMDs 100 in system 200 regardless of which station each HMD 100 is located near. In some embodiments, the user can specify the location of one or more stations 202 in relation to one or more reference points (e.g., locations in a room, reference points in relation to a particular device, etc.).

In some embodiments, the user can generate a presentation to be presented in connection with one or more stations 202 via user computing device 220 and/or server 204. Such a presentation can include, for example, which content is to be presented at each station, times (e.g., a length of time, a period of time during the presentation, etc.) at which the content is to be presented at the stations, an order in which content is to be presented at each station (and/or across all stations), which content is to be presented to which HMD 100 and/or which user associated with an HMD 100, and/or any other suitable information. In some embodiments, such a presentation can be conveyed by server 204 to each HMD 100 at the time of the presentation as a document referencing the content that is to be presented, the order in which it is to be presented, a time(s) at which it is to be presented, which content is to be presented in connection with each station, etc. For example, server 204 can send an XML file that an HMD 100 can use to generate the presentation from the content already loaded on HMD 100.

In some embodiments, the user can upload content and/or identifying information of content to server 204 that is to be presented by HMDs 100 from user computing device 220. For example, the user can upload anatomical models from user computing device 220 to server 204 that can be used (e.g., by HMDs 100) to generate a 3D representation of one or more anatomical features. As another example, the user can provide location information (e.g., a URL) at which one or more anatomical models can be accessed. In some embodiments, the HMDs 100 can download and/or save the content at any suitable time. For example, an administrator can download, sideload and/or otherwise transfer the content to each HMD 100 to be used during presentation of augmented reality content and/or other presentation of such content. In a more particular example, if HMDs 100 are owned by an institution, a user associated with the institution can preload the content on each of HMD 100. As another example, in some embodiments, a user of an HMD 100 can download an application that can be used to present the content. In such an example, the user uploading the content can associate the content with the application, and the content can be downloaded with the application and/or by the application after the application is installed on the HMD. As yet another example, in some embodiments, a user of an HMD 100 can select content to be downloaded and/or content can be downloaded automatically based on information known about the user. In a more particular example, the user can be permitted to download the content based on the user's registration to participate in an event (e.g., a class) associated with the content. In another more particular example, the content can be automatically downloaded based on the user's association with the event (e.g., class) during which the content is to be presented. As still another example, the content can be streamed and/or downloaded in an on-demand fashion as the content is needed by an HMD 100. In some embodiments, the user can be prompted to pay for the content and/or sign up for a subscription to the content.

In some embodiments, user computing device 220 can be any suitable computing device or combination of devices, such as a personal computer, a laptop computer, a tablet computer, a smartphone, a wearable computer, a head mounted display (e.g., HMD 100), etc. In some embodiments, a user can select content, generate a presentation, upload content, etc., using user computing device 220 and/or server 204 using any suitable technique or combination of techniques. For example, user computing device 220 can execute a presentation application from memory that is configured to generate and/or edit presentations of content for any suitable number of stations and/or any suitable number of HMDs. As another example, user computing device 220 can interact with a presentation application executed by another computing device (e.g., server 204, a cloud server, etc.) through network 206 via a web browser executed by computing device 220 or other application that facilitates interaction with a remotely executed presentation application.

In some embodiments, each HMD 100 can execute an application that can interact with server 204 (e.g., over communication network 206) to present content associated with each station. For example, when a particular HMD 100 comes within a predetermined distance of a station (e.g., when HMD 100-2 approaches station 202-2) server 204 can provide content associated with station 202-2. As another example, when a particular HMD 100 determines that a particular station is a station to be used to present content (e.g., as described below in connection with FIGS. 15, 16, 17, and/or 18), server 204 can provide content associated with that station. Networking the HMDs 100 with server 204 can facilitate HMDs 100 in presenting more content than an HMD 100 would be able to present from memory. Further, networking the HMDs 100 with server 204 can facilitate a presenter (e.g., a user of HMD 100-1) in controlling the content that is being presented by the various other HMDs 100 during an interactive presentation.

In some embodiments, system 200 can determine which content is to be presented by a particular HMD 100 using any suitable technique or combination of techniques. For example, HMD 100 can determine which station (or stations) it is closest to, and can request content associated with that station from server 204 and/or can present content associated with that station from memory. In such an example, HMD 100 can use any suitable technique to determine which station 202 (or stations) is closest, such as by analyzing image data captured by an outward facing camera (e.g., optical sensor 114), analyzing the strength of various signals (e.g., Bluetooth signals) received from various stations 202, analyzing GPS coordinates of HMD 100 determined using a GPS receiver, etc. As another example, HMD 100 can provide information (e.g., one or more images, signal strength of various signals, GPS coordinates, etc.) to server 204, which can determine which station (or stations) is closest to HMD 100. As yet another example, server 204 can receive information from stations 202 indicating which HMDs are closest to the station (e.g., as a list of HMDs that are closer to that station than other nearby stations, as a distance from the station to various HMDs, etc.) based on any suitable data (e.g., signal strength of a Bluetooth signal received by the station from the various HMDs). In such an example, each station can coordinate with other nearby stations such that each HMD is listed indicated by only a single station.

As still another example, HMD 100 can determine a station (or stations) for which to present content, and can request content associated with that station (or stations) from server 204 and/or can present content associated with that station (or stations) from memory. In such an example, HMD 100 can use any suitable technique to determine a station 202 (or stations) at which to present content, such as by analyzing image data captured by an outward facing camera (e.g., optical sensor 114), analyzing the strength of various signals (e.g., Bluetooth signals) received from various stations 202, analyzing GPS coordinates of HMD 100 determined using a GPS receiver, etc. As a further example, HMD 100 can provide information (e.g., one or more images, signal strength of various signals, GPS coordinates, etc.) to server 204, which can determine which station (or stations) to select for an HMD 100. As another further example, server 204 can receive information from stations 202 indicating which HMDs are within a threshold distance of the station (e.g., as a distance from the station to various HMDs) based on any suitable data (e.g., signal strength of a Bluetooth signal received by the station from the various HMDs). In such an example, each station can coordinate with other nearby stations such that each HMD is indicated by only a single station.

In some embodiments, HMD 100 can determine that different content is to be presented at any suitable time. For example, HMD 100-2 can determine that HMD 100-2 has left the vicinity of station 202-2 and approached station 202-3, and can based on that determination, can present and/or request content for station 202-3 in response to determining that HMD 100-2 has approached station 202-3. As another example, HMD 100-2 can determine that HMD 100-2 has left the vicinity of station 202-2 and is pointed toward station 202-3, and based on that determination can present and/or request content for station 202-3 in response to determining that station 202-3 is a closest station within the field of view of a user of HMD 100-2.

Additionally or alternatively, in some embodiments, server 204 can push instructions and/or content to HMD 100-2 at any suitable time. For example, server 204 can determine that HMD 100-2 has left the vicinity of station 202-2 and approached station 202-3, and can push instructions to present the content (and/or can push the content itself) associated with station 202-3 to HMD in response to determining that HMD 100-2 has approached station 202-3. As another example, server 204 can receive an instruction to change the content being presented by any suitable station 202 or stations (e.g., from a presenter). In response to such an instruction, server 204 can push an instruction to present the new content (and/or the new content itself) to appropriate HMDs 100. As yet another example, server 204 can receive instructions assigning particular HMDs 100 to receive particular content at particular times. In such an example, a wearer of a particular HMD 100 can be prompted to move to and/or look at an assigned station for which HMD 100 is presenting content after receiving an indication that the content is associated with the station from server 204 (and/or after receiving the content itself).

As still another example, server 204 can determine that HMD 100-2 has left the vicinity of station 202-2 and is pointed toward station 202-3, and can push instructions to present the content (and/or can push the content itself) associated with station 202-3 to HMD 100-2 in response to determining that station 202-3 is a closest station within the field of view of a user of HMD 100-2. As a further example, server 204 can receive an instruction to change the content being presented by any suitable station 202 or stations (e.g., from a presenter). In response to such an instruction, server 204 can push an instruction to present the new content (and/or the new content itself) to appropriate HMDs 100.

In some embodiments, one or more stations 202 can be used by a presenter to control what is being presented by HMDs near other stations. For example, in some embodiments, a wearer of HMD 100-1 can interact with content presented at station 202-1 using any suitable user interface device(s) to control content that is being presented at one or more of stations 202-2 and 202-3 (and/or any other suitable stations). In such an example, the wearer of HMD 100-1 can use any suitable input device or combination of devices, such as voice inputs to a voice recognition system, gestures as inputs to a gesture recognition system (e.g., integrated into HMD 100-1), an input device of another computing device (e.g., a touchscreen of a computing device such as a smartphone, a tablet computer, a laptop computer, etc.; a mouse and/or keyboard of a computing device such as a laptop computer, a personal computer, etc.), a dedicated input device (e.g., e.g., a user input device 230), etc. In some embodiments, sever 204 can communicate additional information to HMDs 100 during presentation of content, such as instructions for one or more of HMDs 100 about how to present the content and/or additional content to be presented. For example, as described below in connection with FIGS. 3A and 3B, a user of a first HMD 100-1 can use an input device to point (e.g., via a line through space, a dot on the content, the user's hand, etc.) to a particular portion of the content being presented by HMD 100-1, and server 204 can send instructions to one or more other HMDs 100 presenting the same content that causes each of those HMDs to present supplemental content showing that the user of HMD 100-1 is pointing to a particular portion of the content. In some embodiments, such additional information can be used to control presentation of content by HMDs 100. For example, a user of HMD 100-1 can control a presentation via input to HMD 100-1 (and/or any other suitable device), and one or more other HMDs 100 can receive instructions and/or content from server 204 that cause the one or more other HMDs 100 to change which content is being presented in accordance with the input from the user of HMD 100-1. In some embodiments, an HMD 100 can access a recording of a presentation (e.g., including changes to which content is presented), and the instructions that were sent by server 204 during the presentation can be included (e.g., as a file) with the recording (which can include, e.g., a document indicating which content to present) and/or can stream the instructions as the recording is presented by HMD 100. For example, an HMD 100 can present a particular 3D model in accordance with a first portion of a presentation, and can present a pointer in association with the 3D model based on instructions that were sent by server 204 during presentation of the 3D model during the presentation. In such an example, audio that was recorded during the presentation can also be presented to the user (e.g., through speakers 120). This can facilitate a user experiencing the presentation as it was experienced by users that were present when the presentation was given.

In some embodiments, audio information can also be associated with each station, which can be presented in connection with the visual content by HMD 100. Additionally or alternatively, in some embodiments, audio can be recorded at each station (e.g., by hardware that is part of station 202 and/or by microphone 118 of one or more HMDs 100). In some embodiments, audio can be recorded at the request of the wearer of a particular HMD 100 for later access (e.g., as a study aid).

Although HMDs 100-1 to 100-5 are described above as being local to each other (e.g., in the same room), HMDs in system 200 can be located local to each other and/or remote from each other. For example, system 200 can be used to collaborate and/or interact with one or more wearers of HMDs 100 located in one or more remote locations. In some embodiments, two HMDs 100 can be remote from each other if there is not a line of sight between them. For example, two HMDs 100 can be considered remote from each other if they are located in different rooms, regardless of whether they are both connected to the same local area network (LAN) or to different networks. As another example, two HMDs 100 that are connected to different LANs can be considered remote from each other. As yet another example, two HMDs 100 that are connected to different subnets can be considered remote from each other. In some embodiments, for example as described below in connection with FIG. 3B, two HMDs 100 that are remote from each other can be used to collaborate by representing a remote user with an avatar in connection with a hologram being presented by at least one of the two HMDs 100.

In some embodiments, server 204 can be located locally or remotely from HMDs 100. Additionally, in some embodiments, multiple servers 204 can be used (which may be located in different physical locations) to provide different content, provide redundant functions, etc. In some embodiments, one of the HMDs 100 in system 200 can perform one or more of the operations of server 204 described herein, such as instructing other HMDs when to move through the presentation, for distributing updated information, etc. For example, local HMDs 100 in system 200 can be interconnected to form a mesh network, and an HMD acting as server 204 (e.g., HMD 100-1) can control operation of the other HMDs by providing updated information. Additionally, in some embodiments, the HMD acting as server 204 can be a node in the mesh network, and can communicate over another network (e.g., a LAN, cellular, etc.) to receive other information, such as information related to a remote user (e.g., as described below in connection with FIG. 3B). In some such embodiments, the HMD acting as server 204 can determine which HMD or HMDs to distribute information to that indicates that an avatar of a remote user is to be presented in connection with a hologram, placement information of the avatar, etc.

In some embodiments, a user of any suitable HMD (e.g., HMD 100-1) can control presentation of the content (e.g., in a similar manner to a slide show) by providing input to the HMD. For example, to progress through an augmented reality presentation, the user can tap a user input (e.g., a button, a touch sensor, etc.), and/or perform a gesture that can be captured by an image sensor (e.g., optical sensor 114). As another example, to go backward through the augmented reality presentation, the user can tap and hold the user input (e.g., hold a button, press and hold on a touch sensor, etc.), and/or perform a different gesture. In some embodiments, HMD 100-1 can generate instructions to move forward (or backward) through the augmented reality presentation, and transmit the instructions to server 204 (which may be another HMD), which can cause other HMDs to present new content in accordance with the user input received at HMD 100-1. Additionally or alternatively, in some embodiments, if HMD 100-1 is acting as server 204, HMD 100-1 can cause the other HMDs to present new content in accordance with the user input received at HMD 100-1 in response to receiving the input. Although system 200 is generally described in connection with presenting a mixed reality and/or an augmented reality presentation in a physical environment on a mixed reality device, the system can be configured to present any type of mixed reality (e.g., an augmented virtuality presentation), or a fully virtual reality presentation. For example, rather than stations 202 corresponding to locations in a physical environment, the stations can correspond to points in a virtual environment. Additionally or alternatively, in some embodiments, one or more HMDs in system 200 can be mixed reality devices and/or augmented reality devices, while other HMDs are virtual reality devices. For example, a remotely located user can use a virtual reality device to join a group at a particular station. In such an example, the virtual reality device can present the 3D model, avatars corresponding to other users (e.g., users of augmented reality devices located in physical proximity to the station, and/or other users of virtual reality devices) in positions relative to the 3D model representing the user's current view of the 3D model, etc. In some embodiments, a user of a virtual reality device can cause a view of the 3D model that is presented to change using any suitable technique, such as inputs received by a user input device (e.g., a game controller, a touchpad, etc.), outputs indicating physical movements of the user (e.g., rotations, translations, etc.), or any other suitable information, Additionally or alternatively, in some embodiments, a user of a virtual reality device can adopt the viewpoint of a mixed reality and/or an augmented reality device that is viewing the same 3D model. In some embodiments, a virtual reality device that is used to join a group around a particular station can present one or more portions of video captured at and/or near the station (e.g., by a camera that captures 360 degree video of the environment around the station) to generate a mixed reality presentation, can present the 3D model in a virtual environment (e.g., a virtual room, which may include other stations) that may or may not be similar to the physical environment of the station, or present only the 3D model and information about other users (e.g., present the 3D model in a blank environment (e.g., using a single background color).

In some embodiments, user input device 230 can communicate with HMD 100-1 via a communications link 232. In some embodiments, communications link 232 can be any suitable communications link that can facilitate communication between user input device 230 and HMD 100-1. For example, communications link 232 can be a wired link (e.g., a USB link, an Ethernet link, a proprietary wired communication link, etc.) and/or a wireless link (e.g., a Bluetooth link, a Wi-Fi link, etc.). In some embodiments, user input device 230 can include any suitable sensors for determining a position of user input device 230 with respect to one or more other devices and/or objects (e.g., HMD 100-1, station 202, a particular body part of a wearer of HMD 100-1, etc.), and/or a relative change in position (e.g., based on sensor outputs indicating that user input device 230 has been accelerated in a particular direction, that user input device 230 has been rotated in a certain direction, etc.). For example, in some embodiments, user input device 230 can include one or more accelerometers, one or more gyroscopes, one or more electronic compasses, one or more image sensors, an inertial measurement unit, etc. In some embodiment, in addition to or in lieu of communication link 232, user input device 230 can communicate with HMD 100-1, server 204, and/or any other suitable device(s) via a communication link 234. In some embodiments, communication link 234 can be any suitable communications link or combination of communications links, such as a Wi-Fi link, a Bluetooth link, a cellular link, etc.

In some embodiments, user input device 230 can be used as a pointing device by the wearer of HMD 100-1 to highlight a particular portion of content (e.g., a portion of a hologram being presented by HMD 100-1), to select a particular portion of the hologram, to cause a particular portion of the hologram to move in a particular way (e.g., in a "click and drag"-type action), etc. For example, a user interface element that highlights a particular region of the hologram can be presented in connection with the hologram in a location that is based on the direction in which user input device 230 is pointed in relation to the hologram. In some embodiments, a second HMD 100-2 that is presenting a second hologram that includes the same content that is being presented in the hologram presented by HMD 100-1 can also present the same user interface element and/or a user interface element at the same location on the hologram (e.g., based on instructions received from server 204, which can be implemented by an HMD such as HMD 100-1, HMD 100-2, and/or another HMD).

In some embodiments, user input device 230 can be used to manipulate the position of one or more bubbles used in a process for displaying magnified interactive mixed reality content (e.g., as described below in connection with FIGS. 19-22). In some embodiments, user input device 230 can be used to manipulate an orientation of magnified content in a process for displaying magnified interactive mixed reality content (e.g., as described below in connection with FIGS. 19-22).

In some embodiments, HMD 100-1 and/or server 204 can receive data from user input device 230 indicating movement and/or position data of user input device 230. Based on the data from user input device 230, HMD 100-1 and/or server 204 can determine a location and/or direction of a user interface element to be presented as part of holograms presented by HMDs presenting the same content as HMD 100-1 (and as part of any other hologram being presented by another HMD 100 presenting the same content). In a more particular example, HMD 100-1 and/or server 204 can determine a location and/or direction of a user interface element (e.g., a bubble used in a process for magnifying interactive mixed reality content) to be presented as part of holograms presented by HMD 100-1 and/or one or more other HMDs presenting the same content as HMD 100-1.

In some embodiments, user input device 230 can be an integral part of HMD 100-1, which can determine a direction in which HMD 100-1 is pointing with respect to content (which can be anchored at station 202-1 or any other suitable location). The information on which direction HMD 100-1 is pointing can be used to infer a direction in which the wearer's eyes are looking (which can, for example, be augmented based on gaze information, in some cases). In some embodiments, the inferred location at which the wearer of HMD 100 is looking can be used as input to position a user interface element with respect to the content (e.g., as a line, a dot, multiple dots, etc., showing where the wearer of HMD 100-1 is looking).

In some embodiments, user input device 230 can be a separate device that can convey location information to HMD 100-1 and/or server 204, which can then be used to generate a user interface element to show where the wearer of HMD 100-1 is pointing. Any suitable technique or combination of techniques can be used to generate the user interface element based on the location information of user input device 230.

Figure 3A:
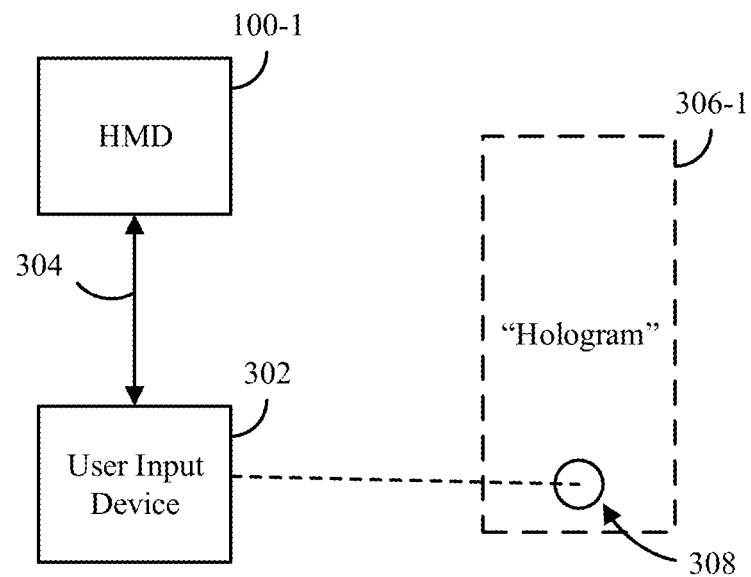
FIG. 3A shows an example of a system for interacting with a presented image in accordance with some embodiments of the disclosed subject matter.
Figure 3A:
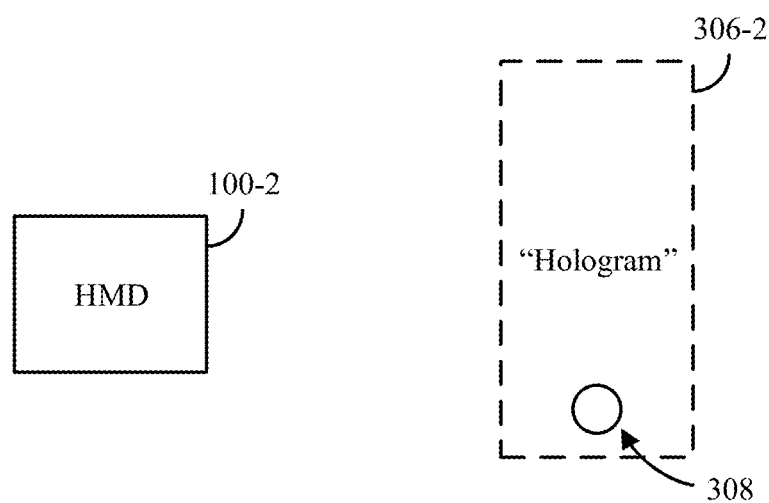

FIG. 3A shows an example 300 of a system for interacting with a presented image in accordance with some embodiments of the disclosed subject matter. As shown in FIG. 3A, a user input device 302 (e.g., an implementation of user input device 230) can communicate with HMD 100-1 via a communications link 304. In some embodiments, communications link 304 can be any suitable communications link that can facilitate communication between user input device 302 and HMD 100-1. For example, communications link 304 can be a wired link (e.g., a USB link, an Ethernet link, a proprietary wired communication link, etc.) and/or a wireless link (e.g., a Bluetooth link, a Wi-Fi link, etc.). In some embodiments, user input device 302 can include any suitable sensors for determining a position of user input device 302 with respect to one or more other devices and/or objects (e.g., HMD 100-1, station 202, a particular body part of a wearer of HMD 100-1, etc.), and/or a relative change in position (e.g., based on sensor outputs indicating that user input device 302 has been accelerated in a particular direction, that user input device 302 has been rotated in a certain direction, etc.). For example, in some embodiments, user input device 302 can include one or more accelerometers, one or more gyroscopes, one or more electronic compasses, one or more image sensors, an inertial measurement unit, etc.

In some embodiments, user input device 302 can be used as a pointing device by the wearer of HMD 100-1 to highlight a particular portion of content (e.g., a portion of hologram 306-1) being presented by HMD 100, to select a particular portion of hologram 306-1, to cause a particular portion of hologram 306-1 to move in a particular way (e.g., in a "click and drag"-type action), etc. For example, a user interface element 308 that highlights a particular region of hologram 306-1 can be presented in connection with hologram 306-1 in a location that is based on the direction in which user input device 302 is pointed in relation to hologram 306-1. As shown in FIG. 3A, a second HMD 100-2 that is presenting a second hologram 306-2 that includes the same content that is being presented in hologram 306-1 can also present user interface element 308 (e.g., based on instructions received from server 204, which may be implemented by an HMD such as HMD 100-1, HMD 100-2, and/or another HMD).

In some embodiments, HMD 100-1 and/or server 204 can receive data from user input device 302 indicating movement and/or position data of user input device 302. Based on the data from user input device 302, HMD 100-1 and/or server 204 can determine a location and/or direction of user interface element 308 to be presented as part of hologram 306-1 (and as part of any other hologram being presented by another HMD 100 presenting the same content as hologram 306-2).

In some embodiments, user input device 302 can be an integral part of HMD 100-1, which can determine a direction in which HMD 100-1 is pointing with respect to hologram 306-1 (which, as described above in connection with FIG. 2, can be anchored at station 202-1 or any other suitable location). The information on which direction HMD 100-1 is pointing can be used to infer a direction in which the wearer's eyes are looking (which can, for example, be augmented based on gaze information, in some cases). In some embodiments, the inferred location at which the wearer of HMD 100 is looking can be used as input to position user interface element 308 with respect to hologram 306-1 (e.g., as a line, a dot, multiple dots, etc., showing where the wearer of HMD 100-1 is looking).

In some embodiments, user input device 302 can be a separate device that can convey location information to HMD 100-1 and/or server 204, which can then be used to generate user interface element 308 to show where the wearer of HMD 100-1 is pointing. Any suitable technique or combination of techniques can be used to generate the user interface element based on the location information of user input device 302. For example, in some embodiments, HMD 100-1 and/or server 204 can determine a location of user input device 302 with respect to a part of the wearer's body (e.g., the center of the user's body, which can, for example, be inferred based on the location of HMD 100-1) and can draw a line that intersects that part of the wearer's body and user input device 302. As another example, in some embodiments, HMD 100-1 and/or server 204 can determine a location and/or orientation of user input device 302 with respect to hologram 306-1, and can draw a line from user input device 302 based on the location and orientation. In such an example, the location of user input device 302 may need to be calibrated more precisely than in the previous example, and may be calculated in the local coordinates of the hologram. Accordingly, in such an example, the accuracy of the location at which user interface element 308 is presented can vary based on the accuracy of the calibration, the distance from an anchor point (or other location reference) of hologram 306-1 (as distances farther from the anchor point may be determined less accurately), etc.

As yet another example, in some embodiments, HMD 100-1 and/or server 204 can receive a first input from user input device 302, which can signal that a wearer of HMD 100-1 is initiating the generation of user interface element 308 on hologram 306. Upon receiving the first user input (e.g., a first button press), HMD 100-1 and/or server 204 can generate user interface element 308 at a default location based on the wearer's current location relative to hologram 306-1 (e.g., a line straight out from the user's body toward the center of hologram 306-1). After the first button press, HMD 100 and/or server 204 can change the direction of the user interface element (e.g., the point at which the line crosses hologram 306-1 and/or the direction in which the line intersects hologram 306-1) based on output received from user input device 302. In such an example, after a first button press, the wearer can translate user interface device 302 to raise/lower and/or move left/right the point at which the line intersects hologram 306-1, and can rotate user input device 302 to change an orientation at which the line intersects hologram 306-1. Upon receiving a second user input, HMD 100-1 and/or server 204 can freeze the position and/or orientation of user interface element 308 with respect to hologram 306-1. Such a control scheme for the line to be presented in hologram 306-1 can have some similarity to the operation of a mouse for controlling a pointer (e.g., a cursor) in a 2D graphical user interface.

In some embodiments, HMDs 100 can be used to administer exams to users of HMDs 100. For example, a user of server 204 can create a presentation that causes content to be presented to HMDs 100 such that no two HMDs present the same content in the same orientation at the same location. That is, in such an example, rather than facilitating collaboration, the content can be distributed such that each user is presented with individualized content. In some embodiments, an administrative user (e.g., the instructor or proctor of the exam) can be permitted to be presented with the same content as any HMD 100 presenting exam content. In some embodiments, a user (e.g., a student) can use a pointing device, such as user input device 302, to point to a specific location in a hologram to provide an answer to an exam question. Additionally, in some embodiments, HMD 100 and/or server 204 can determine a location in the hologram the user is highlighting with the pointing device to automatically determine whether the user has correctly answered an exam question. For example, the user can be prompted to locate a particular muscle on an anatomical hologram, and server 204 can determine whether the location that the user is pointing to with user input device 302 corresponds to the muscle.

Figure 3B:
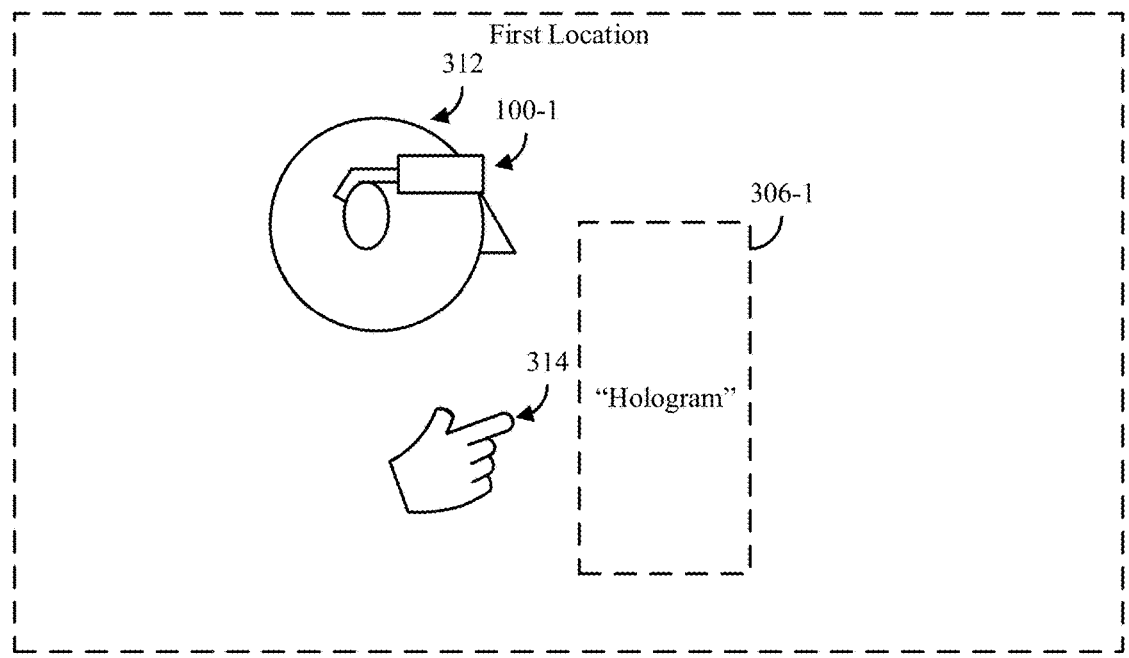
FIG. 3B shows an example of another system for interacting with a presented image in accordance with some embodiments of the disclosed subject matter.
Figure 3B:
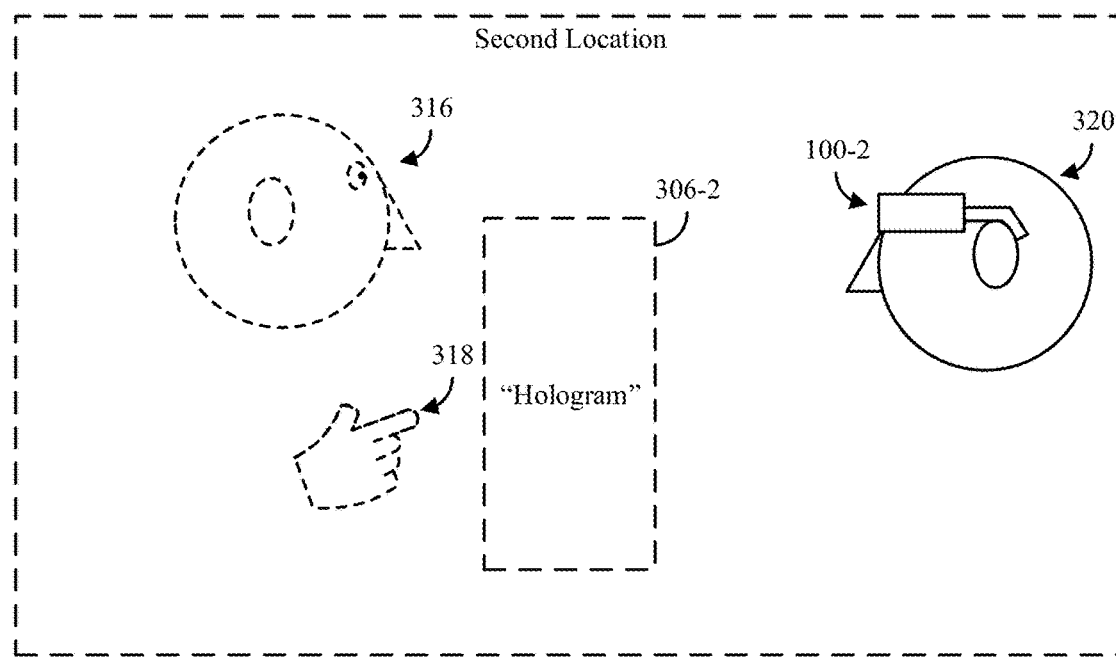

FIG. 3B shows an example 310 of another system for interacting with a presented image in accordance with some embodiments of the disclosed subject matter. As shown in FIG. 3B, a first HMD 100-1 worn by a first user 312 at a first location can present a hologram 306-1. In some embodiments, HMD 100-1 can track the position of a hand 314 of user 312 with respect to hologram 306-1. In some embodiments, HMD 100-1 can use any suitable technique or combination of techniques to track the location and/or orientation of the user's hand. For example, HMD 100-1 can track the location of the user's hand visually using images produced by one or more image sensors (e.g., optical sensor 114) and/or any other suitable data, such as depth information in a scene. As another example, HMD 100-1 can track the location of the user's hand using one or more sensors to sense a position of a device held by (or otherwise attached) to the user's hand.

In some embodiments, HMD 100-1 can transmit information to server 204 indicating the position of HMD 100-1 and the user's hand with respect to hologram 306-1. As shown in FIG. 3B, server 204 can transmit information to a second HMD 100-2 presenting a hologram 306-2 that includes the same content as hologram 306-1, where the information can indicate a position at which to present an avatar 316 representing user 312 of HMD 100-1 with respect to hologram 306-2. HMD 100-2 can use such information to present avatar 316 and a hand element 318 with hologram 306-2 to a second user 320. In some embodiments, HMD 100-1 can be caused to present an avatar of user 320 in connection with hologram 306-1 (not shown).

Figure 4:
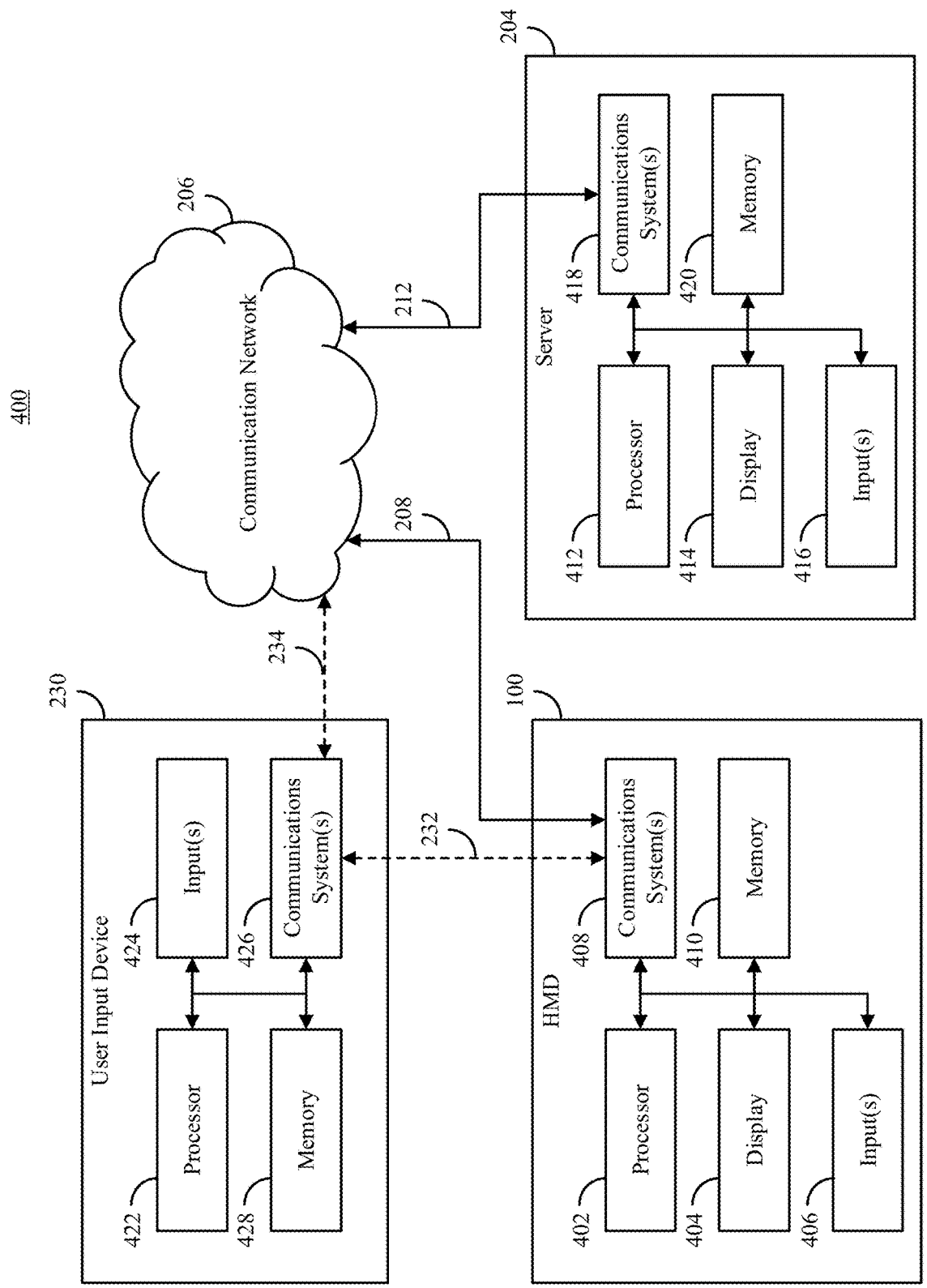
FIG. 4 shows an example of hardware that can be used to implement at least one head mounted display, at least one server, and at least one user input device in accordance with some embodiments of the disclosed subject matter.

FIG. 4 shows an example 400 of hardware that can be used to implement at least one of HMD 100, server 204 and user input device 230 in accordance with some embodiments of the disclosed subject matter. As shown in FIG. 4, in some embodiments, HMD 100 can include a processor 402, a display 404, one or more inputs 406, one or more communication systems 408, and/or memory 410. In some embodiments, processor 402 can be any suitable hardware processor or combination of processors, such as a central processing unit (CPU), a graphics processing unit (GPU), etc. In some embodiments, display 404 can include any suitable display device(s), such as a transparent display as described above in connection with FIG. 1. In some embodiments, inputs 406 can include any suitable input device(s) and/or sensor(s) that can be used to receive user input, such as gaze tracking system 108, head tracking system 110, motion sensors 112, optical sensor 114, microphone 118, etc.

In some embodiments, communications systems 408 can include any suitable hardware, firmware, and/or software for communicating information over communication network 206 and/or any other suitable communication networks. For example, communications systems 408 can include one or more transceivers, one or more communication chips and/or chip sets, etc. In a more particular example, communications systems 408 can include hardware, firmware and/or software that can be used to establish a Wi-Fi connection, a Bluetooth connection, a cellular connection, etc.

In some embodiments, memory 410 can include any suitable storage device or devices that can be used to store instructions, values, etc., that can be used, for example, by processor 402 to present content using display 404, to communicate with server 204 via communications system(s) 408, etc. Memory 410 can include any suitable volatile memory, non-volatile memory, storage, any other suitable type of storage medium, or any suitable combination thereof. For example, memory 410 can include RAM, ROM, EEPROM, one or more flash drives, one or more hard disks, one or more solid state drives, one or more optical drives, etc. In some embodiments, memory 410 can have encoded thereon a computer program for controlling operation of HMD 100. In some such embodiments, processor 402 can execute at least a portion of the computer program to present content (e.g., one or more holograms), receive content from server 204, transmit information to server 204, etc. In some embodiments, HMD 100 can use any suitable hardware and/or software for rendering the content received from server 204, such as Unity 3D available from Unity Technologies. Additionally, in some embodiments, any suitable communications protocols can be used to communicate control data, image data, audio, etc., between HMD 100 and server 204, such networking software available from Unity Technologies.

In some embodiments, server 204 can include a processor 412, a display 414, one or more inputs 416, one or more communication systems 418, and/or memory 420. In some embodiments, processor 412 can be any suitable hardware processor or combination of processors, such as a central processing unit, a graphics processing unit, etc. In some embodiments, display 414 can include any suitable display devices, such as a computer monitor, a touchscreen, a television, etc. In some embodiments, inputs 416 can include any suitable input devices and/or sensors that can be used to receive user input, such as a keyboard, a mouse, a touchscreen, a microphone, etc.

In some embodiments, communications systems 418 can include any suitable hardware, firmware, and/or software for communicating information over communication network 206 and/or any other suitable communication networks. For example, communications systems 418 can include one or more transceivers, one or more communication chips and/or chip sets, etc. In a more particular example, communications systems 418 can include hardware, firmware and/or software that can be used to establish a Wi-Fi connection, a Bluetooth connection, a cellular connection, etc.

In some embodiments, memory 420 can include any suitable storage device or devices that can be used to store instructions, values, etc., that can be used, for example, by processor 412 to present content using display 414, to communication with one or more HMDs 100, etc. Memory 420 can include any suitable volatile memory, non-volatile memory, storage, any other suitable type of storage medium, or any suitable combination thereof. For example, memory 420 can include RAM, ROM, EEPROM, one or more flash drives, one or more hard disks, one or more solid state drives, one or more optical drives, etc. In some embodiments, memory 420 can have encoded thereon a server program for controlling operation of server 204. In such embodiments, processor 412 can execute at least a portion of the computer program to transmit content (e.g., one or more holograms) to one or more HMDs 100, receive content from one or more HMDs 100, receive instructions from one or more devices (e.g., HMD 100-1, user input device 230, another server, a personal computer, a laptop computer, a tablet computer, a smartphone, etc.).

In some embodiments, user input device 230 can include a processor 422, one or more inputs 224, one or more communication systems 426, and/or memory 428. In some embodiments, processor 422 can be any suitable hardware processor or combination of processors, such as a central processing unit, a graphics processing unit, etc. In some embodiments, inputs 424 can include any suitable input devices and/or sensors that can be used to receive user input, such as one or more physical or software buttons, one or movement sensors, a microphone, a touchpad, etc.

In some embodiments, communications systems 426 can include any suitable hardware, firmware, and/or software for communicating information over communications link 232, communications link 234, and/or any other suitable communications links. For example, communications systems 426 can include one or more transceivers, one or more communication chips and/or chip sets, etc. In a more particular example, communications systems 426 can include hardware, firmware and/or software that can be used to establish a Wi-Fi connection, a Bluetooth connection, a cellular connection, etc.

In some embodiments, memory 428 can include any suitable storage device or devices that can be used to store instructions, values, etc., that can be used, for example, by processor 422 to determine when input (e.g., user input) is received, to record sensor data, to communicate sensor data with one or more HMDs 100, etc. Memory 428 can include any suitable volatile memory, non-volatile memory, storage, any other suitable type of storage medium, or any suitable combination thereof. For example, memory 428 can include RAM, ROM, EEPROM, one or more flash drives, one or more hard disks, one or more solid state drives, one or more optical drives, etc. In some embodiments, memory 428 can have encoded thereon a computer program for controlling operation of user input device 230. In such embodiments, processor 422 can execute at least a portion of the computer program to transmit data (e.g., representing sensor outputs) to one or more HMDs 100, to transmit data (e.g., representing sensor outputs) to one or more servers 204, etc.

Figure 5:
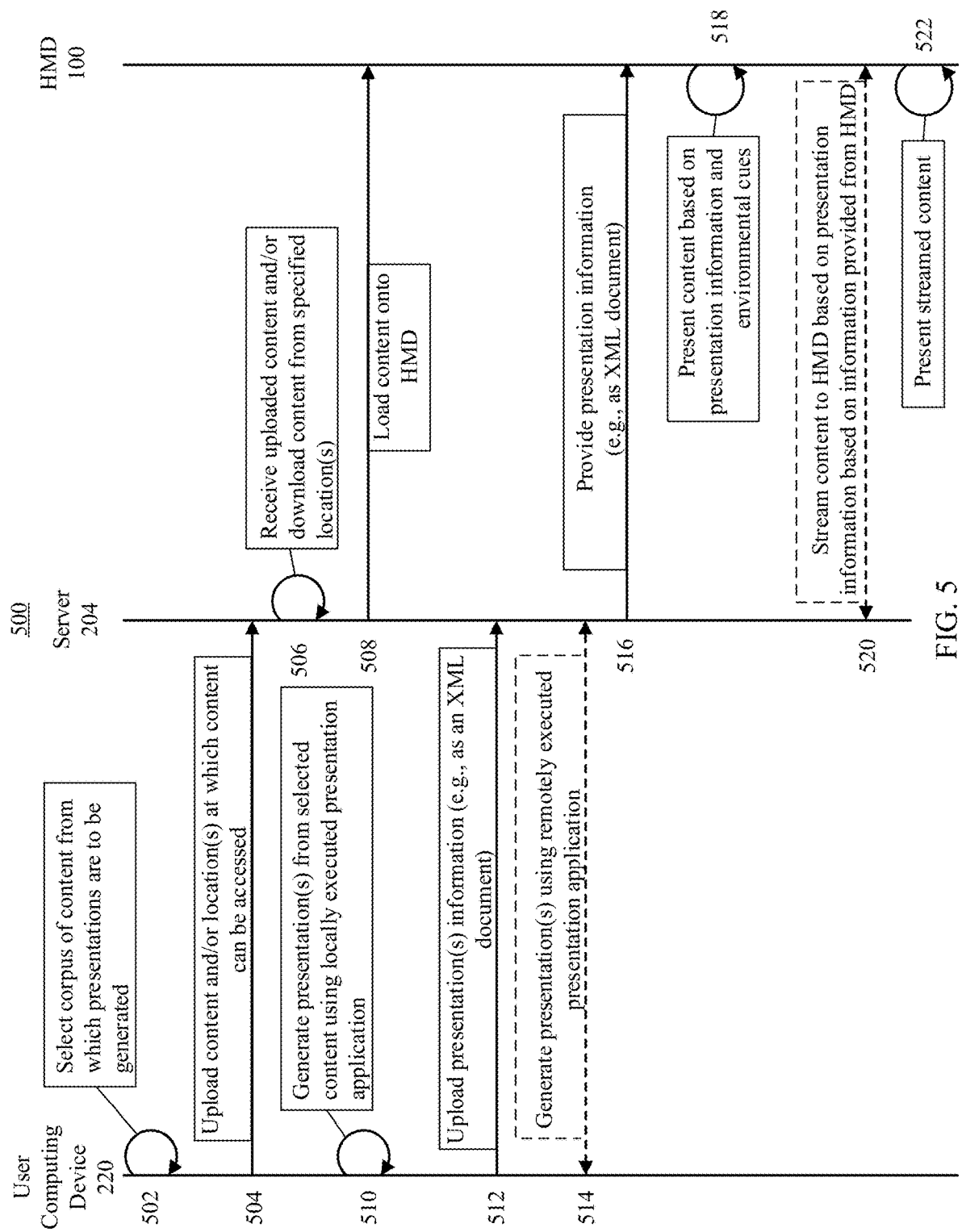
FIG. 5 shows an example of an information flow among a user computing device selecting and/or uploading content and/or a presentation to a server, and a head mounted display receiving the content and presenting the content in accordance with the presentation in accordance with some embodiments of the disclosed subject matter.

FIG. 5 shows an example 500 of an information flow among a user computing device 220 selecting and/or uploading content and/or a presentation to server 204, and HMD 100 receiving the content and presenting the content in accordance with the presentation in accordance with some embodiments of the disclosed subject matter.

As shown in FIG. 5, at 502, in some embodiments, user computing device 220 can select a corpus of content from which one or more presentations are to be created. In some embodiments, a user of user computing device 220 can select a corpus of content using any suitable technique or combination of techniques. For example, in some embodiments, a user can create the content using any suitable application or combination of applications executed at least in part by user computing device 220. As another example, a user of user computing device 220 can select the content from a web page associated with a creator and/or publisher of the content, and can download the content to user computing device 220 and/or server 204. As yet another example, a user of user computing device 220 can select the content using an application executed at least in part by user computing device 220 that provides access to such content. As still another example, a user of user computing device 220 can select the content from a storage medium (e.g., a USB drive, an external hard drive, an optical storage medium, etc.) coupled to user computing device 220.

In some embodiments, the corpus of content can include a preselected collection of content generated by a content publisher, such as a collection of 3D anatomical models of human anatomy from which a user can select a particular combination of features to present. Additionally or alternatively, in some embodiments, the corpus of content can include 3D models collected by a user of user computing device 220 from various sources.

At 504, in some embodiments, user computing device 220 can upload the corpus of content and/or information indicating where the content can be accessed to server 204. In some embodiments user computing device 220 can use any suitable technique or combination of techniques to upload the content and/or location information to server 204. For example, user computing device 220 can upload the content and/or location information via an application program interface (API) associated with server 204. As another example, user computing device 220 can upload the content and/or location information via a web page and/or other application associated with server 204. As yet another example, user computing device 220 can upload the content and/or location information using any other suitable technique or combination of techniques such as file transfer protocol (ftp). Additionally or alternatively, in some embodiments, user computing device 220 can store the corpus of content locally (e.g., using a hard drive coupled to user computing device 220).

At 506, in some embodiments, server 204 can receive content uploaded by user computing device 220 and/or can download content from a location(s) identified by user computing device 220, and can store the content in storage associated with server 204 such that it is accessible to a user of user computing device 220 (e.g., via a web page, an API, etc.).

At 508, in some embodiments, server 204 can provide the corpus of selected content to one or more HMDs that are to present at least a portion of the content during a presentation. In some embodiments, server 204 can load a portion of the corpus of content, or the entire corpus, onto HMDs using any suitable technique or combination of techniques. For example, server 204 can provide at least a portion of the corpus as part of an application that is downloaded to an HMD. As another example, server 204 can provide at least a portion of the corpus in response to a request from an HMD. As still another example, server 204 can provide content on demand and/or can stream content to HMDs as it is needed. In a more particular example, before a presentation begins, server 204 can provide content used in that presentation to HMDs.

At 510, in some embodiments, a user of user computing device 220 can generate a presentation from the selected content using a locally executed presentation application that accesses the corpus of content locally and/or remotely (e.g., from server 204). In some embodiments, the presentation application can facilitate the creation of scenes including a subset of content from the corpus of content. For example, the presentation application can allow a user to select a particular body part(s) and layer(s) (e.g., skin, muscle, bone, nerves, etc.) to present in a 3D model of human anatomy, and a sequence in which to present the various parts and/or layers. Additionally, in such an example, the presentation application can allow a user to highlight a particular portion of the 3D model in a portion of the presentation, such as a particular muscle or nerve.

In some embodiments, at 510, the user of user computing device 220 can select particular content for each of various stations (e.g., stations 202), each of various users or groups of users (e.g., student users of HMDs 100), each of various presentation spaces, etc.

At 512, in some embodiments, user computing device 220 can upload presentation information indicating which content is used in the presentation, an order in which the content is to be presented, supplemental content that is to be presented (e.g., text, audio, etc.), etc., to server 204. In some embodiments, the presentation information can be formatted in any suitable format. For example, the presentation information can be uploaded from user computing device 220 as an Extensible Markup Language (XML) document. As another example, the presentation can be uploaded as a media file including the content itself (in which case the corpus of content may not need to be uploaded to server 204). Note that, in some embodiments, server 204 can be omitted and/or can perform fewer functions than what is shown in FIG. 5. For example, in some embodiments, content can be loaded from user computing device 220 (or any other source) to HMD 100 without first being uploaded to server 204. As another example, in some embodiments, presentation information can be sent from user computing device 220 to HMDs 100 without being sent via server 204 (although one or more other servers, such as nodes on the Internet, one or more email servers, one or more storage servers, etc., may be involved in transmission of the presentation information).

In addition, or as an alternative, to generating a presentation using an application being executed by user computing device 220, user computing device 220 can interact with server 204 to generate a presentation using an application executed at least in part by server 204. For example, user computing device 220 can be used to provide a graphical user interface for an application being executed by server 204, and inputs received by user computing device 220 can be used to control operation of the application. In some embodiments, if a presentation is generated using an application executed at least in part by server 204, server 204 can generate presentation information (e.g., as an XML document), and not receive such information from user computing device 220.

At 516, in some embodiments, server 204 can provide presentation information for at least a particular presentation to HMD 100 that is to be used to experience the presentation. In some embodiments, server 204 can provide the presentation information at any suitable time. For example, server 204 can provide access to the presentation information after it is created to any HMD associated with a user included a particular class or group to which the presentation is going to be given (e.g., as identified by a user of user computing device 220). As another example, server 204 can provide access to the presentation information at the beginning of the presentation (e.g., as indicated by a user of user computing device 220, HMD 100-1, etc.) to HMDs that are present in a particular location, HMDs associated with users included a particular class or group to which the presentation is going to be given (e.g., as identified by a user of user computing device 220), etc. In some embodiments, presentation information can be received in connection with the content. For example, the presentation information can be a file that is transferred to HMD 100 as part of the content.

At 518, in some embodiments, HMDs that have received the presentation information can present content (e.g., from the content loaded onto the HMD at 508) in accordance with the presentation information. For example, as described above in connection with FIG. 2, an HMD (e.g., HMD 100-2) can present a particular 3D model in connection with a third station based on instructions received in the presentation information indicating that the HMD is to present the particular 3D model in connection with the third station.

Additionally or alternatively, in some embodiments, server 204, at 520, can stream content to one or more HMDs based on the presentation information and based on information received from the HMDs. For example, as described above in connection with FIG. 2, an HMD can provide information about which station(s) is closest to the HMD and/or within the field of view of the wearer of the HMD, and server 204 can stream appropriate content to the HMD. As another example, an HMD can provide information that server 204 can use to determine which station(s) is closest to the HMD and/or which station(s) are in the within the field of view of the wearer of the HMD, and server 204 can stream appropriate content to the HMD. As yet another example, server 204 can receive information from a first HMD (e.g., HMD 100-2) and/or a user input device (e.g., user input device 302) indicating that a wearer of HMD 100-2 is pointing to a particular portion of a 3D model, and server 204 can stream the information to another HMD (e.g., HMD 100-1) viewing the same content as supplemental content to be integrated into the content by the second HMD.

At 522, in some embodiments, HMD 100 can present streamed content received from server 204. In some embodiments, the streamed content presented at 522 can be any suitable streamed content, such as an entire 3D model, a change to a 3D model, supplemental content, etc.

Figure 6:
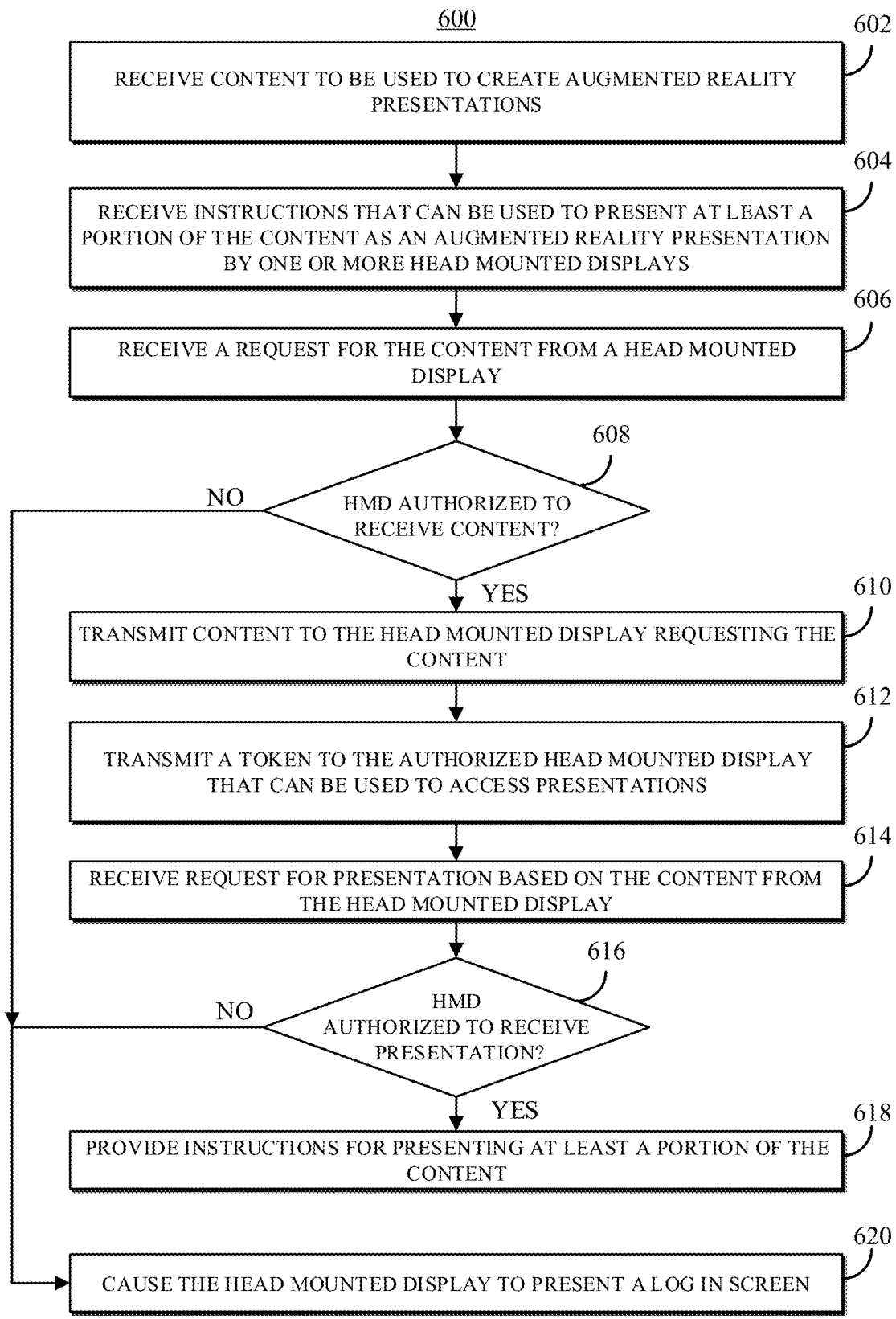
FIG. 6 shows an example of a process for distributing content to one or more head mounted displays in accordance with some embodiments of the disclosed subject matter.

FIG. 6 shows an example 600 of a process for distributing content to one or more head mounted displays in accordance with some embodiments of the disclosed subject matter. As shown in FIG. 6, at 602 process 600 can receive content to be used to create one or more augmented reality presentations by HMDs. In some embodiments, the content can be received in any suitable format and/or from any suitable source. For example, a user of a user computing device (e.g., user computing device 220) can upload the content (e.g., to server 204). As another example, a user can submit identifying information of an address and/or credentials that can be used to retrieve the content. In some embodiments, the content can include any suitable visual information that can be used to create one or more 3D models that can be presented by an HMD (e.g., as holograms). For example, in some embodiments, the content can include various 3D models of human anatomy that can be used by HMDs to generate holograms showing various systems from human anatomy.

At 604, process 600 can receive one or more instructions that can be used to present at least a portion of the content as an augmented reality presentation. For example, the instructions can identify different portions of the content that are to be presented, an order in which to present the different portions of the content, locations (e.g., in a room, in connection with stations, etc.) at which to present particular content, etc. In some embodiments, the instructions can be received in any suitable format and/or using any suitable technique or combination of techniques. For example, in some embodiments, the instructions can be received as an XML file generated on the user device that received user input specifying the instructions. As another example, the instructions can be received from the user device through a web page or other suitable user interface that can be presented by the user device, and can receive user input for specifying an augmented reality presentation. In such an example, user inputs can be conveyed to a server associated with the web page, which can generate the instructions (e.g., as an XML document).

At 606, process 600 can receive a request for the content from a head mounted display. For example, as described above, an HMD associated with a particular user (e.g., such an association can be created by the user signing into an application being executed by the HMD) can request the content in response to input from the user, based on information associated with the user (e.g., information indicating that the user is associated with a class for which the content is assigned), and/or using any other suitable technique or combination of techniques. In some embodiments, the request can be received using any suitable technique or combination of techniques. For example, the HMD can navigate to a particular address (e.g., IP address, URL, etc.) associated with the content. As another example, the HMD can access a repository of applications, and submit a request to download an application that includes (and/or can download) the content.

At 608, process 600 can determine if the HMD is authorized to receive the content. For example, process 600 can determine whether the HMD is logged in to a user account that has been authorized to receive the content. As another example, process 600 can determine whether an application being executed by the HMD is logged in to a user account that has been authorized to receive the content. If process 600 determines, at 608, that the HMD is not authorized to receive the content ("NO" at 608), process 600 can move to 620 and prompt the user to log in to access the content (e.g., by causing a log in screen to be presented, by prompting a user to capture an image of an appropriate visual code as described below in connection with FIG. 8, etc.), and can return to 608 upon the user successfully logging the HMD in to an appropriate account.

Otherwise, if process 600 determines, at 608, that the HMD is authorized to receive the content ("YES" at 608), process 600 can move to 610. At 610, process 600 can transmit the content to the HMD requesting the content. In some embodiments, the content can be transmitted using any suitable protocol(s), in any suitable format, and/or with any suitable compression applied.

At 612, process 600 can transmit a token to the authorized HMD which can be used to access instructions for generating augmented reality presentations from the content (and/or otherwise accessing content and/or services associated with the content). In some embodiments, the token can take any suitable form. Additionally, in some embodiments, the token can be configured to expire after a predetermined amount of time.

At 614, process 600 can receive a request for an augmented reality presentation based on the content that the head mounted display previously obtained. In some embodiments, the request can be sent by the HMD in response to any suitable input. For example, a user can provide user input indicating that HMD is to request the augmented reality presentation. As another example, the HMD can be configured to automatically request the augmented reality presentation (e.g., without user intervention, with user input only required to authorize the request, etc.) when it is used in a particular location and/or at a particular time. As yet another example, the HMD can be configured to automatically request the augmented reality presentation (e.g., without user intervention, with user input only required to authorize the request, etc.) in response to receiving a particular signal (e.g., from a Bluetooth beacon) and/or in response to capturing one or more images of a particular visual cue (e.g., a QR code). In some embodiments, the request can be transmitted with the token transmitted to the HMD at 612. In some embodiments, the request received at 614 can be a request for instructions for a particular augmented reality presentation. Alternatively, in some embodiments, the request received at 614 can be a generic request for instructions for an augmented reality presentation, and the instructions that are returned can be instructions selected by an administrator.

At 616, process 600 can determine whether the HMD requesting the instructions for the augmented reality presentation is authorized to receive the augmented reality presentation. For example, process 600 can determine whether the HMD submitted a valid token and/or whether the HMD is logged in to an authorized user account. If process 600 determines that the HMD is authorized to receive the augmented reality presentation ("YES" at 616), process 600 can move to 618, and provide the instructions to the HMD for presenting the augmented reality presentation using at least a portion of the content. Otherwise, if process 600 determines that the HMD is not authorized to receive the augmented reality presentation ("NO" at 616), process 600 can move to 620 and prompt a user of the HMD to log in, indicate that the user is not authorized to receive the presentation, present an error message, etc. In some embodiments, one or more portions of process 600 can be executed by server 204 (or multiple servers 204).

Figure 7:
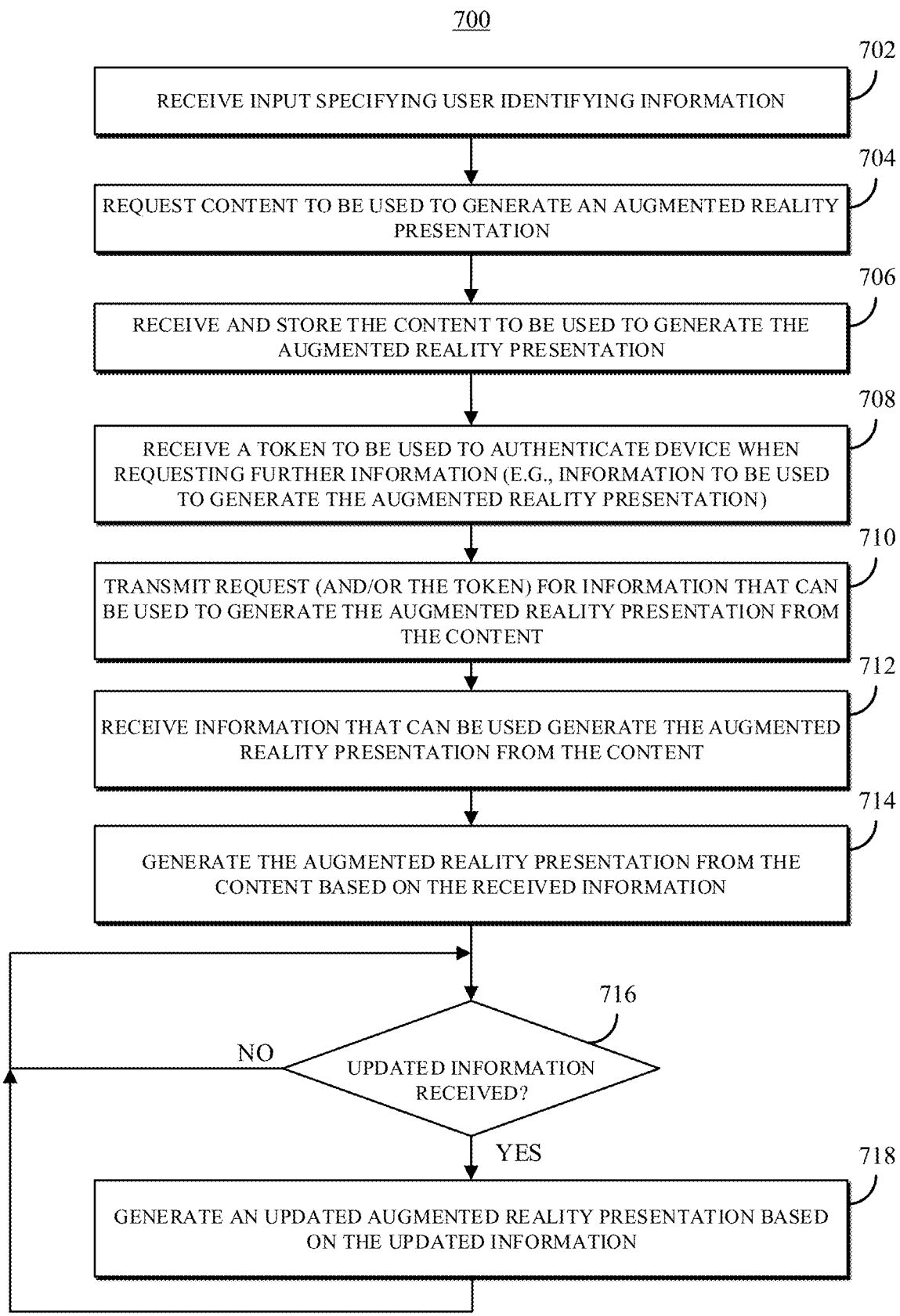
FIG. 7 shows an example of a process for generating an augmented reality presentation using a head mounted display in accordance with some embodiments of the disclosed subject matter.

FIG. 7 shows an example 700 of a process for generating an augmented reality presentation using a head mounted display in accordance with some embodiments of the disclosed subject matter. As shown in FIG. 7, at 702, process 700 can receive input specifying user identifying information. For example, a user can use a virtual keyboard presented by the HMD 100 to type a username and/or password. As another example, a user can speak information that can be used to identify the user, and process 700 can use any suitable voice recognition technique or combination of techniques to verify the identity of the user. As yet another example, in some embodiments, a user can pair another device (e.g., a smartphone, a tablet, a keyboard) with the HMD (e.g., using Bluetooth), and use an input of the paired device to input user identifying information. As still another example, as described below in connection with FIG. 8, the HMD can capture an image that can be used to identify the user.

At 704, process 700 can request content to be used to generate an augmented reality presentation. In some embodiments, the request can be generated using any suitable technique or combination of techniques. For example, an HMD executing process 700 can navigate to a particular address (e.g., IP address, URL, etc.) based on user input, and can request content at the address (e.g., by selecting a link on a web page, automatically in response to the request for information at the address, etc.). As another example, the HMD can request the content using an application being executed by the HMD, which can automatically download the content based on other information (e.g., information indicating that the user specified at 702 is signed up for a class that uses the content).

At 706, process 700 can receive and store the content to be used in generating the augmented reality presentation. In some embodiments, the content can be stored in any suitable location, such as memory 410.

At 708, process 700 can receive a token to be used to authenticate the HMD that is executing process 700 when requesting further information, such as instructions for generating a particular augmented reality presentation from the content. In some embodiments, the token can be received in any suitable format, and can include any suitable information that can be used by, e.g., server 204, to determine that the HMD is authorized to access the augmented reality presentation.

At 710, process 700 can transmit a request (and/or the token) for information that can be used to generate the augmented reality presentation from the content. As described above in connection with 614 of FIG. 6, process 700 can transmit the request for the augmented reality presentation in response to any suitable input. For example, the HMD can be navigated to a particular address (e.g., URL), which can function as a request for the augmented reality presentation. As another example, the HMD can automatically (e.g., without user intervention, with user input required only to authorize the request, etc.) request the augmented reality presentation when certain conditions are met (e.g., the HMD is within a certain geofence at a certain time, the HMD is receiving a particular signal from another device, etc.).

At 712, process 700 can receive information (e.g., instructions) that can be used to generate the augmented reality presentation. In some embodiments, the information can be received in any suitable format. For example, the information can be an XML document indicating which content is to be presented, in which order the content is to be presented, at which location(s) certain content is to be presented, etc.

At 714, process 700 can generate the augmented reality presentation from the content based on the received instructions. For example, process 700 can determine which station is in closest proximity to the HMD executing process 700 and can present a hologram corresponding to that station based on the information received at 712. In some embodiments, process 700 can cause the HMD to transmit information to a server (e.g., server 204) indicating which portion of the augmented reality presentation is currently being presented to the user. In some embodiments, such information can be used by the server to convey updated information about the particular content being presented. Alternatively, the server can send updated information with identifying information about which portion of the augmented reality presentation the updated information corresponds to, and the HMD can interpret the identifying information to determine whether the updated information is pertinent to the content currently being presented.

At 716, process 700 can determine whether any updated information has been received. In some embodiments, the updated information can include any suitable information from a server (e.g., server 204) with instructions to alter presentation of the content being presented as part of the augmented reality presentation. If process 700 determines that updated information has not been received ("NO" at 716), process 700 can return to 716 (and/or 714) to continue to determine whether updated information has been received (and/or to determine whether another portion of the augmented reality presentation is to be generated and/or presented). Otherwise, if process 700 determines that updated information has been received ("YES" at 716), process 700 can move to 718.

At 718, process 700 can generate an updated augmented reality presentation based on the updated information. In some embodiments, the updated information can include any suitable information that may affect the augmented reality presentation. For example, the updated information can be an indication of the location of a user interface element corresponding to a direction of a pointer device (e.g., as described above in connection with FIG. 3B). In such an example, process 700 can insert the user interface element into the hologram currently being presented (if the user interface element can be seen from the angle at which the hologram is being viewed). As another example, the updated information can be an instruction to change the portion of the augmented reality presentation being generated by the HMD, such as an instruction to move forward through the presentation or backward through the presentation. As yet another example, the updated information can be a 3D model (e.g., an avatar) of a user of another HMD (e.g., located remotely from the HMD executing process 700) and position information indicating where the avatar is to be presented in relation to the hologram being presented.

Figure 8:
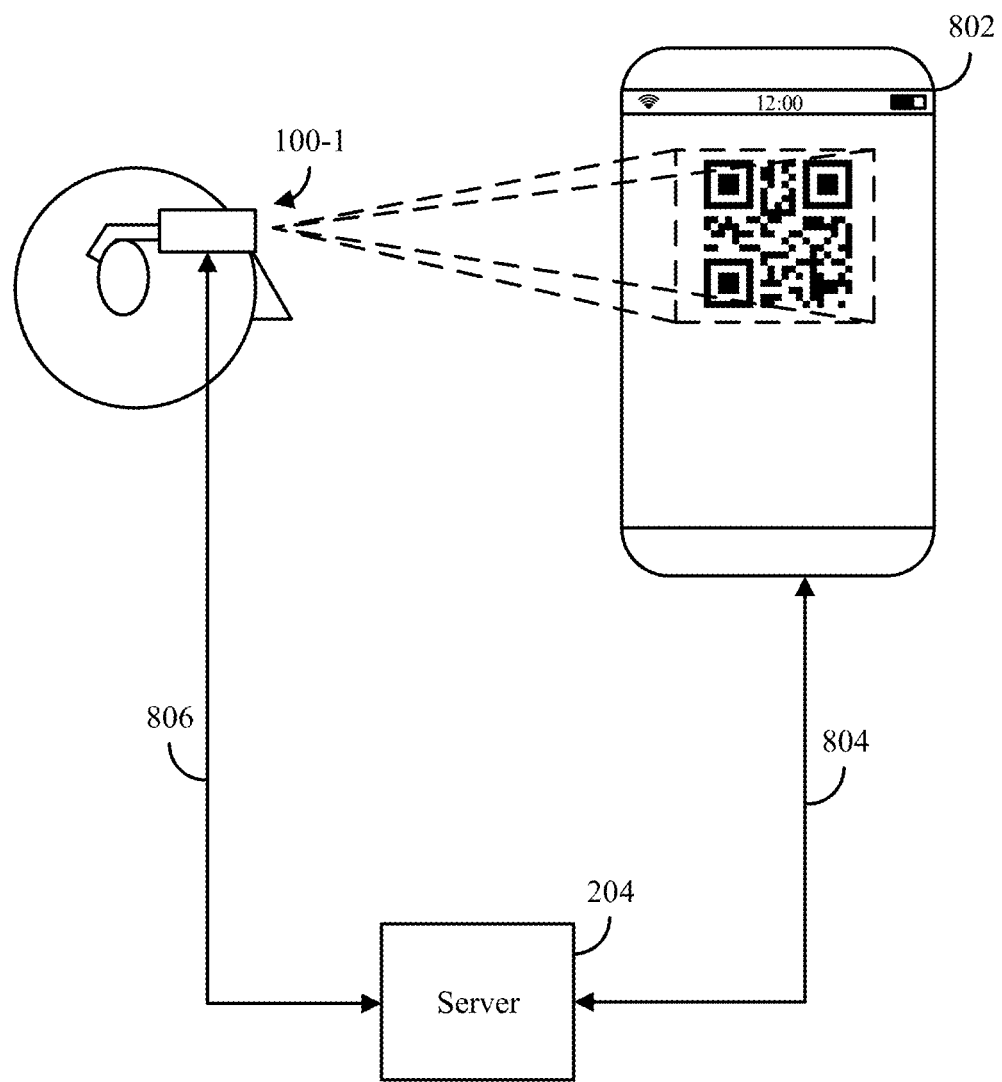
FIG. 8 shows an example of a user device and a head mounted display performing a pairing operation with a server in accordance with some embodiments of the disclosed subject matter.

FIG. 8 shows an example 800 of a user device 220 and HMD 100-1 performing a pairing operation with server 204 in accordance with some embodiments of the disclosed subject matter. As shown in FIG. 8, a user device 802 (e.g., a smartphone, a tablet computer, a personal computer, a laptop computer, etc., which may or may not be used as user computing device 220) is presenting a visual code (more particularly, a QR code). In some embodiments, user device 802 can be used to log in to an application or service associated with the content and/or augmented reality presentations described herein. In some such embodiments, user device 802 can be used to retrieve the QR code (e.g., from server 204) over a communications link 804 (e.g., which may include a LAN connection, a cellular connection, etc.) in response to selecting a link (or any other suitable user action). In some embodiments, user device 802 can be used to retrieve an email with the link to the QR code, can receive a push notification with the link to the QR code (and/or the QR code itself), can receive a text message with the link to the QR code (and/or the QR code itself), can access an application through which the QR code can be retrieved from server 204, etc. HMD 100-1 can capture an image of the QR code (e.g., using optical sensor 114), which can cause HMD 100-1 to submit a request (e.g., to server 204) over a communications link 806 which can indicate that HMD 100-1 is to be paired with user 802. In some embodiments, server 204 can associate user device 802 with HMD 100-1 for any suitable duration (e.g., the duration of a class, one day, one week, one month, one semester, for an indefinite period of time, etc.), and can provide supplemental content through user device 802. For example, server 204 can push (or otherwise make available) content to user device 802 that supplements a portion of the augmented reality presentation currently being presented by HMD 100-1. In a more particular example, user device 802 can present supplemental text related to the augmented reality presentation. In another more particular example, user device 802 can provide exam questions related to the augmented reality presentation. As another example, a user can use user device 802 to take notes (e.g., using a virtual keyboard, speech recognition, etc.), which can be automatically associated with the portion of the augmented reality presentation currently being presented. As yet another example, user device 802 can receive information from HMD 100-1 (e.g., images, text, video, audio, etc. captured during the presentation), which can be used by a user to supplement notes, as a memory aid, etc.

Figure 9:
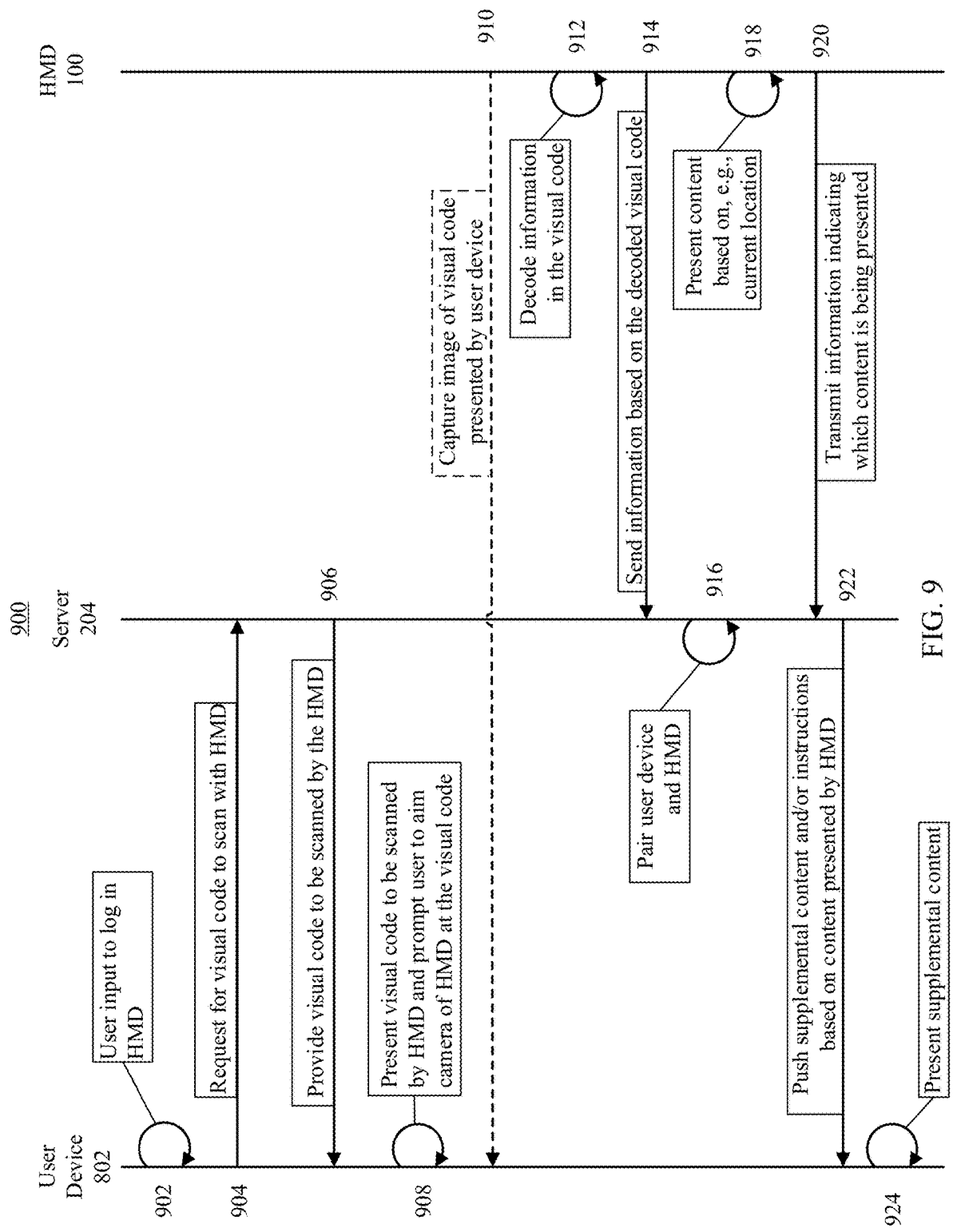
FIG. 9 shows an example of an information flow among a user device, a server, and a head mounted display during a login and/or pairing operation as described above in connection with FIG. 8 in accordance with some embodiments of the disclosed subject matter.

FIG. 9 shows an example 900 of an information flow among user device 802, server 204, and HMD 100 during a login and/or pairing operation as described above in connection with FIG. 8 in accordance with some embodiments of the disclosed subject matter. As shown in FIG. 9, user device 802 can receive user input to log in HMD 100. For example, at 902, user device 802 can navigate to a web page and/or execute an application associated with using HMD 100-1 to generate the augmented reality presentation. In such an example, user device 802 can be used to provide login credentials (e.g., a username, a password, biometric information, etc.).

At 904, user device 802 can request a visual code to be scanned by HMD 100-1 from server 204. For example, as described above in connection with FIG. 8, user device 802 can request the QR code that can be scanned by HMD 100-1 to pair HMD 100-1 with user device 802 at server 204, and/or to authenticate HMD 100-1 to server 204.

At 906, server 204 can provide the requested visual code provided that user device 802 is determined to be authorized. In some embodiments, server 204 can provide the visual code in any suitable format and/or as any suitable type of data. For example, although a QR code was described above in connection with FIG. 8, this is merely an example and any suitable machine-readable visual code can be used, such as a barcode, an image with stegenographically encoded information, etc. Additionally, in some embodiments, in addition to, or in lieu of, a visual code, server 204 can cause user device 802 to emit encoded sound that can be used by HMD 100-1 to pair with user device 802 (and/or to log in).

At 908, user device 802 can present the visual code and can prompt the user to aim an image sensor (e.g., optical sensor 114) of HMD 100-1 at the visual code (e.g., as shown in FIG. 8). At 910, HMD 100-1 can capture an image of the visual code presented by user device 802, and can decode the information included in the visual code at 912.

At 914, HMD 100-1 can send information to server 204 based on the information decoded from the image of the visual code. For example, HMD 100-1 can navigate to a particular web page and/or send a request to a particular address in response to capturing the image of the visual code.

At 916, server 204 can pair user device 802 and HMD 100-1 in response to receiving the information sent by HMD 100-1 at 914, and/or can log in HMD 100-1. In some embodiments, the indication that the two devices are paired can be indicated using any suitable technique or combination of techniques, such as through an entry in a database of devices maintained in database 204.

At 918, HMD 100-1 can present content from the augmented reality presentation as a wearer of HMD 100-1 moves around to different stations, for example. At 920, HMD 100-1 can transmit information indicating which content form the augmented reality presentation is currently being presented by HMD 100-1. Additionally or alternatively, server 204 can track which content is being presented (e.g., based on updated instructions for progressing through the presentation, based on the location of HMD 100-1, etc.).

At 922, server 204 can push supplemental content and/or instructions to user device 802 based on the content currently being presented by HMD 100-1. Additionally or alternatively, user device 802 can periodically request updated information, if any, from server 204. At 924, user device 802 can present the supplemental content sent by server 204 at 922.

Figure 10:
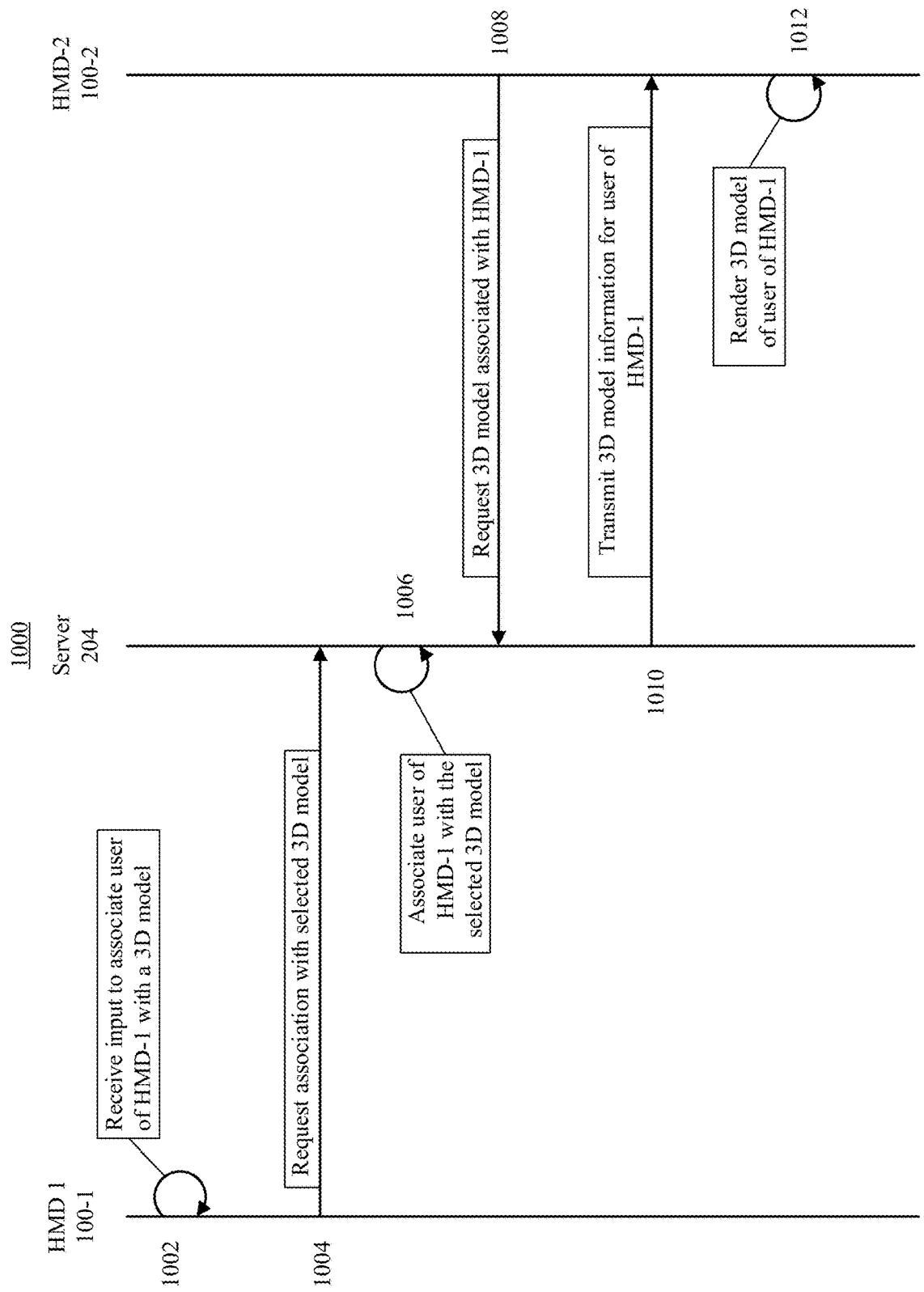
FIG. 10 shows an example of an information flow among a first head mounted display, a server, and a second head mounted display to associate a 3D model with a user of the first head mounted display (e.g., as an avatar) and present the 3D model by the second head mounted display in accordance with some embodiments of the disclosed subject matter.

FIG. 10 shows an example 1000 of an information flow among a first HMD 100-1, server 204, and a second HMD 100-2 to associate a 3D model with a user of HMD 100-1 (e.g., as an avatar) and present the 3D model by HMD 100-2 in accordance with some embodiments of the disclosed subject matter. As shown in FIG. 10, HMD 100-1 can receive input indicating that a particular 3D model is to be associated with a user of 100-1. In some embodiments, HMD 100-1 can present any number of 3D models from which the user can choose a particular 3D model to associate with the user. For example, the 3D models can be masks to be presented over the user's face and/or head by other HMDs. As another example, the 3D models can be 3D avatars that can be used as a proxy for the user by another HMD. In some embodiments, a user can be provided with a user interface to customize and/or design a 3D model. Additionally or alternatively, in some embodiments, a paired user device (e.g., user device 802 as described above in connection with FIGS. 8 and 9) can be used to select, customize, design, etc., a 3D model, which can be presented by HMD 100-1 for review by the user.

At 1004, HMD 100-1 (and/or a paired user device) can submit a request to server 204 to associate the selected 3D model with the user. In some embodiments, the request can include the 3D model, identifying information of the 3D model, an address of the 3D model, etc. At 1006, server 204 can associated a user of HMD 100-1 with the selected 3D model, such that the 3D model is used in connection with the user.

At 1008, HMD 100-2 can request a 3D model associated with HMD 100-1. Alternatively, server 204 can push the 3D model to HMD 100-2. In some embodiments, the 3D model can be requested by scanning a visual code provided by a user of HMD 100-1 to a user of HMD 100-2. For example, a user of HMD 100-1 can present the visual code for scanning by HMD 100-2 (e.g., using a paired user device). As another example, a user of HMD 100-1 can share the visual code with a user of HMD 100-2 (e.g., via a message sent from between paired user devices associated with each HMD, such as a text message). At 1010, server 204 can transmit the 3D model information for the user of HMD 100-1 to HMD 100-2.

At 1012, HMD 100-2 can render the 3D model associated with the user of HMD 100-1. In some embodiments, HMD 100-2 can render the 3D model in connection with the physical presence of the user. For example, the 3D model can be a mask, a helmet, an outfit, etc., that HMD 100-2 can superimpose over a portion of user 100-1 to provide an augmented reality effect. Additionally or alternatively, HMD 100-2 can render the 3D model as an avatar for the user of HMD 100-1.

Although a user of HMD 100-1 is shown in FIG. 10 as selecting a 3D model, a user of HMD 100-2 can select a 3D model to be used in connection with the user of HMD 100-1.

Figure 11:
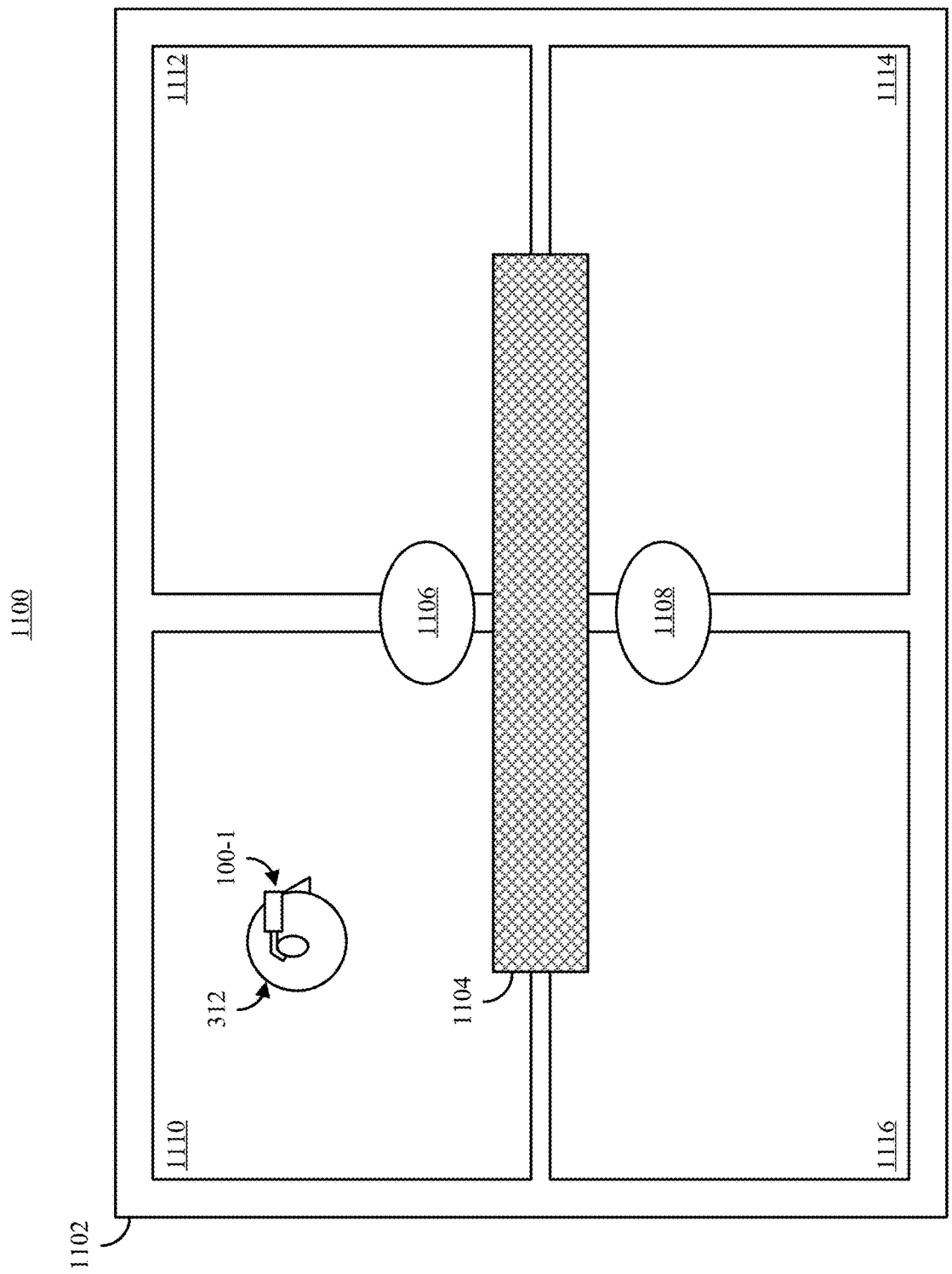
FIG. 11 shows an example of a display space for presenting various models in a sequence in accordance with some embodiments of the disclosed subject matter.

FIG. 11 shows an example 1100 of a display space for presenting various models in a sequence in accordance with some embodiments of the disclosed subject matter. As show in FIG. 11, display space 1100 can include a physical area 1102, which may or may not be coextensive with a structure, such as a room of a building. In some embodiments, a barrier 1104 can divide physical area 1102 into two or more areas. Although barrier 1104 is shown as a straight barrier dividing physical area 1102 roughly in half, this is merely an example, and barrier 1104 can have any suitable shape, which can subdivide physical area 1102 into any suitable number of areas. For example, barrier 1104 can form a more complex shape, such as a step pattern, a "U" shape, etc. In some embodiments, barrier 1104 can be a physical barrier formed by a permanent or temporary structure erected in physical space 1102, such as a wall, a curtain, etc. Alternatively, in some embodiments, barrier 1104 can be an entirely virtual barrier that is presented by an HMD (e.g., HME 100-1), but which does not correspond to a physical barrier.

In some embodiments, barrier 1104 can create multiple display spaces 1106 and 1108, which can, for example, act as the focal point of virtual rooms created by barrier 1104. Note that although two display spaces are shown, this is merely an example, and any suitable number of display spaces can be associated with a barrier, with potentially multiple display spaces being presented on the same side of the barrier, with another group of display spaces located on another side of the barrier.

In some embodiments, physical space 1102 can be subdivided into various sections 1110-1116, which can each correspond to a virtual sensor. For example, one or more physical points within physical space 1102 can be designated as reference points for determining in which section HMD 100 is located. In such an example, HMD 100 can determine the distance to one or more of the points to determine the current section of HMD 100. In such an example, the virtual sensors can be implemented by HMD 100. As another example, signals from one or more active devices, such as Bluetooth beacons, can be used to determine the current section of HMD 100. In some embodiments, when HMD 100-1 is present within section 1110 it can load content for display space 1106, and can present that content when display space 1106 is within the field of view of user 312. When user 312 moves from section 1110 into section 1112, HMD 100-1 can load content for display space 1108 in preparation for the user moving around barrier 1104. In some embodiments, an order in which content is presented in the display spaces can be based on any suitable information, such as presentation information generated by a user of user computing device 220, as described above in connection with FIGS. 2 and 5. In some embodiments, as user 312 wearing HMD 100-1 moves into section 1114 such that display space 1108 is within the field of view of user 312, HMD 100-1 can begin presenting the content loaded in connection with display space 1108 when the user moved into section 1112.

In some embodiments, when user 312 moves into section 1116 from section 1114, HMD 100-1 can load a next portion of content for space 1106 replacing the previously loaded content associated with that space, such that when user 312 moves around barrier 1104 HMD 100-1 presents new content in display space 1106. However, if user 312 moves back to section 1114 again, HMD 100-1 can load the previous content for display space 1106 such that the user can move backward through the presentation. In some embodiments, a sequence of content in a presentation can move forward while the user moves clockwise around barrier 1104, and can move backward if the user begins moving around the barrier counterclockwise. However, this is merely an example.

In some embodiments, the presentation can be designated to begin when an HMD first enters section 1110 (or any other designated section), such that the same content is presented in the same display spaces regardless of where the user enters physical space 1102. Alternatively, in some embodiments, the presentation can being in the display space that is closest to the user when the user first enters physical space 1102.

In some embodiments, HMDs associated with users that move around barrier 1104 together can be present the same content in display spaces 1106 and 1108 if the users have moved around barrier 1104 the same number of times. This can facilitate a shared experience among different users. In some such embodiments, two different HMDs that have not moved around barrier 1104 the same number of times can present different content in display spaces 1106 and 1108. Additionally or alternatively, in some embodiments, two or more different HMDs can be linked together such that they present the same content in display spaces 1106 and/or 1108. For example, a particular HMD can be designated as a master HMD, and HMDs paired with the master HMD can present the same content in display spaces 1106 and/or 1108 even if they do not move around barrier 1104 with the master HMD. As another example, the linked HMDs can collectively determine which content to display (e.g., based on where the majority of HMDs are located, based on the HMD that has moved around barrier 1104 the most number of times, based the HMD that has moved around barrier 1104 the least number of times, etc.). In some embodiments, two or more different HMDs can be linked together using any suitable technique or combination of techniques. For example, HMDs to be linked can based on the presence of a configuration file designating the HMD as being linked with one or more other HMDs. As another example, when initially entering physical space 1102, upon starting an application associated with physical space 1102, etc., a user can be prompted to select a group as part of a setup routine. In such an example, users that wish to have a shared experience can indicate that they are part of the same group. As yet another example, each HMD that is to be linked together can capture an image of a particular visual code (e.g., a QR code), which can cause the HMDs to be linked. As still another example, a device paired with an HMD (e.g., a smartphone, a tablet computer, etc.) can be used to select a group to join, and/or can select one or more other HMDs to link to.

In some embodiments, HMD 100-1 can skip content that would otherwise be presented as a wearer moves around the barrier to navigate to particular content. For example, the user can cause a menu to be presented by HMD 100-1 (e.g., by pushing a hardware button) on HMD 100-1, and from the menu a user can select a command to present particular content, to advance through the content, etc. As another example, the user can access an application on a paired device (e.g., a paired smartphone) to select content to be presented, advance through the content, etc. As yet another example, HMD 100-1 can receive an instruction and/or content from a server (e.g., server 204) indicating which content is to be presented in display space 1106 and/or 1108, which can cause particular content to be presented by HMD 100-1.

In some embodiments, an order in which content is presented in display spaces as users move around the barrier can be generated using any suitable technique or combination of techniques. For example, as described above in connection with the stations of FIG. 2, an administrative user can use an application to assemble a presentation that includes an ordered list of content to be presented in the display spaces. As another example, an order of the content can be randomly presented. As yet another example, an order in which content is presented can be determined from an order in which it is stored in the corpus of content. In some embodiments, the content to be presented in display spaces 1106 and/or 1108 can be preloaded on the HMD and/or can be received while a wearer is moving through physical space 1102. For example, all of the content to be presented can be downloaded, uploaded, side loaded, etc., to the HMD prior to the HMD beginning presentation of the content. As another example, a portion of the content can be preloaded on the HMD, and as the preloaded content is presented, the HMD can acquire additional content (e.g., by downloading the content from server 204, by streaming the content from server 204, etc.). As yet another example, the HMD can stream the content in real time on an as needed basis.

Figure 12:
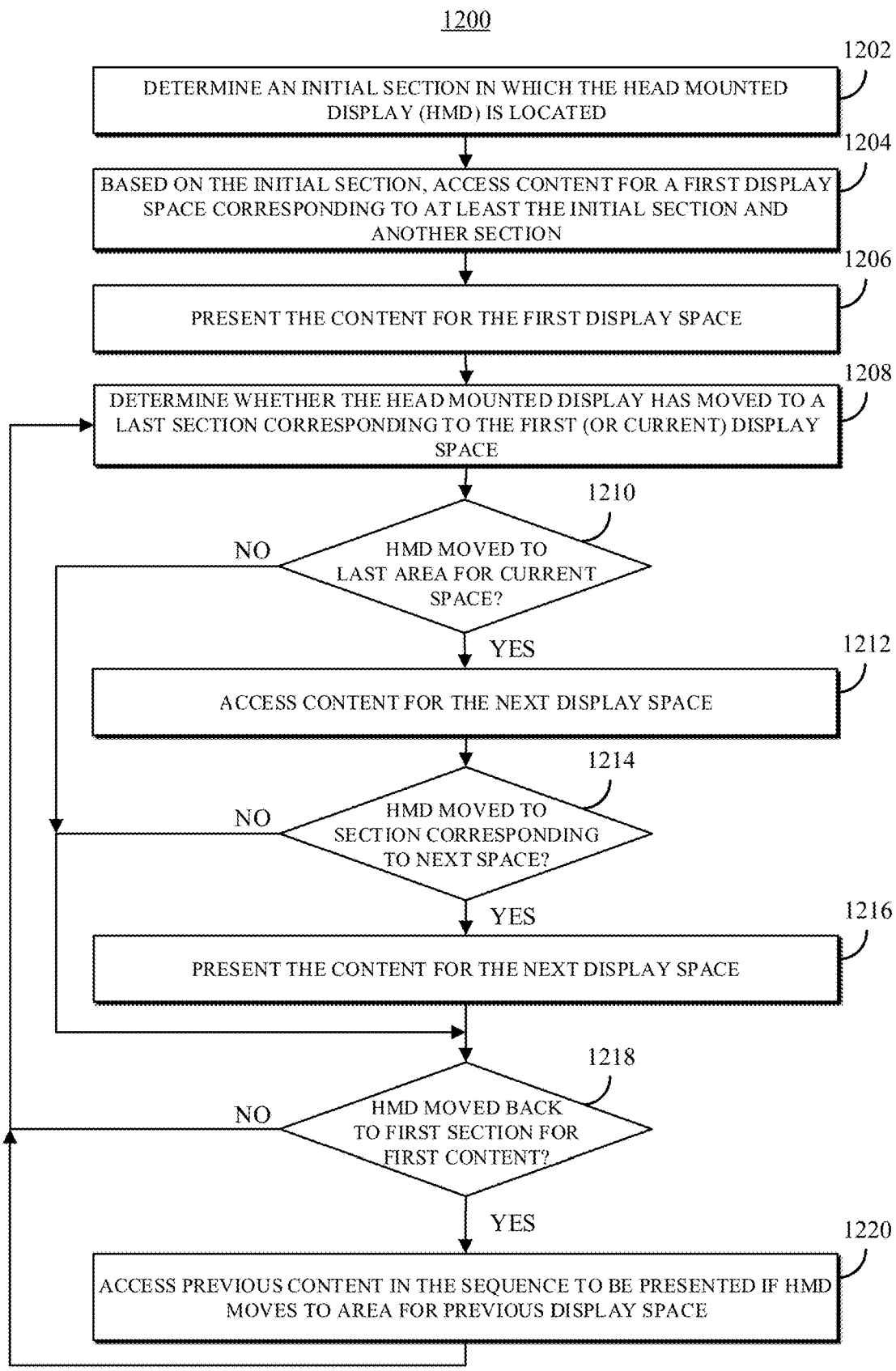
FIG. 12 shows an example of a process for presenting a sequence of content in a limited physical space in accordance with some embodiments of the disclosed subject matter.

FIG. 12 shows an example 1200 of a process for presenting a sequence of content in a limited physical space in accordance with some embodiments of the disclosed subject matter. As shown in FIG. 12, at 1202, process 1200 can determine an initial section in which an HMD (e.g., HMD 100-1) is located from among various sections around a barrier (e.g., barrier 1104). In some embodiments process 1200 can determine the initial section of the HMD using any suitable technique or combination of techniques, such as based on signals from one or more beacons (e.g., Bluetooth beacons), images captured by an image sensor of the HMD, a GPS position of the HMD, etc. In some embodiments, the determination at 1202 can be made by the HMD and/or by another computing device, such as a server (e.g., server 204).

At 1204, process 200 can access content for a first presentation space corresponding to at least the initial section and another section. For example, as described above in connection with FIG. 11, two sections can be associated with one display space. In some embodiments, the content to be presented in the first display space can be, for example, a first portion of content in a sequence of content. In a more particular example, the content to be presented in the first display space can be a first exhibit in a sequence of exhibits.

At 1206, process 1200 can present the content for the first display space. For example, as described above in connection with FIG. 11, when the first display space is within the user's field of view, process 1200 can cause the content for the first display space to be presented.

At 1208, process 1200 can determine whether the HMD has moved to a last section corresponding to a first display space. In some embodiments, each display space can be associated with one or more sections from which the display space is visible. Process 1200 can determine when an HMD moves into the last section corresponding to the first display space using any suitable technique or combination of techniques, such as techniques described above in connection with FIG. 11 and 1202. In some embodiments, sections can be defined in a particular order such that moving through the sections in a first direction causes a next portion of content from a presentation to be presented when the HMD moves to a section corresponding to a next display space that was not viewable from the last section corresponding to the first display space. For example, the last section can be determined as the last section from which the first display space is viewable that is clockwise from the first section. In such an example, as a user moves clockwise around a barrier a presentation can progress forward through a sequence, such as a sequence of 3D scenes.

At 1210, if process 1200 determines that the HMD has moved to the last area corresponding to the first display space ("YES" at 1210), process 1200 can move to 1212. At 1212, process 1200 can access content for the next presentation space. In some embodiments, process 1200 can access the content from internal memory, and/or from remote storage (e.g., by downloading the content from a server, such as server 204). In some embodiments, process 1200 can preload the content (such that it is ready to be presented when the next display space comes into the field of view of the wearer of the HMD.

At 1214, process 1200 can determine whether the HMD has moved to a section corresponding to the next display space (e.g., whether the user has moved around barrier 1104). If process 1200 determines that the HMD has moved to the next display space ("YES" at 1214), process 1200 can cause the content corresponding to the next display space to be presented, at 1216, when the next display space is within the field of view of the wearer of HMD.

At 1210, if process 1200 determines that the HMD has not moved to the last area corresponding to the first display space ("NO" at 1210), or if process 1200 determines that the HMD has not moved to the next display space ("NO" at 1214), process 1200 can move to 1218, and determine whether the HMD has moved back to a first section associated with the first display space. Additionally, while presenting content for the next display space at 1216, the user may move back into the sections associated with the first display space, and process 1200 can move to 1218.

If process 1200 determines that the HMD has not moved back to the first section corresponding to the first space ("NO" at 1218), process 1200 can return to 1208 where it can determine whether the HMD has moved to a last section associated with the current display space (i.e., the next display space when the HMD was in the sections corresponding to the first display space). Otherwise, if process 1200 determines that the HMD has moved back to the first section corresponding to the first space ("YES" at 1218), process 1200 can access a portion of content that precedes the currently presented content, at 1220, such that the HMD can present the content if the HMD moves backward to the previous display space (which may be the same physical space as the next display space). In some embodiments, process 1200 can ensure that when the user moves to a next or previous display space (e.g., on the other side of barrier 1104 in either direction), HMD is always ready to present the content corresponding to that display space.

In some embodiments, process 1200 can be executed by an HMD or by a server. Additionally or alternatively, certain portions of process 1200 can be executed by an HMD, while other portions are executed by one or more other devices, such as a server, a sensor, etc.

Figure 13A:
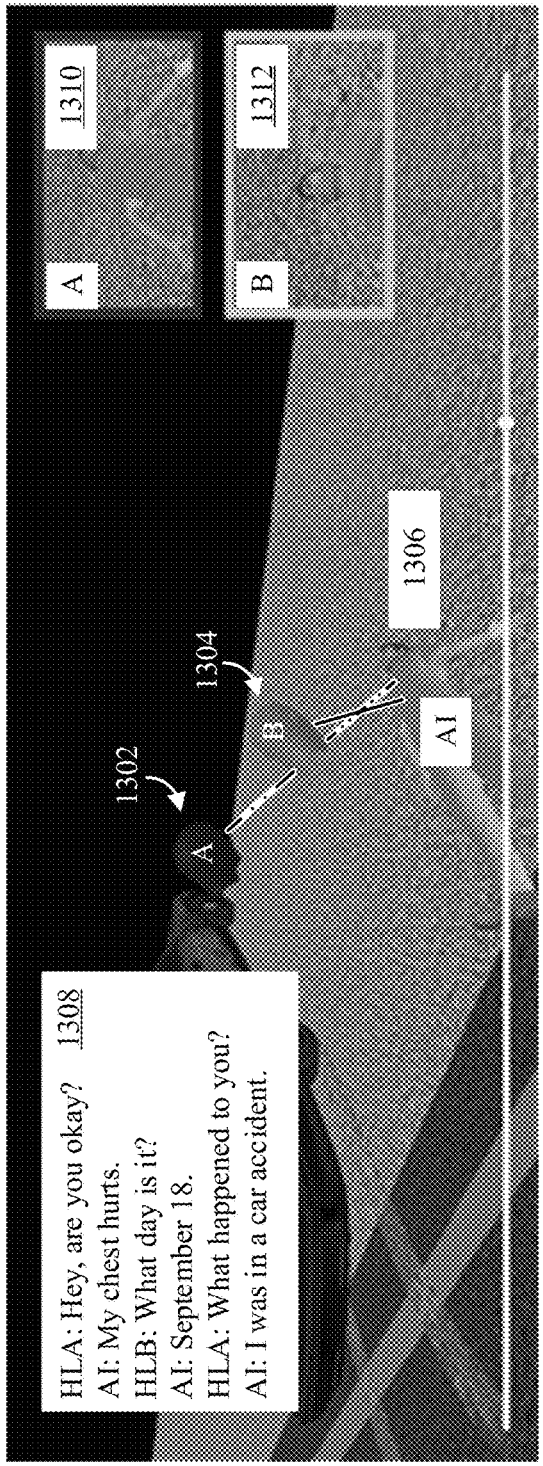
FIG. 13A shows an example of a first review mode in which a user of a first head mounted display and a user of a second head mounted display are interacting with a virtual accident victim in accordance with some embodiments of the disclosed subject matter.

FIGS. 13A to 13D show examples of scenes from a replay of a recorded session of HMDs being used to present content to use in accordance with some embodiments of the disclosed subject matter. In some embodiments, HMDs 100 and/or server 204 can record media (e.g., audio, video, and/or computer generated graphics) depicting the actions of one or more users, and this media can be accessed for review (e.g., by one of the users, by an instructor, etc.). FIG. 13A shows an example of a first review mode in which a first user represented by avatar 1302 (HLA) and a second user represented by avatar 1304 (HLB) are interacting with a virtual accident victim 1306 (AI) in accordance with some embodiments of the disclosed subject matter. In the mode shown in FIG. 13A, text 1308 representing a transcript of a conversation can be presented as the scene progresses. Additionally, windows 1310 and 1312 can show first person views from the HMDs worn by first user 1302 and second user 1304, respectively. In some embodiments, different users can be represented by different colored avatars (and/or personalized avatars), and windows 1310 and 1312 can be color coded (and/or otherwise labeled) to clarify which user was viewing which portion of the scene. In some embodiments, the content that is being reviewed can represent a virtual reality session, and can include graphics and/or images of a scene which was presented to the users via the HMDs worn by the users during the session that is being reviewed. Additionally or alternatively, the content that is being reviewed can represent an augmented reality (or other mixed reality) session, and may not include image date of the broad environment in which the users were located, beyond image data captured by the HMDs (e.g., as shown in windows 1310 and 1312).

In some embodiments, any suitable computing device can be used to review content recorded during a session. For example, a personal computer, laptop computer, tablet computer, etc., can be used to present the review content as two dimensional images. As another example, the content can be presented by an HMD (e.g., as an augmented reality or virtual reality experience), and a wearer of the HMD can navigate around the recorded content (e.g., to view the content from different points of view) by physically moving through the scene, and the content that is presented by the HMD can be based on the user's current position and field of view. As another example, a wearer of the HMD can issue one or more commands to control which portion of the session is being presented (i.e., to navigate through time), or to enter a different review mode (e.g., to present a bird's eye view, to present the video content recorded by an HMD (and/or replay content associated with a point of view of an HMD that was not recorded by the HMD, e.g., for a virtual reality review session) in a fully immersive review mode (i.e., images corresponding to the field of view of the wearer of the HMD are presented in a first person mode).

In some embodiments, during review of the content, a reviewed can select a particular avatar (e.g., avatar 1302 or 1304), and/or a particular window (e.g., window 1310 or 1312) to enter a first person review mode in which the content corresponding to the first person views associated with a particular user are presented as a main view (e.g., rather than the third person view shown in FIG. 13A). In such a first person view, windows corresponding to other users may or may not be presented.

Figure 13B:
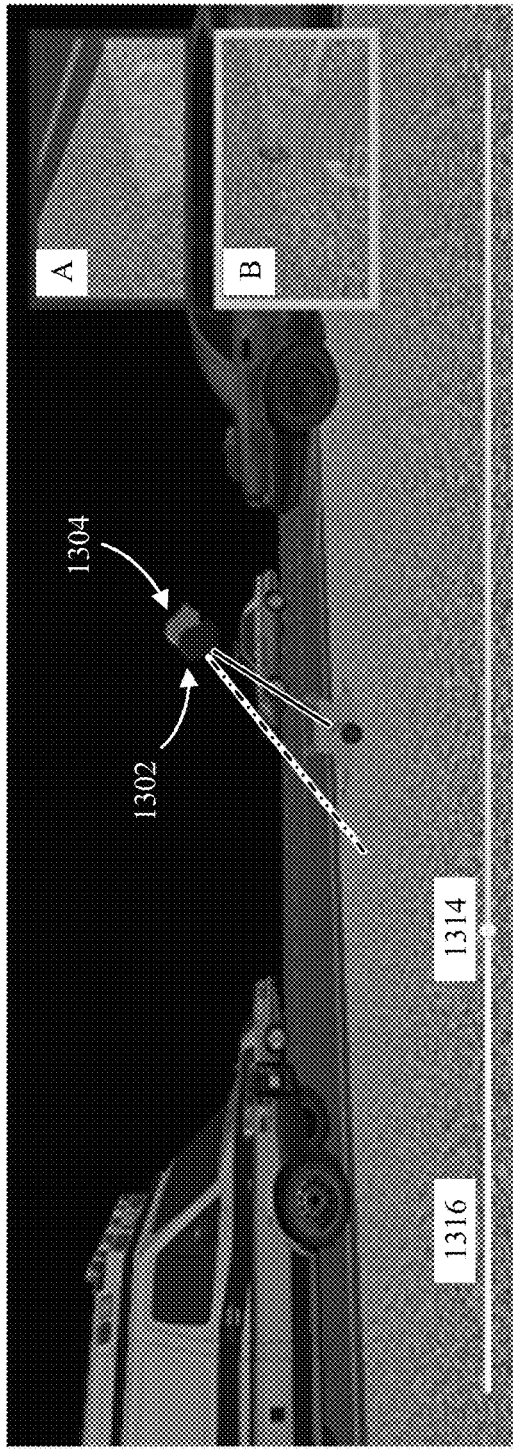
FIG. 13B shows an example of another view of the scene shown in FIG. 13A at a different point in time in accordance with some embodiments of the disclosed subject matter.
Figure 13C:
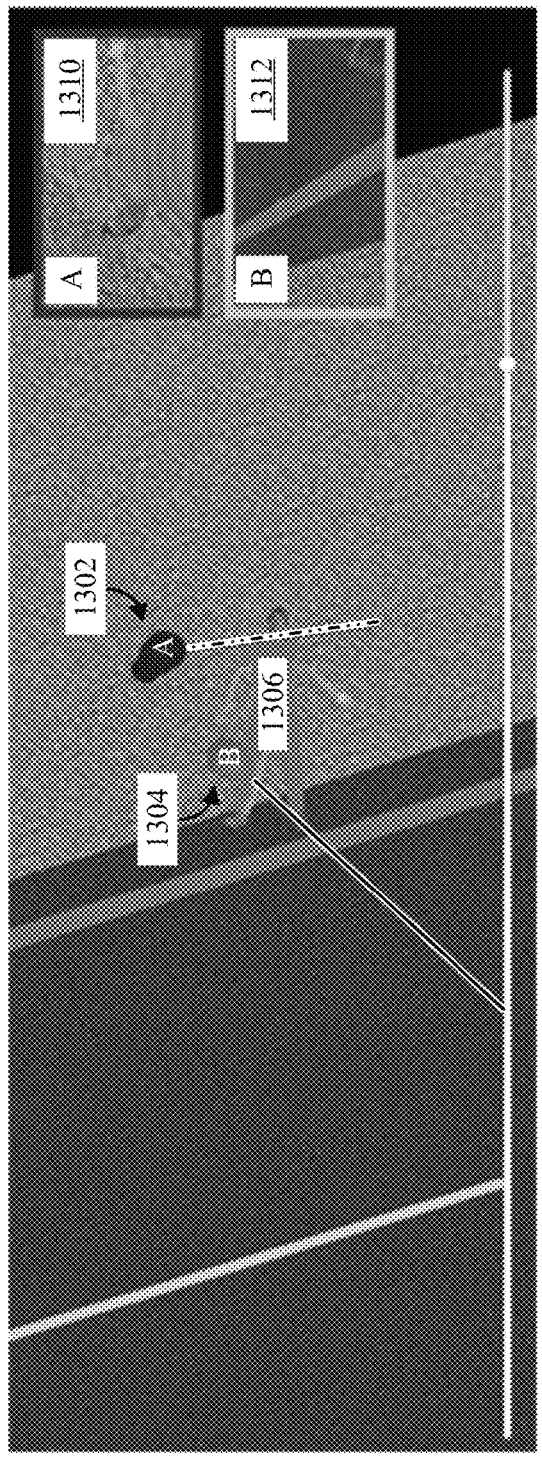
FIG. 13C shows an example of a bird's eye view of the scene shown in FIGS. 13A and 13B at yet another time in accordance with some embodiments of the disclosed subject matter.

FIG. 13B shows an example of another view of the scene shown in FIG. 13A at a different point in time in accordance with some embodiments of the disclosed subject matter. In some embodiments, a user reviewing the recording can navigate to any portion of the recording, for example by fast forwarding or rewinding, dragging user interface element 1314 along scrubber 1316, searching for a keyword (e.g., from a transcript), etc. FIG. 13C shows an example of a bird's eye view of the scene shown in FIGS. 13A and 13B at yet another time in accordance with some embodiments of the disclosed subject matter. In some embodiments, a user can navigate to a particular point (in time) in the content using any suitable technique or combination of techniques, and the technique(s) available may depend on the hardware being used to present the content. For example, if the content is being presented by a 2D display (e.g., by a personal computer or tablet computer), the user can use user interface elements presented in connection with the content (not shown) to pause, play, fast forward, rewind, skip, etc., by selecting the user interface elements (e.g., using a mouse, a touchpad, a touchscreen, a game controller, etc.). As another example, if the content is being presented by a 2D display or by an HMD, the user can use touch commands (e.g., on a touchpad of a paired device, a touchscreen of a paired device, a touch sensitive input on the HMD) to navigate through the content (e.g., tap for play/pause, swipe one direction for fast forward, another direction for rewind, etc.). As yet another example, if the content is being presented by a 2D display or by an HMD, the user can use voice commands to navigate through the content.

Figure 13D:
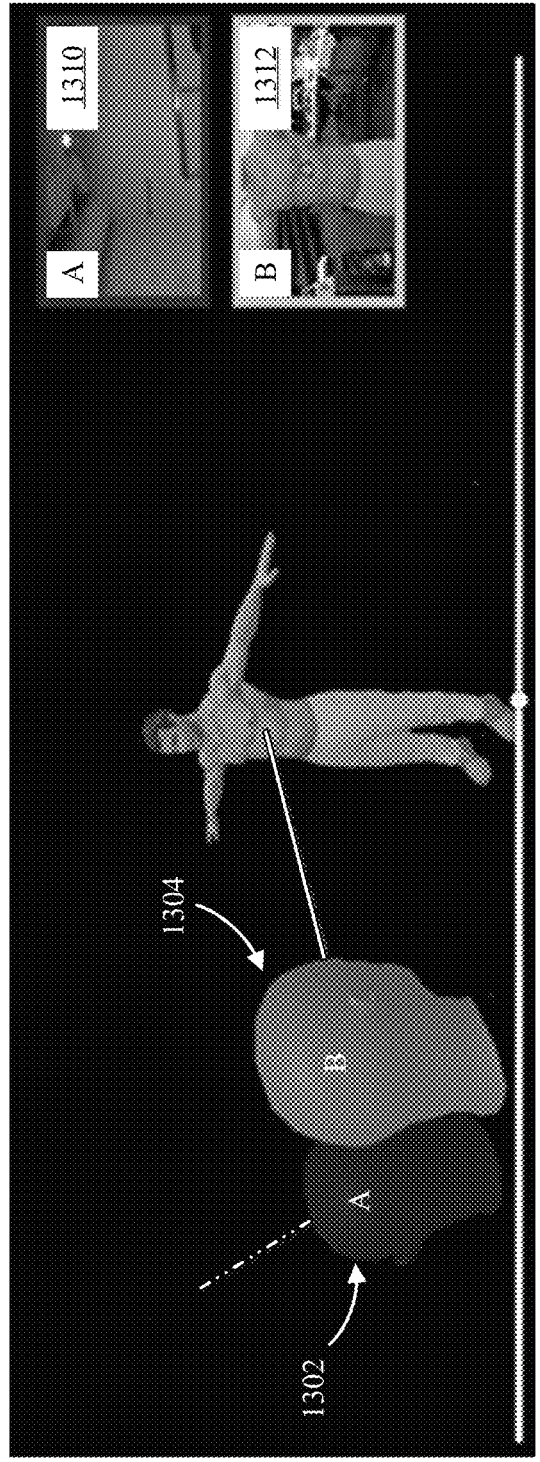
FIG. 13D shows an example of a replay of an augmented reality session in accordance with some embodiments of the disclosed subject matter.

FIG. 13D shows an example of a replay of an augmented reality session in accordance with some embodiments of the disclosed subject matter. As shown in FIG. 13D, video of the broader surrounding physical environment may not be available for replay, but the avatars of the users, a hologram 1318, and windows showing video recorded by the HMDs can be presented, with or without audio and/or text representing a conversation during recording of the video content.

In some embodiments, information that can be used to present content during the review can be received by a computing device at any suitable time and using any suitable technique or combination of techniques. In some embodiments, the content that was presented during the session (e.g., 3D models, one or more virtual environments or portions of virtual environments, etc.) can be received at any suitable time from any suitable source. For example, the content can be downloaded, uploaded, sideloaded, etc., to the computing device prior to the time at which it was used during the presentation, during the presentation, and/or after the presentation. As another example, at least a portion of the content may already be stored by the computing device (e.g., if the computing device was used to prepare a presentation that presented during the session being reviewed, if the computing device is an HMD configured to present the content that was presented during the presentation, etc.). In some embodiments, information about dynamic portions of a session (e.g., position of HMDs, audio, supplemental content, etc.) can be received at any suitable time. For example, the computing device can receive recorded information about the position of HMDs in relation to the presented content, the environment, and/or other HMDs in response to a request to present a particular session (e.g., from a server such as server 204). As another example, the computing device can receive the information about the position of HMDs in relation to the presented content, the environment, and/or other HMDs during the session that is to be reviewed (e.g., the computing device can record the information during the session). As yet another example, the computing device can receive the information about the position of HMDs in relation to the presented content, the environment, and/or other HMDs during review of the session (e.g., the content can be streamed or otherwise communicated as it is needed to review the session). In some embodiments, portions of the dynamic content can be communicated using different formats. For example, information about the position of HMDs, the content being presented, supplemental content, etc., can be communicated as an XML file, and audio content and/or video content can be received as a media file.

Figure 14:
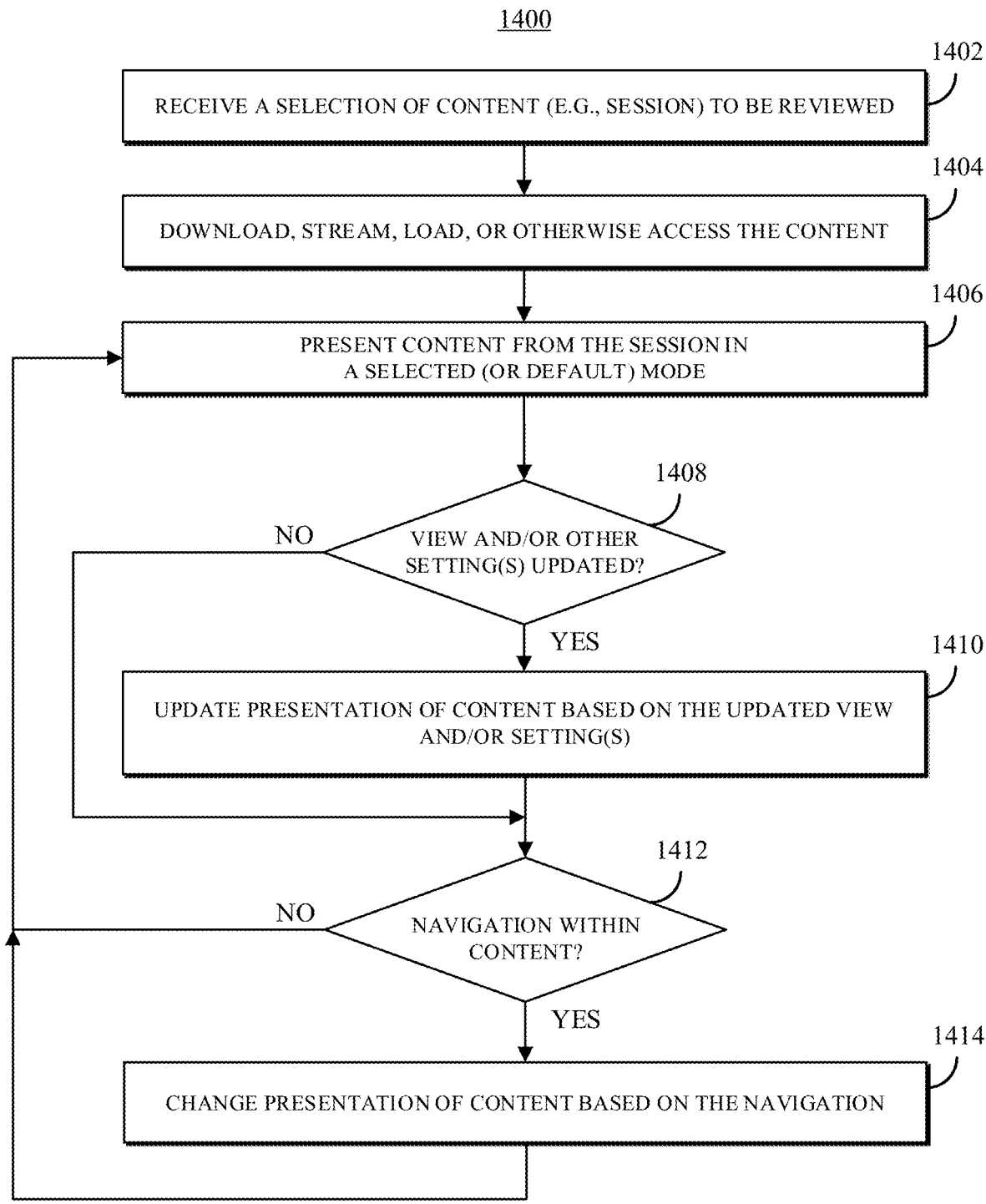
FIG. 14 shows an example of a process for reviewing media recorded by one or more head mounted displays in accordance with some embodiments of the disclosed subject matter.

FIG. 14 shows an example 1400 of a process for reviewing media recorded by one or more HMDs in accordance with some embodiments of the disclosed subject matter. As shown in FIG. 14, at 1402, process 1400 can receive a selection of content to be reviewed. In some embodiments, the content to be reviewed can correspond to a particular session in which HMDs were used to view an augmented reality presentation. For example, the content to be reviewed can correspond to a lecture given to a group of students all utilizing HMDs to follow along with the lecture. In some embodiments, the content can be organized in any suitable fashion, such as by date, title, user, etc.

At 1404, process 1400 can download, stream, load, and/or otherwise access the selected content. In some embodiments, the recorded content can be stored in any suitable location by any suitable computing device. For example, the recorded content can be stored by a user computing device (e.g., user computing device 220), by a server on a local network, by a remote server, by network attached storage, etc. In some embodiments, the selected content can be retrieved from storage for presentation at 1404.

At 1406, process 1400 can present recorded content from the selected session in a selected or default mode (e.g., if no selection was made). For example, process 1400 can present the recorded content from a birds eye perspective, from a ground level perspective, from the perspective of one of the HMDs that recorded the session, etc. In some embodiments, process 1400 can present the text of a transcript.

At 1408, process 1400 can determine whether the viewing mode and/or one or more settings has been updated. For example, a user can select a new viewing mode, can turn text on or off, can turn audio on or off, can turn a view from a particular HMD on or off, etc. If process 1400 determines that the viewing mode and/or one or more settings have been updated ("YES" at 1408), process 1400 can move to 1410 and can present updated content based on the new viewing mode and/or setting. Otherwise, if process 1400 determines that the viewing mode and/or one or more settings have not been updated ("NO" at 1408), process 1400 can move to 1412.

At 1412, process 1400 can determine whether input has been received to navigate within the recorded content. For example, a user can search for a particular time or keyword, can select a fast forward user interface element, can move a progress indicator along a scrubber bar, etc. If process 1400 determines that input has been received to navigate within the recorded content ("YES" at 1412), process 1400 can move to 1414, and can change presentation of the content based on the received navigation input(s). Otherwise, if process 1400 determines that input has not been received to navigate within the recorded content ("NO" at 1412), process 1400 can return to 1406 and continue to present content in a current viewing mode with current settings.

As described in more detail below in connection with FIGS. 15 to 18, in accordance with some embodiments of the disclosed subject matter, mechanisms (which can include systems, methods and/or media) for displaying interactive mixed reality presentations are provided. In some embodiments, a user can designate particular locations in a physical environment at which content (e.g., one or more models) are to be presented using mixed reality devices. For example, an instructor or other designated user (e.g., a user associated with a device that has permission designate locations) can select particular physical locations at which content is to be presented by one or more mixed reality devices.

In some embodiments, a mixed reality device associated with the user that designated the presentation locations and/or mixed reality devices associated with other users, can determine which designated location(s) to use to present content. For example, the designated location(s) can be communicated to mixed reality devices associated with other users, and the mixed reality device can select one of the designated locations to use to present the content based on one or more criteria. In a more particular example, the one or more criteria can include whether a particular designated location (e.g., a main location, a central location, etc.) is associated with the content to be presented. In another more particular example, the one or more criteria can include whether the mixed reality device is within a threshold distance of a particular designated location. In yet another more particular example, the one or more criteria can include a distance to one or more designated locations within a field of view of the user (e.g., defined based on a particular angle of a center line of the mixed reality device).

In some embodiments, the content to be presented can be part of an interactive presentation in which different portions of the content (e.g., different models used to generate mixed reality scenes) are designated for presentation at different physical locations, different virtual locations, different times, and/or in a particular sequence (e.g., as a slide show). For example, a designated user (e.g., a user associated with a mixed reality device and/or other device that has permission to control the presentation) can control which content is to be presented at which location(s) and/or when one or more particular items of content (e.g., particular 3D models) is to be presented.

In a more particular example, an instructor can place different 3D models of human anatomy that illustrate different concepts (or the same concepts in different ways) into an ordered presentation, and/or can assign the different 3D models of human anatomy to different designated physical locations (e.g., stations as described above in connection with FIG. 2). In such an example, the instructor can discuss what is shown in a series of 3D models (e.g., in a similar fashion to a slide show), while students have the opportunity to move around the models freely while listening to and/or interacting with the instructor. At particular points in the presentation when the instructor wishes to illustrate a concept for all students, the instructor can designate content as being for presentation at one or more main (or central) designated locations, and the instructor can interact with the content at that location. At other points in the presentation, the same content and/or different content can be presented at different designated physical locations (e.g., in accordance with instructions entered by the instructor when constructing the presentation and/or during the presentation), and students can freely move between the different physical locations and/or models to explore the concepts discussed by the instructor.

Although the mechanisms described herein are generally described in connection with use in a classroom setting, the mechanisms can be configured for use in a variety of applications. For example, the mechanisms described herein can be configured to provide interactive mixed reality museum displays, to provide multi-player mixed reality game experiences, to provide collaborative work spaces when creating 3D designs with a large amount of detail, etc.

Figure 15:
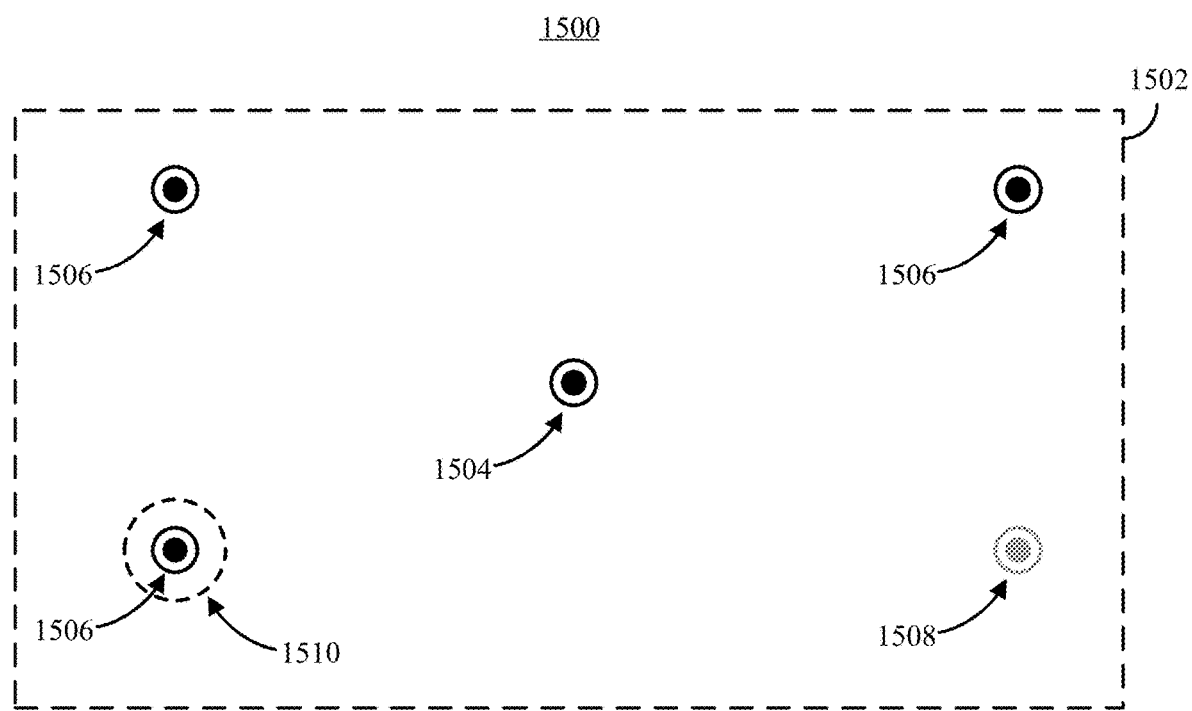
FIG. 15 shows an example of a display space for presenting mixed reality presentations in accordance with some embodiments of the disclosed subject matter.

FIG. 15 shows an example 1500 of a display space for presenting mixed reality presentations in accordance with some embodiments of the disclosed subject matter. As show in FIG. 15, display space 1500 can include a physical area 1502, which may or may not be coextensive with a structure, such as a room of a building. In some embodiments, one or more pods (e.g., stations 202) can be associated with physical area 1502. For example, a main pod 1504 can be designated as corresponding to a central area of physical area 1502. As another example, other pods 1506 (sometimes referred to herein as auxiliary pods) can be designated as corresponding to other locations of physical area 1502.

In some embodiments, mechanisms described herein can limit the number of pods that can be associated with a particular physical space. For example, in FIG. 15 an unset pod 1508 can be available for designation within physical area 1502. Note that the placement of unset pod 1508 in FIG. 15 is merely to illustrate that another pod is available for placement and the actual location designated for pod 1508 can be determined based on user input.

In some embodiments, one or more pods can be associated with a perimeter 1510 surrounding the pod. Note that perimeter 1510 is shown in FIG. 15 in connection with only a single pod to avoid overcomplicating FIG. 15, but each pod can be associated with a perimeter similar to perimeter 1510. In some embodiments, perimeter 1510 can enclose an area surrounding the pod. As described below in connection with FIG. 16, an HMD can determine whether it is within perimeter 1510 when determining which pod to use to present content. In some embodiments, perimeter 1510 can have any suitable radius. For example, perimeter 1510 can have a radius of 0.5 meters, 1 meter, 1.5 meters, 2 meters, or any other suitable value.

Figure 16:
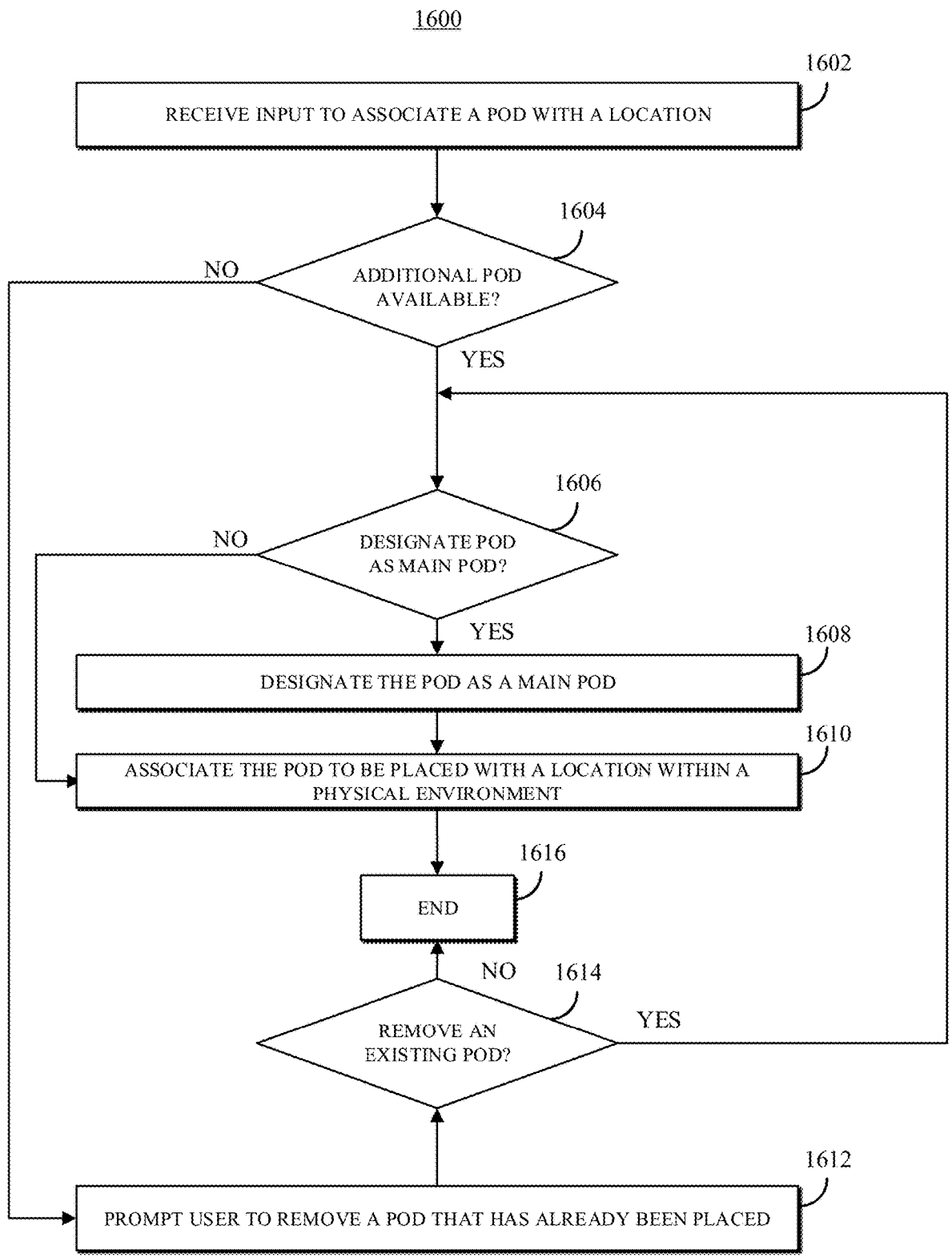
FIG. 16 shows an example of a process for designating locations to be used to anchor models within a display space in accordance with some embodiments of the disclosed subject matter.

FIG. 16 shows an example 1600 of a process for designating locations to be used to anchor models within a display space in accordance with some embodiments of the disclosed subject matter. At 1602, process 1600 can receive input indicating that a particular location is to be associated with a pod. In some embodiments, process 1600 can receive any suitable input indicating that the particular location is to be associated with a pod. For example, process 1600 can receive input via an input device (e.g., via one or more inputs 406, via one or more inputs 424, etc.) indicating that the pod is to be associated with a particular physical location. In a more particular example, the input can be user input received via a button, a microphone (e.g., via voice command), and/or an image sensor (e.g., via a gesture). As another more particular example, the input can be environmental input received via one or more sensors, such as an optical sensor (e.g., via the presence of a particular object or objects in the environment).

At 1604, process 1600 can determine whether an additional pod is available. In some embodiments, process 1600 can impose a limit on the total number of pods available. For example, the number of total pods can be limited to no more than 3 pods, 4 pods, 5 pods, 6 pods, etc.

If process 1600 determines that there is at least one additional pod available ("YES" at 1604), process 1600 can move to 1606. Otherwise, if process 1600 determines that there is not at least one additional pod available ("NO" at 1604), process 1600 can move to 1612. At 1612, process 1600 can prompt a user to remove one or more pods that has already been placed in order to free up space for placing an additional pod.

At 1606, process 1600 can determine whether the pod is to be designated as a main pod. In some embodiments, process 1600 can determine whether a pod is to be designated a main pod using any suitable technique or combination of techniques. For example, a first pod can be designated as the main pod unless otherwise specified. As another example, when input is received to indicate that a pod is to be associated with a location, the nature of the input can determine whether the pod is to be designated as a main pod (e.g., different buttons can be used for main pod and auxiliary pod, different gestures can be used for main pod and auxiliary pod, different symbols can be used for main pod and auxiliary pod, etc.). As another example, when input is received to indicate that a pod is to be associated with a location, process 1600 can prompt a user to provide an indication of whether the pod is to be designated as a main pod.

If process 1600 determines that the pod is to be designated as a main pod ("YES" at 1606), process 1600 can move to 1608. At 1608, process 1600 can designate the pod to be placed as a main pod, and can move to 1610. For example, process 1600 can include information designating the pod as a main pod (e.g., a flag, a prefix to identifying information associated with the pod, a suffix to identifying information associated with the pod, a name, etc.) in a data structure (e.g., a database, a file structure, a list, etc.) used to store information about one or more pods.

Otherwise, if process 1600 determines that the pod is not to be designated as a main pod ("NO" at 1606), process 1600 can move to 1610. At 1610, process 1600 can associate the pod with a physical location within the physical environment based on any suitable input. For example, the physical location can be determined based on input from an optical sensor. In such an example, the input received at 1602 can be a button press, a voice command, etc., and the physical location at which the pod is to be associated can be based on a location within a field of view of the optical sensor. In some embodiments, the particular location within the field of view that is to be used can be determined using any suitable technique or combination of techniques. In a particular example, process 1600 can use the location that coincides with a center of the field of view as the location at which to associate the pod. As another particular example, process 1600 can cause a user interface element to be presented (e.g., via a transparent display of an HMD) in connection with the mixed reality scene, and can use the location that coincides with where the user interface element is presented as the location at which to associate the pod.

Additionally or alternatively, in an example in which the physical location can be determined based on input from an optical sensor, the input received at 1602 can be image data from the optical sensor (e.g., in the form of a symbol included in the image data), and the physical location at which the pod is to be associated can be based on a location of the symbol in the physical environment.

In such examples, a user wearing an HMD executing at least a portion of process 1600 (e.g., executing process 1600 itself, or in conjunction with a server such as server 204) can look at a location at which a pod is to be placed, and can provide user input (e.g., a button press, a voice command, a gesture) and/or environmental input (e.g., an image target within the physical environment) indicating that a location within the field of view of an optical sensor is to be associated with a pod.

As another example, the physical location can be determined based on a location of a head mounted display when input is received. In such an example, the input received at 1602 can be a button press, a voice command, etc., and the physical location at which the pod is to be associated can be based on a location at which a particular head mounted display when the input is received. In a more particular example, a user wearing an HMD executing at least a portion of process 1600 (e.g., executing process 1600 itself, or in conjunction with a server such as server 204) can walk to a location at which a pod is to be placed, and can provide user input (e.g., a button press, a voice command, a gesture) and/or environmental input (e.g., an image target within the physical environment) indicating that a current location of the HMD is the location to be associated with the pod.

As described above, at 1612, if there are no available pods, a user can be prompted to remove a pod before a pod can be added. In some embodiments, such a prompt can provide a list of current pods from which a user can choose one pod to remove. For example, such a list can be presented by an HMD (e.g., as a hologram), by another device (e.g., a smartphone or tablet associated with the user, such as a smartphone or tablet that is paired with an HMD associated with the user). In some embodiments, such a prompt can cause any pods within a field of view (e.g., of an HMD executing at least a portion of process 1600) to be highlighted and selectable for removal.

In some embodiments, process 1600 can receive input indicating which pod (if any) to remove using any suitable technique or combination of techniques. For example, process 1600 can receive a selection of a pod from a list for removal. As another example, process 1600 can receive input comparable to input described above in connection with 1610 for identifying a location at which to place a pod to indicate which pod to remove.

At 1614, process 1600 can determine whether input has been received to remove an existing pod. If process 1600 determines that an existing pod is not to be removed ("NO" at 1614), process 1600 can end at 1616. Similarly, after placing a pod at 1610, process 1600 can end at 1616.

Otherwise, if process 1600 determines that an existing pod is to be removed ("YES" at 1614), process 1600 can remove the existing pod selected at 1612 and return to 1606.

In some embodiments, a main pod can be designated when pods are being placed, or an existing pod can be re-designated as a main pod at any suitable time.

In some embodiments, after a pod has been added, removed, or designated as a main pod, process 1600 can update information indicative of pod locations and designations (e.g., in memory), such that the information can be conveyed to one or more HMDs that are to be used to present a mixed reality presentation. For example, process 1600 can provide a list of pod locations and designations (e.g., via a server, such as server 204) to one or more HMDs prior to a presentation, and/or during a presentation.

In some embodiments, a group of pods in a physical area (e.g., physical area 1502) can be associated with a single main pod. Additionally or alternatively, multiple main pods can be associated with a group of pods in a physical area. For example, for a larger group of pods, multiple main pod can be designated if the number of pods placed is over a threshold (e.g., one main pod per 5 pods, etc.).

Figure 17:
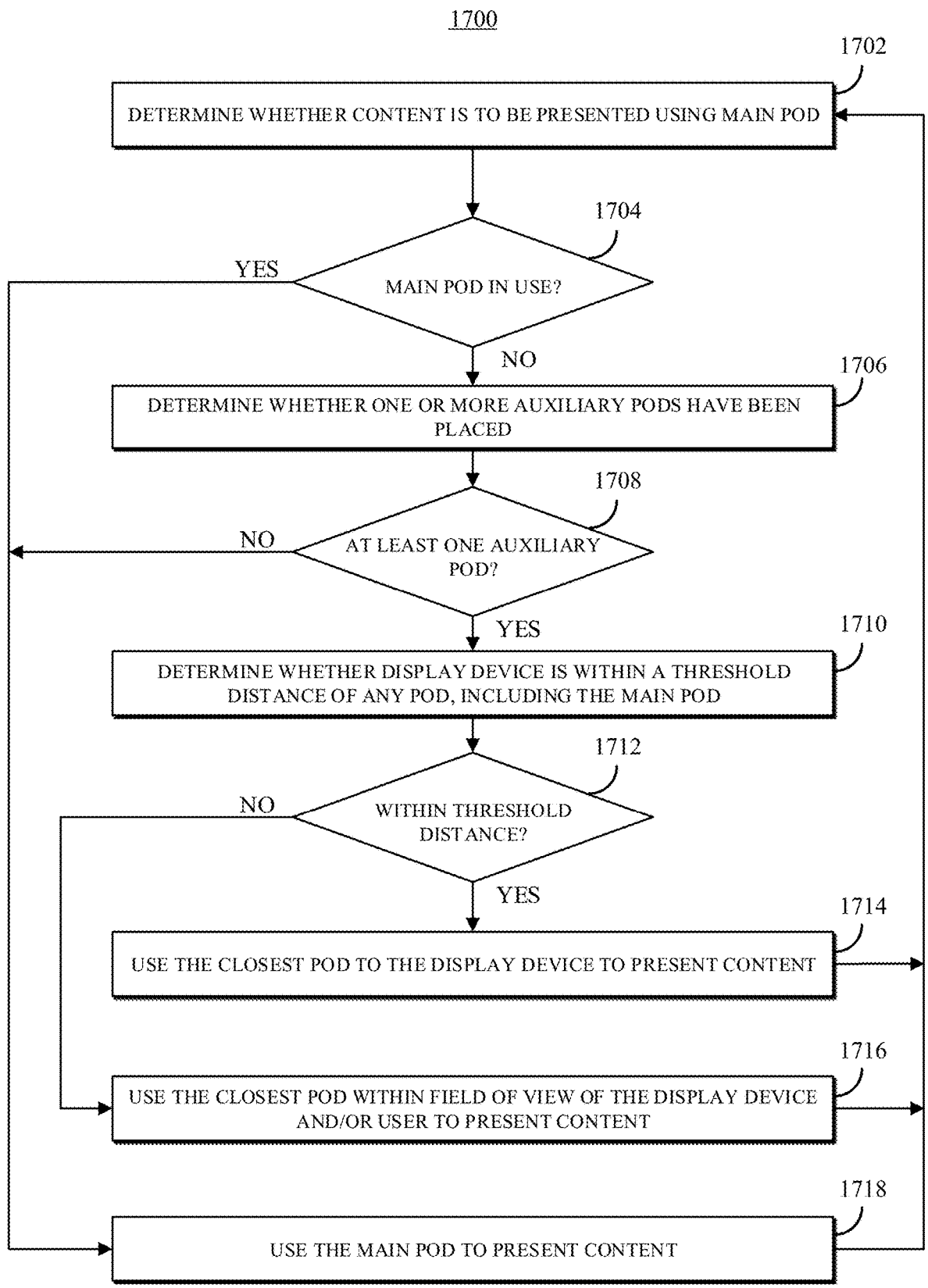
FIG. 17 shows an example of a process for presenting mixed reality presentations in connection with a display space in accordance with some embodiments of the disclosed subject matter.

FIG. 17 shows an example 1700 of a process for presenting mixed reality presentations in connection with a display space in accordance with some embodiments of the disclosed subject matter. At 1702, process 1700 can determine whether content is to be presented using a main pod. In some embodiments, process 1700 can determine that a main pod is to be used based on any suitable information. For example, process 1700 can receive an indication from a device (e.g., a server, an HMD that is presenting content, etc.) that content to be presented at some point in time is to be presented using a main pod (e.g., immediately, in a certain number of seconds, etc.). As another example, process 1700 can determine that a main pod is to be used based on an indication associated with a particular item(s) of content.

At 1704, if process 1700 determines that the main pod is currently to be used ("YES" at 1704), process 1700 can move to 1718. At 1718, the main pod can be used to present content. For example, if an HMD executing process 1700 determines that a main pod is to be used (e.g., at 1704), the HMD can inhibit the content (and/or any other content) from being presented at any auxiliary pods, such that the designated content can only be presented using the main pod. In some embodiments, if the HMD is not directed toward the main pod, the content (e.g., at least a visual portion of the content) can be inhibited from being presented by the HMD altogether.

Otherwise, if process 1700 determines that presentation using the main pod is not currently mandated ("NO" at 1704), process 1700 can move to 1706. At 1706, process 1700 can determine whether one or more auxiliary pods have been placed. For example, the main pod may be the only pod that has been placed, in which case the main pod would be used regardless of whether its use was mandated. In some embodiments, process 1700 can use any suitable information to determine whether one or more auxiliary pods have been placed. For example, process 1700 can receive information indicative of pod locations and designations (e.g., from a server, such as server 204; from an HMD that is presenting content, etc.), and can use the information to determine whether any auxiliary pods have been placed.

At 1708, if process 1700 determines that at least one auxiliary pod has not been placed ("NO" at 1708), process 1700 can move to 1718 to use the main pod. Otherwise, if process 1700 determines that at least one auxiliary pod has been placed ("YES" at 1708), process 1700 can move to 1710.

At 1710, process 1700 can determine whether a display device (e.g., a display device, such an HMD, executing process 1700) is physically located within a threshold distance of any pod, including any auxiliary pods and a main pod. In some embodiments, process 1700 can use any suitable technique or combination of techniques to determine whether a display device is physically located within a threshold distance of a pod. For example, process 1700 can determine the physical location of the display device within a physical area (e.g., based on GPS; based on signals from one or more transmitters such as Bluetooth low energy beacons, RFID tags, cellular base stations, etc.). In such an example, process 1700 can compare the physical location of the display device to physical locations of the pods (e.g., based on information indicative of pod locations, based on observed pod locations, etc.).

At 1712, if process 1700 determines that the display device is within the threshold distance of any pod ("YES" at 1712), process 1700 can move to 1714. At 1714, process 1700 can use the pod that the device is located near (e.g., within a perimeter, such as perimeter 1510, of the pod) to present content. If an HMD executing process 1700 determines that the nearest pod is to be used (e.g., at 1712), the HMD can inhibit the content from being presented at any other pods, such that the content can only be presented using the close pod. In some embodiments, if the HMD is not directed toward the close pod, the content (e.g., at least a visual portion of the content) can be inhibited from being presented by the HMD altogether.

Otherwise, if process 1700 determines that the display device is not within the threshold distance of any pod ("NO" at 1712), process 1700 can move to 1716. At 1716, process 1700 can select a closest pod within a field of view of the device (e.g., corresponding to a presumed field of view of the user). As described below in connection with FIG. 18, the field of view can be defined based on a forward axis of the HMD or other device being used to present content. In some embodiments, distance can be determined based only on axes corresponding to lateral distance, and a height of the display device above the pods can be ignored. Alternatively, in some embodiments, distance can be determined based on all axes, including height. For example, if a height difference is greater than a threshold, process 1700 can determine that the pod is likely not on a same level (e.g., corresponding to floors of a building) as the display device. In such embodiments, height differences that are less than the threshold can be ignored.

In some embodiments, one or more portions of process 1700 can be executed by a display device (e.g., an HMD), and/or one or more other portions of process 1700 can be executed by another device (e.g., a server, such as server 204). For example, the display device can generate information indicative of its location and direction and convey the information to a server, and the server can perform calculations to determine which pod to use to present content.

Figure 18:
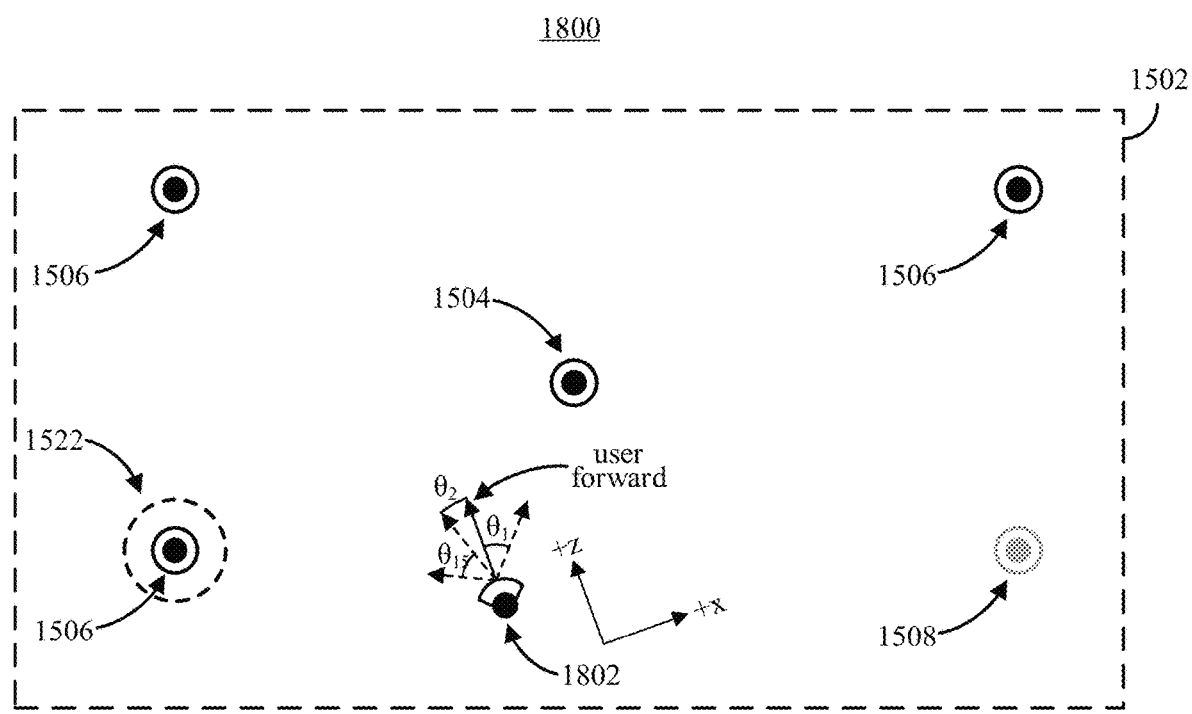
FIG. 18 shows an example of a user device located within a display space for presenting mixed reality presentations in accordance with some embodiments of the disclosed subject matter.

FIG. 18 shows an example of a user device located within a display space for presenting mixed reality presentations in accordance with some embodiments of the disclosed subject matter. As shown in FIG. 18, a device 1802 associated with a user can have a forward axis, and an angle θ between the forward axis and each pod can be used to determine whether a pod is within a field of view using any suitable technique or combination of techniques. For example, the dot product between a unit vector along the forward axis and a unit vector pointing toward each pod (e.g., a unit vector located on the x/z plane) can be calculated. In such an example, if the dot product is less than a threshold value, a process determining which pod to use (e.g., process 1700) can determine that the pod is within a field of view of the device and/or user. In some embodiments, the threshold value can be any suitable value, such as 0.707 (e.g., corresponding to 45° on either side of the forward axis, a field of view of 90°). However, this is merely an example, and the value corresponding to field of view can be larger or smaller, such as a value corresponding to a field of view of up to 120 degrees Corresponding to an average human vision span, or even wider to include peripheral vision, or as low as 10°-20° representing a gaze direction. In some examples, the field of view can be represented in range from about 0.087 (corresponding to a total field of view of 10°, or 5° to either side of forward) to about 0.866 (corresponding to a total field of view of 120°, or 60° to either side of forward).

In some embodiments, a vector pointing to each pod can be generated based on the current location and forward axis direction of display device 1802, and information indicative of the location of each pod.

In some embodiments, the after identifying pods within the field of view, a process determining which pod to use (e.g., process 1700) can determine which of the pods within the field of view is closest to the display device. In some embodiments, only lateral distance (e.g., distance along the x/z plane shown in FIG. 18) can be taken into account when determining distance. Alternatively, as described above, height differences (e.g., distance along a y-axis) over a threshold can be used when determining a closest pod. For example, if a height difference to a pod is over a threshold, the pod can be ignored. As another example, if a height difference to a pod is over a threshold, the distance can be calculated using a differences between the display device and the pod along all three axis.

Figure 19:
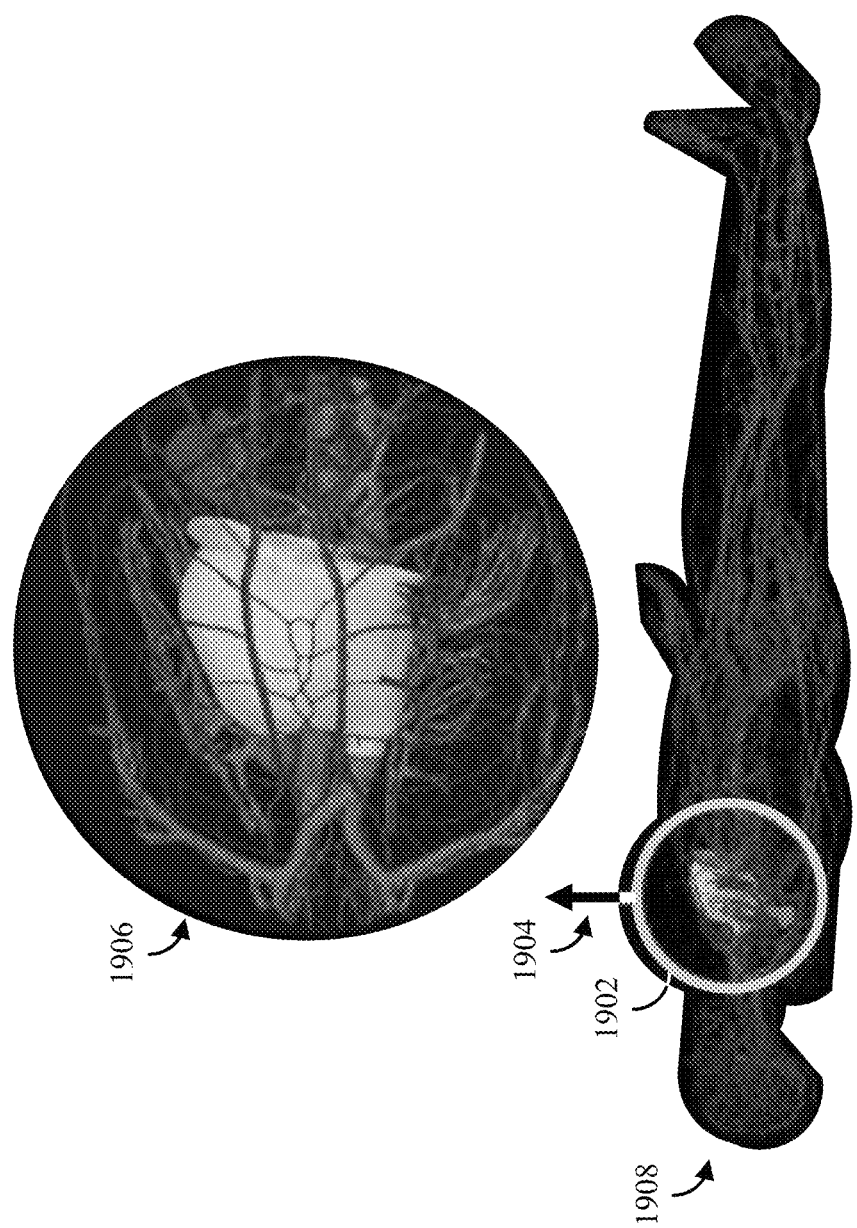
FIG. 19 shows an example of a 3D model and a magnified portion of the 3D model in accordance with some embodiments of the disclosed subject matter.

FIG. 19 shows an example of a 3D model and a magnified portion of the 3D model in accordance with some embodiments of the disclosed subject matter. As shown in FIG. 19, mechanisms described herein can be implemented as a tool (e.g., a magnifying glass tool) that can be used to isolate and expand mixed reality content (e.g., holographic content). This can allow a user (e.g., an instructor) to present a more focused piece of a hologram without eliminating the context of the whole model. In some embodiments, the magnifying glass tool can facilitate a more focused view for a single user (e.g., a wearer of HMD 100) and/or multiple users (e.g., wearers of other HMDs receiving instructions to present particular content based on input provided using a particular device, such as HMD 100, user input device 230, or any suitable device that can receiver input).

As shown in FIG. 19, the magnifying glass tool can be implemented using two spheres (sometimes referred to herein as bubbles). For example, magnifying glass tool can be implemented using a first sphere 1902 (sometimes referred to herein as a magnifier user interface element) and a second sphere 1906 (sometimes referred to herein as a magnifier presentation element). In some embodiments, first sphere 1902 can be moved and scaled to surround an area of content 1908 that a user wishes to isolate. Second sphere 1906 can be used to display a duplicate of the content designated by a position of the first sphere (e.g., content that falls within the boundaries of the first sphere). In some embodiments, the duplicated content can be scaled, translated, and/or rotated (e.g., a primary viewing direction for the second sphere can be indicated by a user interface element 1904) to match a transform of content 1908. In some embodiments, this can cause the content in the second sphere to correspond to what is within the first sphere, scaled to the size of the second sphere and translated/rotated to a new location.

In some embodiments, the primary viewing direction indicated by user interface element 1904 can reflect a view that is presented by HMD 100, and/or by other HMDs. For example, a device (e.g., HMD 100) presenting content 1908 can cause magnified content presented within second sphere 1906 to be presented as though the device were viewing the content 1908 from a direction indicated by user interface element 1904.

In some embodiments, when multiple devices are simultaneously presenting content 1908, each device can be configured to present the magnified content within second sphere 1906 as though that device were viewing the content 1908 from a direction indicated by user interface element 1904. In such embodiments, each device can present a different view of content 1908 (e.g., based on a position of the device with respect to a physical location at which content 1908 is anchored), and can present identical magnified content in sphere 1906.

Figure 20:
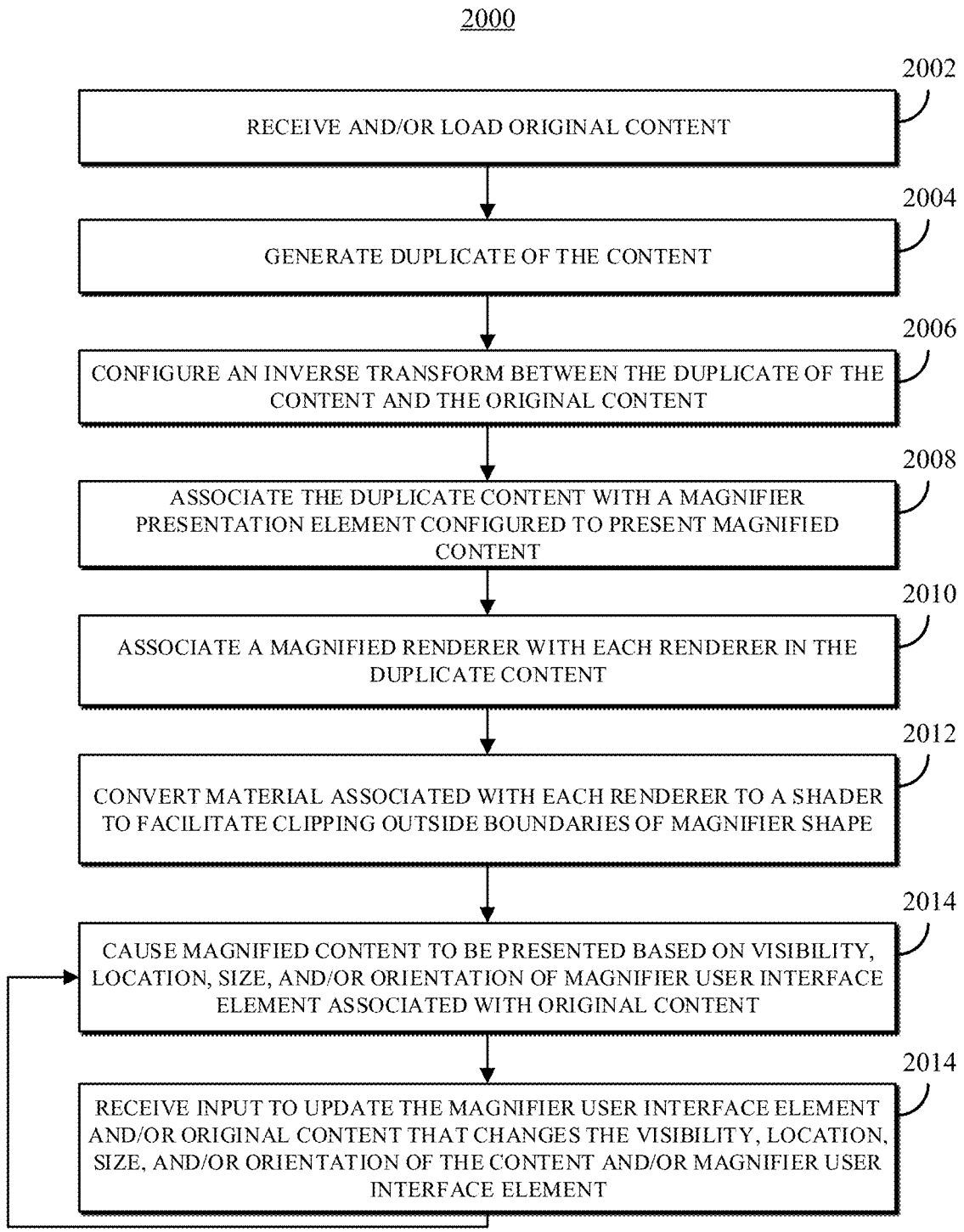
FIG. 20 shows an example of a process for displaying magnified interactive mixed reality content in accordance with some embodiments of the disclosed subject matter.

FIG. 20 shows an example 2000 of a process for displaying magnified interactive mixed reality content in accordance with some embodiments of the disclosed subject matter. In some embodiments, operation of the magnifying glass tool described above in connection with FIG. 19 can be facilitated by preparing the content using a process shown in FIG. 20.

At 2002, process 2000 can receive and/or load content to be presented (e.g., by an HMD executing process 2000, by an HMD in communication with a server executing process 2000). In some embodiments, process 2000 can receive the content from any suitable source and/or using any suitable technique or combination of techniques. For example, process 2000 can retrieve the content from long term memory, and load the content into working memory (e.g., memory associated with a GPU, such as one or more GPU caches; memory associated with a CPU, such as a CPU cache; RAM; and/or any other suitable memory). In some embodiments, process 2000 can receive the content from another computing device, such as another HMD, a local server and/or a remove server (either of which may be another HMD), and/or from any other suitable device.

In some embodiments, process 2000 can load the content using any suitable technique or combination of techniques. For example, process 2000 can transfer the content into a portion of memory (e.g., GPU memory, CPU memory) that can be used to render an image using the content. In some embodiments, process 2000 can load content at 2002 that may be presented by a device executing process 2000. For example, process 2000 can load content corresponding to n objects (e.g., 3D models) that a device executing process 2000 may present. In such an example, a subset of the n objects (e.g., m<n) may be rendered in a particular scene (e.g., based on a position of the device executing process 2000, as described above in connection with FIGS. 15-18, based on instructions received from a server, etc.). In some embodiments, each object can be associated with a renderer, and a renderer can be enabled to facilitate rendering of the object (although the object may not be rendered if it is not within a current viewing frustum), and can be disabled to inhibit rendering of the object (e.g., regardless of whether the object is within a current viewing frustum). In some embodiments, process 2000 can wait for the content to all be loaded, which can reduce a likelihood that process 2000 interferes with anything else HMD 100 is doing.

At 2004, process 2000 can generate a duplicate of the content that can be used to render a magnified version of a portion of the content loaded at 2002. In some embodiments, process 2000 can generate the duplicate using any suitable technique or combination of techniques. For example, process 2000 can generate a second copy of the content within memory (e.g., each model can be reproduced in memory at a different address, such that there are multiple versions of each model). As another example, process 2000 can re-index the content (e.g., generating a new set of pointers to the addresses at which the original content is stored, such that there is one copy of each model in memory, with multiple separate pointers to the models).

At 2006, process 2000 can configure an inverse transform between the duplicate of the content and the original content that causes the content that is rendered within a magnifier presentation element used to present magnified content is scaled and translated appropriately. In some embodiments, process 2000 can configure the inverse transform using any suitable technique or combination of techniques. For example, process 2000 can use techniques described below in connection with FIG. 21 to configure an inverse transform between the duplicate content and the original content.

As another example, process 2000 can cause movement of a magnifier user interface object to generate an opposite movement of the duplicate content, as the magnifier presentation element remains stationary with respect to the original content (e.g., as described above in connection with FIG. 19) and the magnifier user interface element moves with respect to the original content. Accordingly, a movement of the magnifier user interface element along the positive x direction can be mirrored by moving the duplicate content in the negative x direction with respect to the magnifier presentation element.

As yet another example, process 2000 can cause a decrease in size of the magnifier user interface element to generate an increase in size of the duplicate content, and vice versa. In such an example, the size of the magnifier presentation element can remain static with respect to the original content (e.g., as described above in connection with FIG. 19) while the volume of the original content enclosed within the magnifier user interface element changes as the size of the magnifier user interface element changes. Accordingly, an increase or decrease in size (e.g., a decrease in diameter) of the magnifier user interface element can be reflected in a corresponding decrease or increase in the size of the duplicate content. In some embodiments, process 2000 can configured the inverse transform as an inverse transform matcher, which can, for example, run a loop to keep the content in the magnifier presentation element (e.g., second sphere 1906) the same as the content in the magnifier user interface element (e.g., first sphere 1902).

At 2008, process 2000 can associate the duplicate content with a magnifier presentation element (e.g., with a spherical shape) configured to present magnified content via an HMD. For example, process 2000 can associate the duplicate content with the magnifier presentation element (e.g., by designating the duplicate content a child of the sphere). In such an example, when the duplicate content is rendered, a location of the duplicate content can be designated in a coordinate system associated with the magnifier presentation element (e.g., a local coordinate system associated with the sphere). In some embodiments, the original content can be anchored at a first set of coordinates (e.g., with respect to an origin associated with a physical location, such as a station or pod, with respect to a global origin), and the magnifier presentation element can be anchored at another set of coordinates, such as coordinates that cause the magnifier presentation element to be visible to a user (e.g., without obstructing, or being obstructed by, the original content). In such embodiments, multiple coordinate systems can be used when rendering the original content and the duplicate content. For example, a first coordinate system can be used to determine where original content is anchored and where the magnifier presentation element is anchored, a second coordinate system can be used to determine a location of the magnifier user interface element with respect to the content, and a third coordinate system can be used to determine a location of the duplicate content with respect to the magnifier presentation element. In some embodiments, one or more of the coordinate systems can be associated with a scale and axes, which may be different than a scale and/or axes one or more other coordinate systems. For example, axes of a coordinate system associated with the original content may be oriented differently than the axes of a coordinate system associated with the magnifier presentation element.

In some embodiments, process 2000 can associate the magnifier user interface element with the original content (e.g., by designating the magnifier user interface element a child of the original content) which can facilitate movement of the magnifier user interface element with respect to the original content, and can associate the duplicate content with the magnifier presentation element, which can facilitate movement of the duplicate content with respect to the magnifier presentation element.

As 2010, process 2000 can associate a magnified renderer with each renderer in the duplicate content. In some embodiments, a renderer can be a component configured to render a particular object. For example, a renderer can be associated with a particular model, and the renderer can define a mesh that can be used to render a 3D shape of the model, and can be define a material (e.g., texture, a UV map, color, density, a Fresnel value, transparency, and/or any other suitable properties) that can be used to render an appearance of the model. In some embodiments, the magnified renderer can be configured to render a portion of the content that is to be magnified using the same operations as a renderer associated with the original content using any suitable technique or combination of techniques. For example, process 2000 can configure the magnified renderer to copy operations of a renderer associated with the original content using techniques described below in connection with FIG. 22 (e.g., using a mask and/or shader to inhibit rendering of the duplicate content that does not fall within a boundary of the magnifier presentation element). As another example, a renderer can perform a set of operations (e.g., using a set equations) that transform the original content (e.g., using a mesh associated with a model, a material associated with a model, a viewing angle between the model and a virtual camera, a viewing frustum, etc.) into a visualization that can be presented using a display device. The set of operations can dictate whether and/or how each portion of the model is presented. In such an example, the magnified renderer can use at least a portion of the same inputs (e.g., the mesh, the material, the viewing frustum) and one or more additional inputs (e.g., a different viewing angle between the duplicate model and the virtual camera, a shader used to clip portions of the duplicate model that fall outside the magnifier presentation element), and at least a subset of the same set of operations, to transform the duplicate content into a magnified visualization of the original content that can be presented using the display device.

At 2012, process 2000 can associate a shader with each magnified renderer (e.g., with a material of an object associated with the magnified renderer) using any suitable technique or combination of techniques. This can facilitate clipping of content that falls outside of the boundaries of the magnifier presentation element, which can facilitate magnification of just content that falls within the magnification user interface element.

At 2014, process 2000 can cause magnified content to be presented within the magnifier presentation element based on visibility of the original content, and a location, size, and/or orientation of the magnifier user interface element associated with the original content. For example, process 2000 can cause a device executing process 2000 (e.g., an HMD, a server) to render a magnified portion of the duplicate content corresponding to a portion of the original content that falls within the magnifier user interface element based on the inverse transform between the duplicate content and the original content. For example, process 2000 can scale and translate the duplicate content such that the portion of the duplicate content presented within the magnifier presentation element corresponds to the portion of original content presented within the magnifier user interface element. As another example, process 2000 can rotate the duplicate content (and/or a coordinate system associated with the magnifier presentation element) based on a direction of a user interface element indicative of a viewpoint from which to view the magnified content (e.g., user interface element 1904 described above in connection with FIG. 19). In such an example, the duplicate content, as presented, can be rotated such that a view (e.g., an initial view) of the duplicate content presented within the magnifier presentation element represents a view of the original content from a direction opposite of a direction indicated by user interface element 1904.

At 2016, process 2000 can receive input that affects the magnifier user interface element and/or the original content that changes the visibility of the content and/or that changes the location, size, and/or orientation of the magnifier user interface element. For example, process 2000 can receive input (e.g., from user input device 230) to alter the original content, such as input to change a model that is being presented, to change how the content is presented (e.g., to change one or more colors of the content), to change a layer of a model that is being presented, etc. As another example, process 2000 can receive input (e.g., from user input device 230) to alter the size of the magnifier user interface element, such as input to increase a diameter of the magnifier user interface element, or decrease the diameter of the magnifier user interface element. As yet another example, process 2000 can receive input (e.g., from user input device 230) to alter a position of the magnifier user interface element, such as input to move the position of the magnifier user interface element to a new location. As still another example, process 2000 can receive input (e.g., from user input device 230) to alter an orientation of the magnifier user interface element, such as input to rotate the direction of user interface element 1904.

In some embodiments, process 2000 can trigger an update on each magnified renderer for the rest of the runtime of the application presenting the content (e.g., content 1908) to account for changes in the original content, and modify the duplicate content accordingly. For example, process 2000 can return to 2014 and cause updated magnified content to be presented.

FIG. 21 shows an example 2100 of a process for matching an inverse transform in connection with displaying magnified interactive mixed reality content in accordance with some embodiments of the disclosed subject matter.

At 2102, process 2100 can determine an inverse of a scale of the magnifier user interface element associated with the original content. For example, the magnifier user interface element (e.g., sphere 1902) can be presented at an initial size (e.g., a size when the magnifier user interface element is first presented), which may be a maximum size. In such an example, the size of the magnifier user interface element can be expressed as a predetermined number of voxels in diameter (or radius), where the voxel size can be determined based on content 1908. As another example, the initial size of the magnifier user interface element can be set to have a diameter equal to a dimension of the content (e.g., a height, width, or length of content 1908). As yet another example, a reference size for the magnifier user interface element can be set to a multiple of the initial size (e.g., 1.5 times as large, twice as large, etc.).

In some embodiments, process 2100 can compare a current size of the magnifier user interface element to a reference size (e.g., an initial size, or any other suitable reference size) to determine a current scale factor S of the magnifier user interface element. For example, if the current diameter of the magnifier user interface element is 0.5 times the reference size, the scale factor S=0.5.

In some embodiments, process 2100 can determine an inverse(s) of the scale factor associated with the magnifier user interface element. For example, if the scale factor associated with the magnifier user interface element is S=0.5, the inverse scale factor s=$S^{-1}$=2.

At 2104, process 2100 can set a local position of the duplicate content to an inverse positon of the magnifier user interface element scaled by scale factor s, which can cause corresponding portions of the content and the duplicate content to be presented within the magnifier user interface element and the magnifier presentation element. For example, if a center of the magnifier user interface element is located at position (x,y,z) in local coordinates (e.g., coordinates with an origin at a center of the content), the location of a center of the duplicate content can be set to position (−x,−y,−z)*s. In a more particular example, if a center of the magnifier user interface element is located at position (0,10,30) in local coordinates and the scale factor is s=2, the center of the duplicate content can be set to position (0,−20,−60). Note that the location of the duplicate content within the local coordinate system associated with the magnifier presentation element can be determined based on the location of the magnifier user interface element within the local coordinate system associated with the original content, but the coordinate systems may be oriented differently with respect to each other.

At 2106, process 2100 can scale the duplicate content by the scale factor s. For example, if the scale factor s=2, process 2100 can scale the duplicate content by a factor of 2, such that the duplicate content is twice as long, twice as wide, and twice as tall as the original content.

At 2108, process 2100 can receive an indication that the size and/or location of the magnifier user interface element has changed, and can return to 2102 (e.g., if a size of the magnifier user interface element has changed) or 2104 (e.g., if a size has remained static, and the magnifier user interface element has changed).

FIG. 22 shows an example 2200 of a process for rendering magnified interactive mixed reality content in accordance with some embodiments of the disclosed subject matter. At 2202, process 2200 can determine that a renderer associated with original content (e.g., content 1908) is enabled. For example, if the original content associated with the renderer is visible, process 2200 can determine that the render is enabled.

At 2204, process 2200 can determine whether material associated with the renderer is included in a mapping between original materials (e.g., materials associated with the original content) and duplicate materials (e.g., materials associated with the duplicate of the content). For example, process 2200 can maintain a mapping of materials associated with the original content. In such an example, each material can be associated with one or more properties of the material that can be used to render the material, such as texture (e.g., an image with details that can be mapped to the mesh), a UV map (e.g., that can be used to project the texture onto the 3D model), color, density, a Fresnel value (e.g., used during rendering to adjust an appearance of content based on viewing angle), transparency, and/or any other suitable properties or combination of properties. In a more particular example, process 2200 can maintain a dictionary of materials, and associated properties, and can check the dictionary using the material associated with the original content to determine whether there is an entry for that material.

If process 2200 determines that the material is not mapped ("NO" at 2206), process 2200 can move to 2208. At 2208, process 2200 can map a new material to the material associated with the renderer. For example, process 2200 can add a new material with properties based on the properties of the material associated with the original content. In such an example, process 2200 can associate properties with the new material based on properties of the original material, such as the texture, UV map, color, density, Fresnel value, transparency, etc. In some embodiments, adding the new material can include generating a pointer to the material associated with the original renderer. After adding the new material, process 2200 can move to 2210.

Otherwise, if process 2200 determines that the material is mapped ("YES" at 2206), process 2200 can move to 2210. At 2210, process 2200 can assign the material to a shader associated with the magnifier.

At 2212, process 2200 can render material associated with the duplicate content that falls within the boundaries of the magnifier (e.g., using the shader assigned the material), and can cull duplicate content that does not fall within the boundaries, which can inhibit presentation of the duplicate content that corresponds to portions of the original content that fall outside the magnifier user interface element.

In some embodiments, process 2200 can return to 2202 to determine whether another and/or a different renderer has been enabled, and/or whether a current renderer has been disabled. For example, one or more reference materials presented as part of the original content can change at any time (e.g., due to a change in which content is presented, due to a change in position and/or size of the magnifier user interface element, etc.).

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any other suitable media that is fleeting and devoid of any semblance of permanence during transmission, and/or any suitable intangible media.

It will be appreciated by those skilled in the art that while the disclosed subject matter has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is hereby incorporated by reference, as if each such patent or publication were individually incorporated by reference herein.

Various features and advantages of the invention are set forth in the following claims.

The invention claimed is:

1. A system for designating content display locations for mixed reality presentations, comprising:
   a head mounted display comprising:
      a transparent display;
      a plurality of sensors; and
      at least one processor, wherein the at least one processor is programmed to:
         receive input indicating that a content display location is to be designated;
         determine, based on data received from at least one of the plurality of sensors, a particular location within a physical environment of the head mounted display with which the content display location is to be associated; and
         associate the content display location with the particular location.

2. The system of claim 1, wherein:
   the plurality of sensors comprises an optical sensor; and
   the data received from at least one of the plurality of sensors comprises image data received from the optical sensor.

3. The system of claim 2, wherein the at least one processor is further programmed to:
   identify an object in the image data; and
   select the particular location to correspond to the physical location of the object identified in the image data.

4. The system of claim 1, wherein the at least one processor is further programmed to receive the input from a user input device that is in communication with the head mounted display.

5. The system of claim 1, wherein the at least one processor is further programmed to:
   receive an indication that the content display location is to be a main content display location; and
   store an indication that the content display location is the main content display location.

6. The system of claim 1, wherein the at least one processor is further programmed to cause information indicative of the particular location to be provided to another device.

7. A head mounted display, comprising:
   a transparent display;
   a plurality of sensors; and
   at least one processor, wherein the at least one processor is programmed to:
      receive input indicating that a content display location is to be designated;
      determine, based on data received from at least one of the plurality of sensors, a particular location within a physical environment of the head mounted display with which the content display location is to be associated; and
      associate the content display location with the particular location.

8. The head mounted display of claim 7, wherein:
   the plurality of sensors comprises an optical sensor; and
   the data received from at least one of the plurality of sensors comprises image data received from the optical sensor.

9. The head mounted display of claim 8, wherein the at least one processor is further programmed to:
   identify an object in the image data; and
   select the particular location to correspond to the physical location of the object identified in the image data.

10. The head mounted display of claim 7, wherein the at least one processor is further programmed to receive the input from a user input device that is in communication with the head mounted display.

11. The head mounted display of claim 7, wherein the at least one processor is further programmed to:
receive an indication that the content display location is to be a main content display location; and
store an indication that the content display location is the main content display location.

12. The head mounted display of claim 7, wherein the at least one processor is further programmed to receive the indication that the content display location is to be the main content display location from a server.

13. The head mounted display of claim 7, wherein the at least one processor is further programmed to cause information indicative of the particular location to be provided to another device.

14. A method for designating content display locations for mixed reality presentations, comprising:
receiving, by at least one processor of a head mounted display, input indicating that a content display location is to be designated;
determining, by the at least one processor based on data received from at least one of a plurality of sensors of the head mounted display, a particular location within a physical environment of the head mounted display with which the content display location is to be associated; and
associating, by the at least one processor, the content display location with the particular location.

15. The method of claim 14, wherein determining the particular location comprises determining the particular location based on image data received from an optical sensor of the head mounted display.

16. The method of claim 15, further comprising:
identifying, by the at least one processor, an object in the image data; and
selecting, by the at least one processor, the particular location to correspond to the physical location of the object identified in the image data.

17. The method of claim 14, wherein receiving the input comprises receiving the input from a user input device that is in communication with the head mounted display.

18. The method of claim 17, wherein the user input device comprises an accelerometer, a gyroscope, a compass, or an inertial measurement unit.

19. The method of claim 14, further comprising causing, by the at least one processor, information indicative of the particular location to be provided to another device.

20. The method of claim 14, further comprising:
receiving, by the at least one processor, an indication that the content display location is to be a main content display location; and
storing, by the at least one processor, an indication that the content display location is the main content display location.

* * * * *